United States Patent [19]

Griesshaber

[11] Patent Number: 5,212,723
[45] Date of Patent: May 18, 1993

[54] BURST PHASE CORRECTION SYSTEM FOR VIDEO DESCRAMBLING

[75] Inventor: K. Heinz Griesshaber, Los Gatos, Calif.

[73] Assignee: Macrovision Corp., Mountain View, Calif.

[21] Appl. No.: 743,049

[22] Filed: Aug. 8, 1991

[51] Int. Cl.[5] .......................................... H04N 7/167
[52] U.S. Cl. ........................................ 380/11; 380/14; 380/15
[58] Field of Search .............................. 380/11, 14, 15

[56] References Cited

U.S. PATENT DOCUMENTS

| | | | |
|---|---|---|---|
| 4,630,112 | 12/1986 | Yamada et al. | 380/15 |
| 4,642,688 | 2/1987 | Lowry et al. | 380/11 |
| 4,901,349 | 2/1990 | Metzger et al. | 380/11 |
| 4,916,736 | 4/1990 | Ryan | 380/11 |
| 5,003,592 | 2/1991 | Pires | 380/11 |
| 5,014,310 | 5/1991 | Walker et al. | 380/14 |
| 5,034,981 | 7/1991 | Leonard et al. | 380/14 |
| 5,058,157 | 10/1991 | Ryan | 380/11 |
| 5,060,262 | 10/1991 | Bevins, Jr. et al. | 380/15 |

Primary Examiner—Salvatore Cangialosi
Attorney, Agent, or Firm—Skjerven, Morrill, MacPherson, Franklin & Friel

[57] ABSTRACT

A method and apparatus for synchronizing a randomized video signal to a phase-locked sampling system. The phase-locked system is part of a scrambling apparatus capable of scrambling and subsequent descrambling of video signals recorded on videotape recorders which undesirably introduce time-base errors into the luminance/chrominance phase relationship. These time-base errors are removed without use of a time-base corrector by programmable delay line memory circuitry which introduces a programmable amount of delay into the video path. The delay line includes a programmable length FIFO memory module.

15 Claims, 65 Drawing Sheets

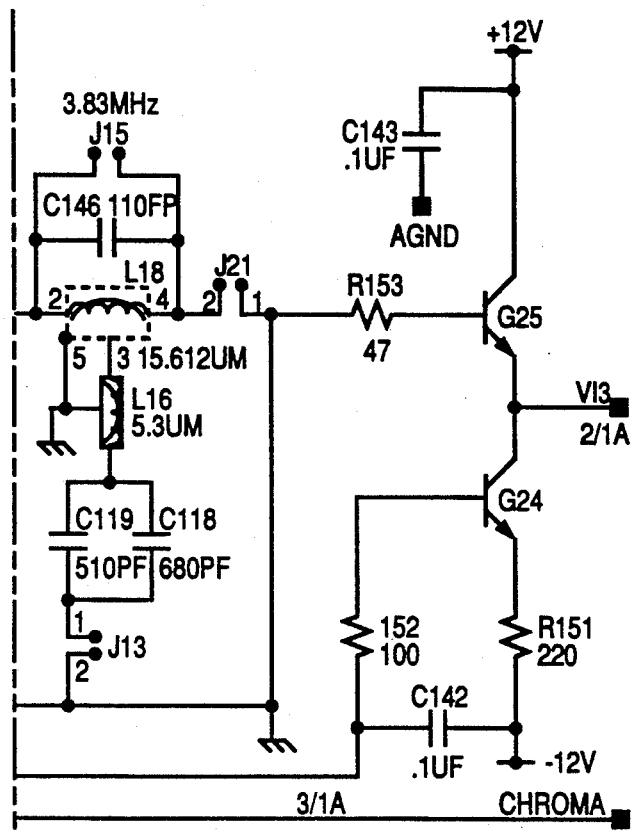
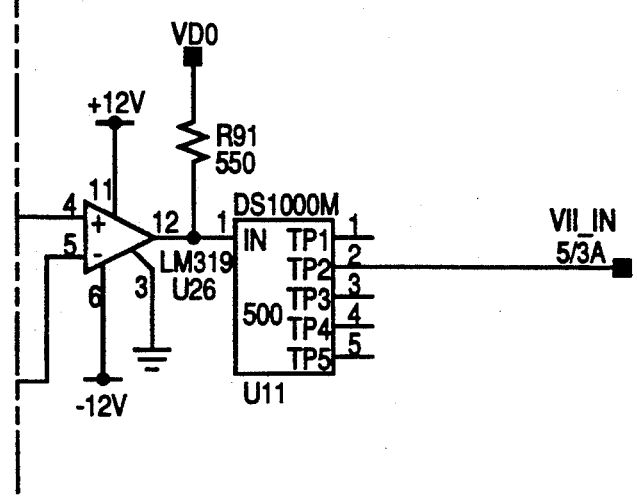
FIG. 2C
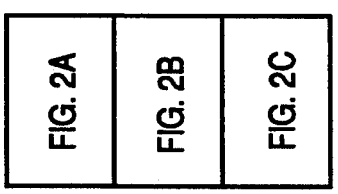
KEY TO FIG. 2
| FIG. 2A | FIG. 2B | FIG. 2C |

SCRAMBLING OFFSET MUX

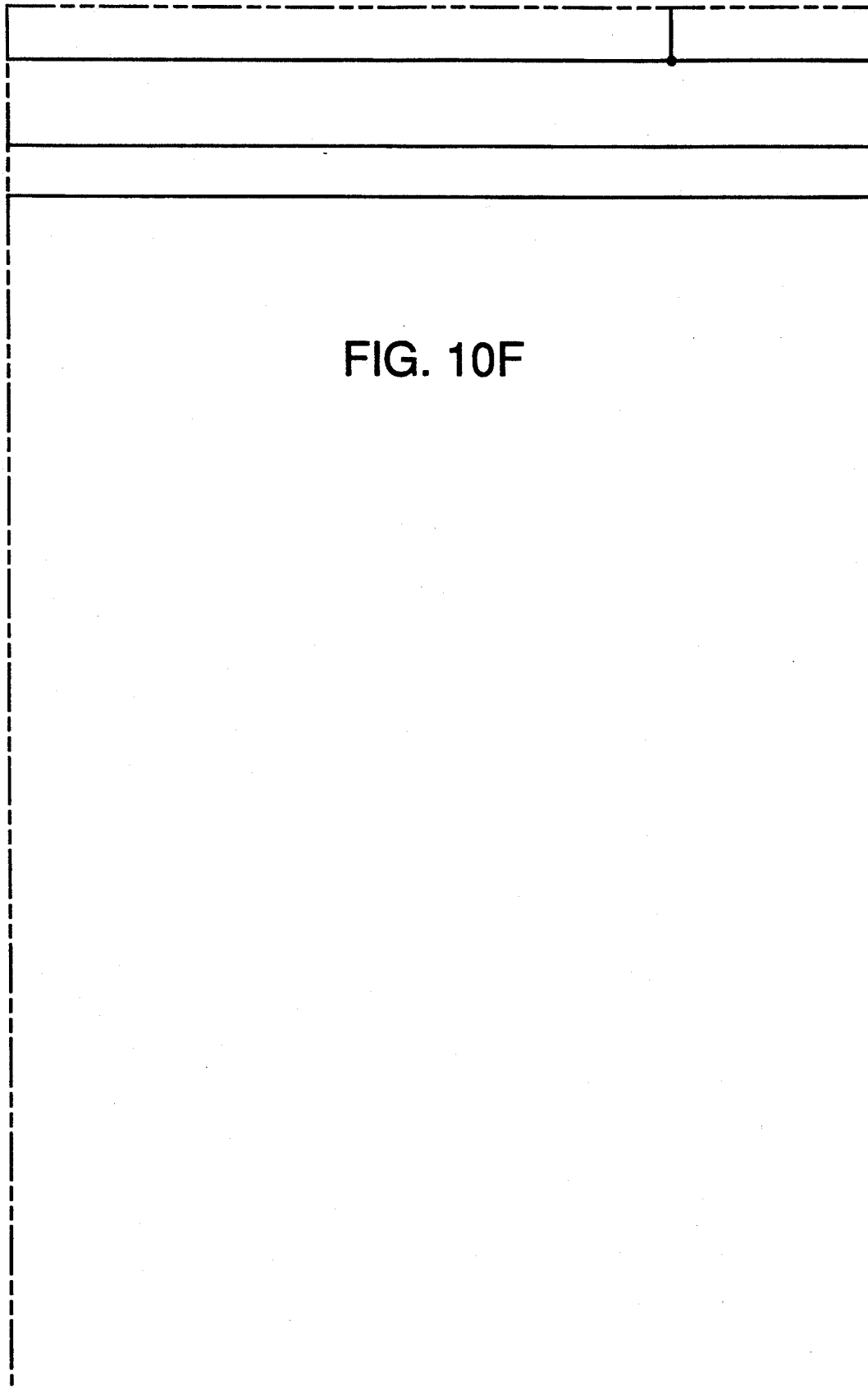

Key To Fig. 12

| Fig 12a | Fig 12b | Fig 12c | Fig 12d | Fig 12e |
|---------|---------|---------|---------|---------|
| Fig 12f | Fig 12g | Fig 12h | Fig 12i | Fig 12j |
| Fig 12k | Fig 12l | Fig 12m | Fig 12n | Fig 12o |

5/B2, 5/C2, 5/D2, 5/A2, 5/A2, L2, 4/A2, 4/A2, 4/B2, 4/A2, 2/A2, 1/A1

G1

5/A2, 4/A2, 4/A2, L1, 4/D2, 4/D2, 4/D1, 4/E2

BURST PHASE CORRECTION SYSTEM FOR VIDEO DESCRAMBLING

BACKGROUND OF THE INVENTION

1. Field of the Invention

The invention relates to synchronizing a randomized video signal to a phase-locked sampling system. More specifically, the invention is directed to an apparatus and method for scrambling and descrambling video signals recorded on a videotape recorder and for correcting time-base errors undesirably present in the descrambled signal.

2. Description of the Prior Art

Certain systems for descrambling video signals (which typically have deliberately been scrambled to prevent unauthorized use thereof) introduce time base errors into the video signal. It is well known to use a device called a time-base corrector for restoring time stabilization to these descrambled signals. Typically the time-base corrector corrects the time-base errors prior to descrambling. However, a time-base corrector costs about $3,000 to $5,000 and is a relatively bulky instrument typically for professional use only and including a good deal of relatively expensive electronic memory and highly sophisticated clocking circuits. In such a time-base corrector a clock signal is created that is controlled by the position of horizontal synchronization signals in combination with the phase of the color burst in the recorded video signal. The video signal is loaded (utilizing an off-tape clock signal) either into a line memory or a field or frame memory in the time-base corrector. The time-base corrector includes a variable clock generator which tracks the time-base errors of the incoming signal and then clocks out the video signals from the memory with a fixed clock signal included. Thus, any time (i.e. phase) ambiguity or aberrations in the video signal are removed by the time-base correction process.

It would be highly desirable to provide a method for correcting time-base errors in a descrambled video signal without the need to use a time-base corrector apparatus or equivalent circuitry. Heretofor, such a method has not been available.

SUMMARY OF THE INVENTION

The present invention is directed to a method and apparatus for synchronizing a randomized video signal to a phase-locked sampling system and hence to compensate for the above-described time-base errors in a scrambled video signal. The phase-locked sampling system is typically part of a scrambling apparatus capable of scrambling and subsequent de-scrambling of video signals recorded by videotape recorders, including industrial-type recorders and consumer-type VCRs.

Generally the sampling clock of a randomized video signal (one that has been exposed to time base errors of a videotape recorder) will track these errors by locking to the horizontal synchronization ("sync") pulse and to the color burst signal. This method relies on the condition that the horizontal sync pulse, representing the time base (reference) of the luminance portion of the video signal, and the color burst, representing the chrominance portion of the video signal, are locked (in phase) to each other. This in-phase condition is maintained if the video signal is processed in its composite form, but needs to be recreated (corrected) if the signal has been recorded separately in a luminance and a chrominance channel.

Thus in the scrambling process a composite video signal has been recorded, luminance and chrominance separately, where the chrominance has been stabilized during playback in order to make it viewable on any commercially available television set. This stabilization process removes the in-phase relationship (the "lock") between the sync-pulse and the color burst, and a sample clock locked to either one of the two signal components would undesirably no longer be locked to the other signal component.

To further explain the problem addressed by the present invention, typically in "color under" recording systems (such as the well known VHS, 8 millimeter, Beta and others) the luminance and chrominance components in the recorded video signals are separated. These systems provide the chrominance/luminance separation in order to take advantage of the narrow bandwidth of the chrominance component and record it in an amplitude modulation form superimposed on the FM luminance component but at a lower frequency so that these two components may be later filter separated. It is noted that professional-type broadcast video equipment typically does not perform this superimposition operation.

In the corresponding playback circuitry, i.e. in a videotape recorder, the chrominance component of the video signal is stabilized so that the time-base (or "phase") error introduced by the imperfections of the mechanical tape deck together with the elasticity of the magnetic tape is compensated for with regard to the phase relationship of the chrominance signal. However, the luminance signal is not so compensated and thus the luminance signal exhibits undesirable time-base errors on the order of several microseconds duration over the duration of a video field.

The present disclosure describes a system that digitizes (sample) a composite video signal of the above-described nature without the need to re-establish the luminance/chrominance phase relationship.

Thus, an apparatus is provided in accordance with the invention which is typically a part of a scrambling system. The scrambling system allows one to record on a videotape recorder of any type (i.e. 8 millimeter, ½ inch, 1 inch, etc.) signals which have been recorded from videotape recorders which provide color corrections, but wherein the signals have not been processed by a time-base corrector, and then to descramble the signals. Thus, the recorded video signals include time-base errors which would cause undesirable artifacts in the display upon descrambling the picture.

In accordance with the present invention which includes a scrambling and descrambling process to provide security to prevent unauthorized use of the recorded video signal, a conventional line rotation scrambling process is used. As is well known, in line rotation scrambling the start of each line in the horizontal scan of the active video is moved, i.e. "rotated", within that particular active video line. Thus, for instance if the start of a horizontal line is advanced 10 microseconds into the active video portion of that line, then the total of the line is pushed backwards by 10 microseconds. Thus, at the end of that video line there is a remainder of the 10 microsecond signal which is cut and "rotated" and placed at the beginning of that video line. This "line rotation" is illustrative herein as a scrambling technique, and the correction method and apparatus in accordance with the invention are also compatible with other scrambling techniques.

When this scrambled signal is descrambled, the exact starting point of the horizontal video line is critical, i.e. the descrambling apparatus must "know" the precise location of the beginning of the horizontal video line. Thus, a horizontal counter is reset and reoriented to the detected horizontal sync signal leading edge which conventionally denotes the beginning of each video line. The stabilized sub-color carrier (which is the stabilized chrominance signal) in the process of being stabilized has lost its phase relationship with respect to the luminance signals, and therefore its phase relationship to the horizontal sync signal edge. Therefore when the horizontal counter is reset to a particular value corresponding to the position of horizontal sync, there is an ambiguity of the chrominance phase versus the counter resetting to the sync edge by plus or minus one "count".

This one "count" corresponds to an advance or retardation of 90° of the sub-carrier phase. The sampling clock is defined as 4× color subcarrier frequency, and therefore each count represents 90°. It is possible to detect from the output video signal, by examining the burst phase, if the chrominance signal is either in phase, advanced, or retarded by 90°. Then, this detected timebase error is corrected by making an adjustment in the length of a digital delay line (a FIFO memory in one embodiment) by plus or minus one count in order to compensate for the phase discrepancy. The FIFO memory is a serial memory chain available as a commercially available integrated circuit. This process provides digital phase correction with the advantages of a time-base correction, but does not require the complex and expensive circuitry of a time-base corrector.

It is to be understood that in other embodiments of the invention, the number of counts may vary and more counts are used for a greater degree of phase adjustment. The determining factor for the number of counts is the tape recording mechanism. Thus one other embodiment uses an adjustment of zero, plus one or two counts, or minus one or two counts.

To describe this process in slightly different terms, there is an "after the fact" review of the burst phase relationship on a line-by-line basis. Then the total video signal, including luminance and chrominance, is adjusted forward or backwards in time by a length of time-equivalent to one clock pulse. The sampling clock frequency has been defined above as 4 times the color subcarrier frequency (14.31818 MHz); which is also conventionally $$4 \times \frac{455}{2} \cdot f_H = 910 f_H,$$

where $f_H$ is the frequency of the horizontal scan rate. Thus, four times the subcarrier frequency is 14.31818 megahertz equivalent to a count of 910. To restate this, (14.31818 MHz) × (63.5 μsec per cycle) =910, where 63.5 μsec is the NTSC video line duration. Thus, time stabilization is performed without the need for an expensive time-based corrector.

DETAILED DESCRIPTION OF THE INVENTION

In a video descrambler in accordance with the invention, a sampling clock is generated by locking a conventional crystal oscillator, running at four times the video color-subcarrier frequency (14.31818 MHZ for NTSC video), to the colorburst of the incoming video signal. The video signal, having been digitized, is loaded into sequential memory cells (typically a high speed SRAM memory having a 20 nsec cycle rate) during a read-modify-write cycle for purposes of scrambling and descrambling. The memory address is generated by a 12 bit counter driven at the clock rate. The memory includes at least enough cells to store one full line of video i.e., 910 cells for NTSC video, and the memory counter is reset after the last cell has been addressed at the end of the current line.

The horizontal sync pulse, which conventionally is the timing reference pulse at the start of each video line, has been exposed to the timebase instability of the recording videotape recorder and its position therefore varies (undesirably) on a video line-by-line basis. The position of the leading edge of the sync pulse is used to set the memory address counter to a nominal value (i.e., 21) for each line. The random nature of the sync leading edge position with respect to the sampling clock causes an uncertainty of plus or minus one count, and if left uncorrected would undesirably result in a phase error of plus or minus 90° of the color-subcarrier and subsequent color streaking in the output video TV picture.

The subcarrier phase is measured at the output of the memory in a cosine-phase detector and the results are used to determine the proper sync edge position. The video path is delayed for the duration of the measurement through a three stage FIFO memory arrangement with 133 steps nominally. The output of the phase detector is used to add or subtract one step from the last FIFO memory stage.

The final operation performed in the digital data path is to replace the leading edge of horizontal sync for each line in the digital data path with an edge that is in phase with the sample clock. Timing signals from a line counter are decoded to control a digital multiplexer that inserts the corresponding values into the video path and thereby replaces the original sync edge with a time-corrected sync edge.

Figure 1:
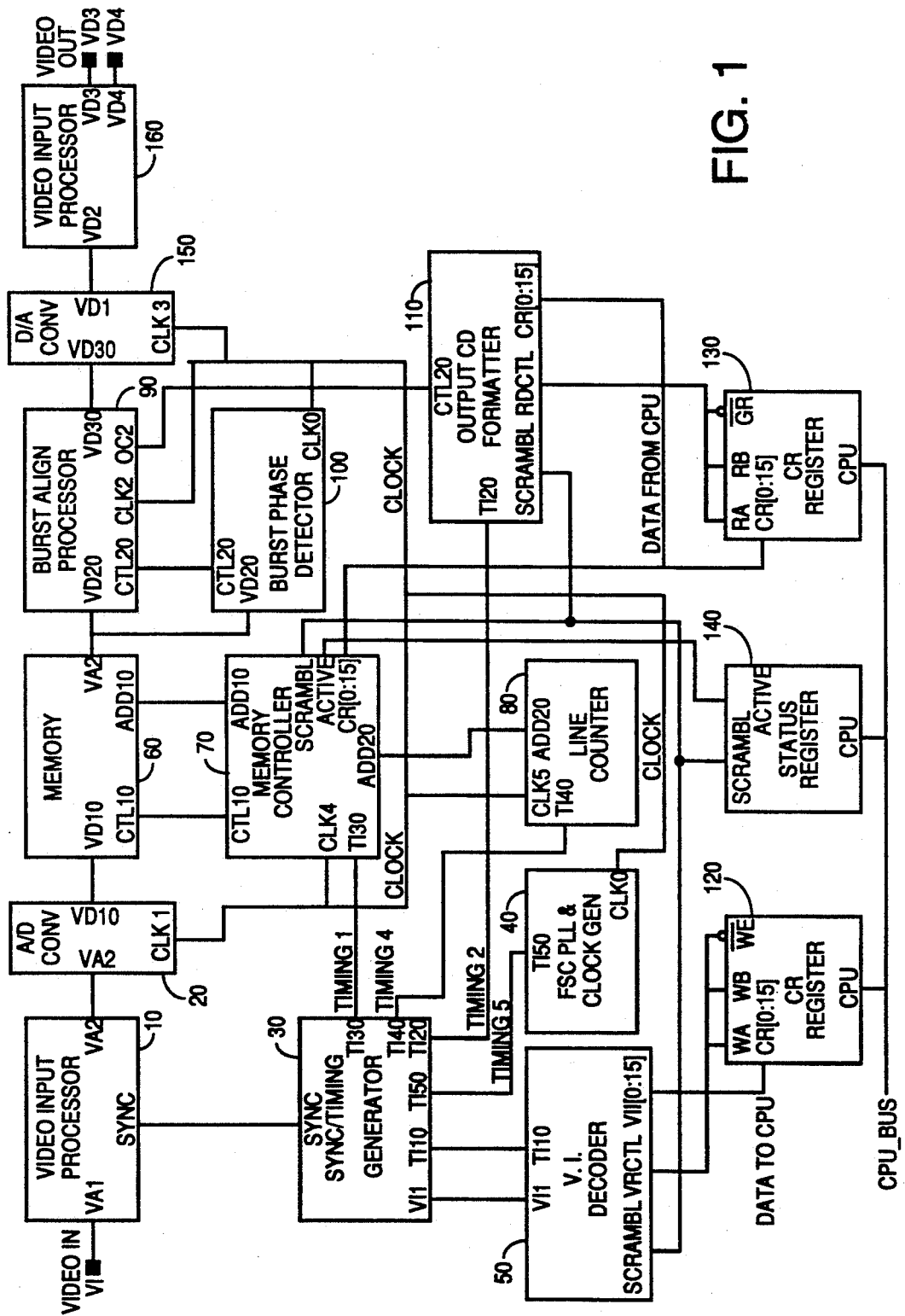
FIG. 1 shows in a block diagram a system in accordance with the invention.
Figure 2A:
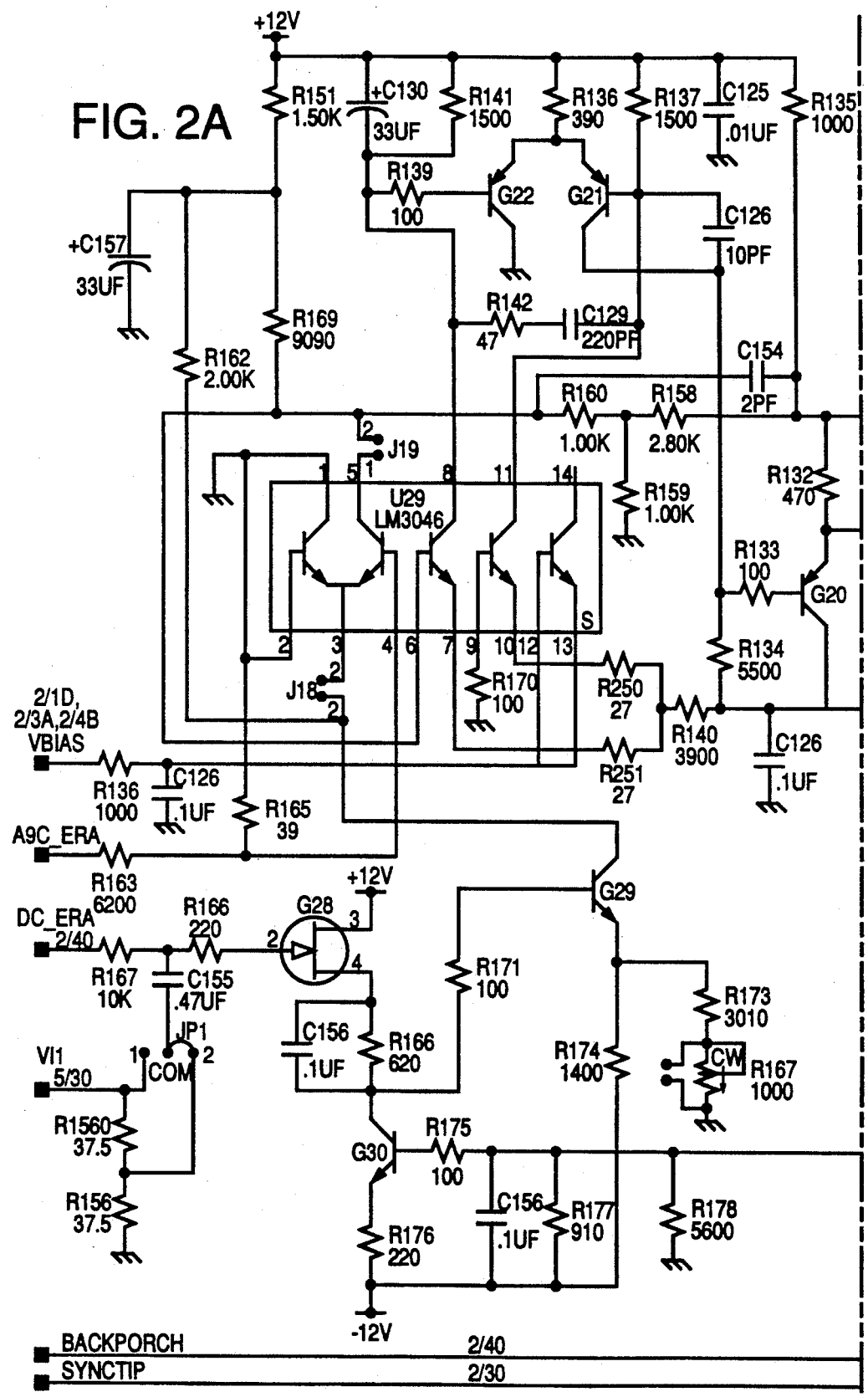
FIGS. 2A-2B show schematically analog video processing circuitry in accordance with the invention.
Figure 2B:
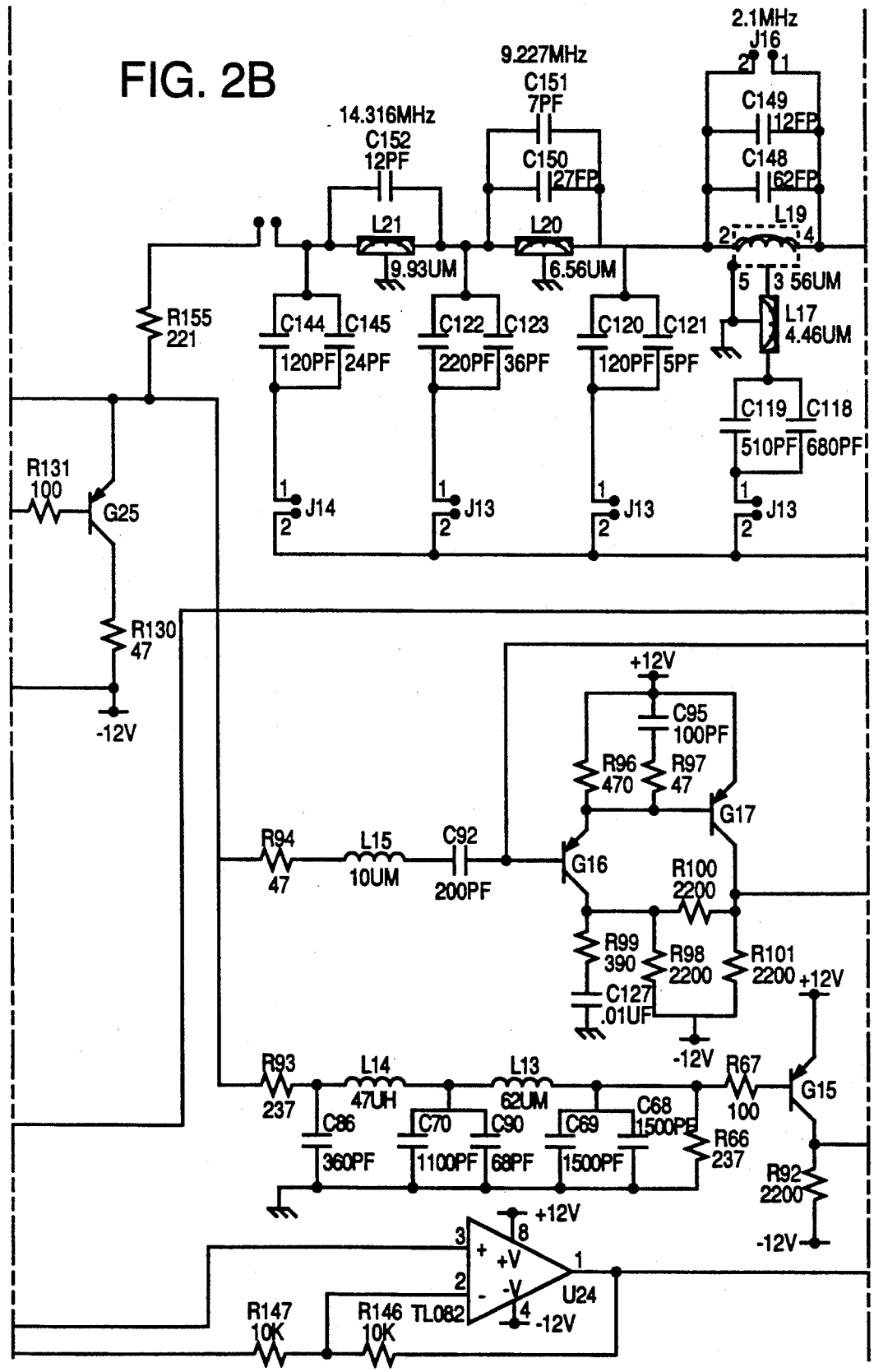
Figure 3A:
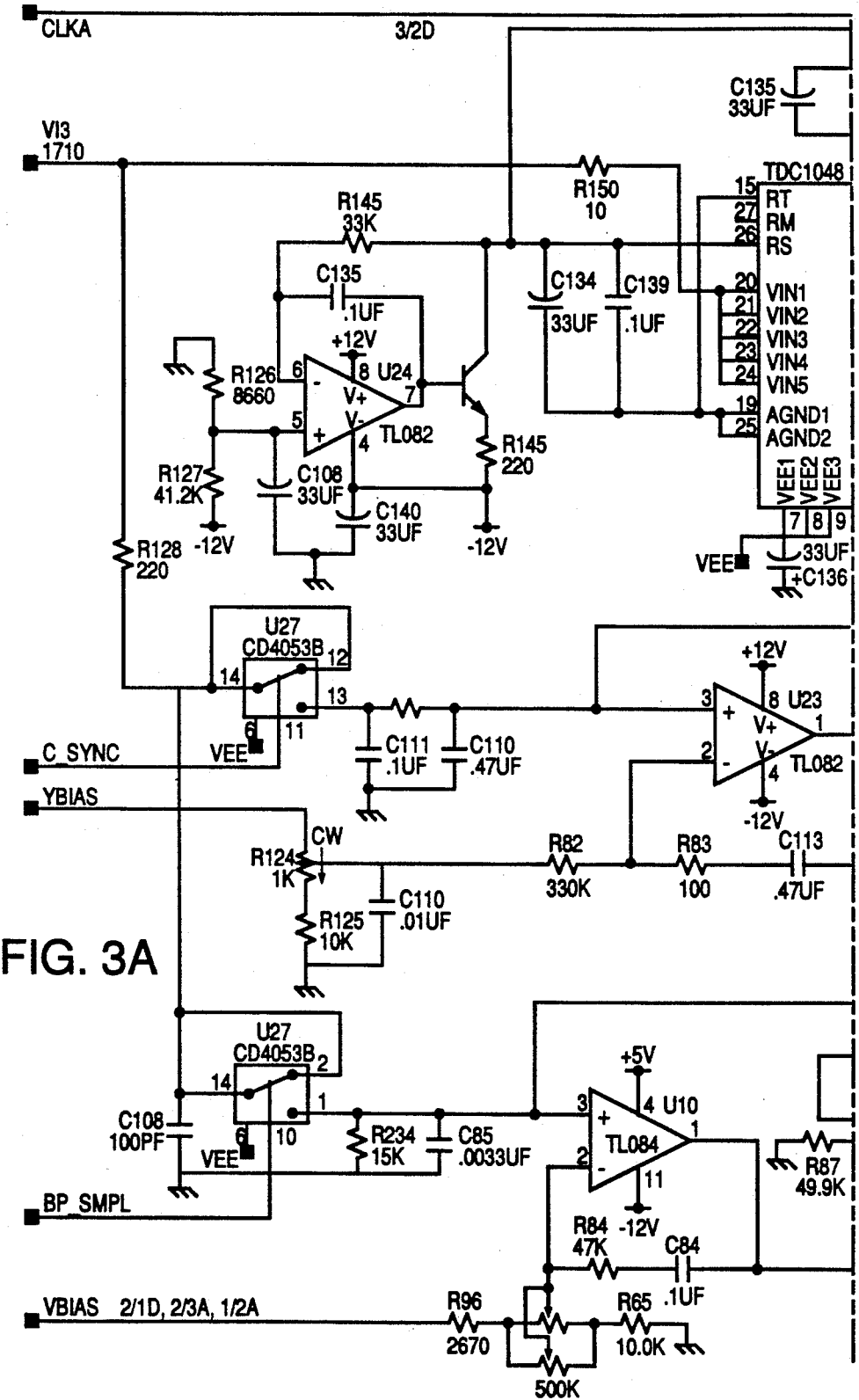
Figure 3B:
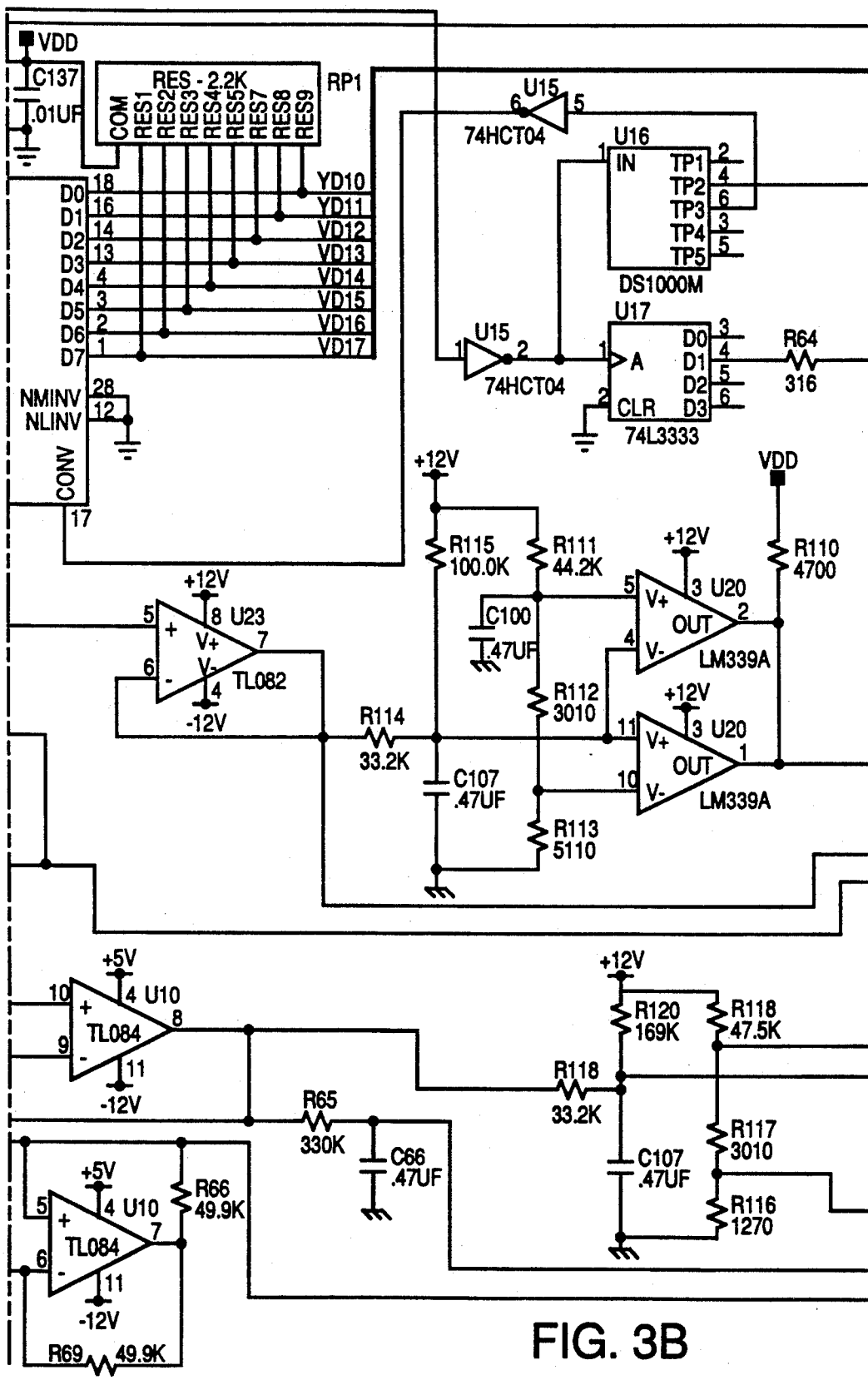
Figure 3C:
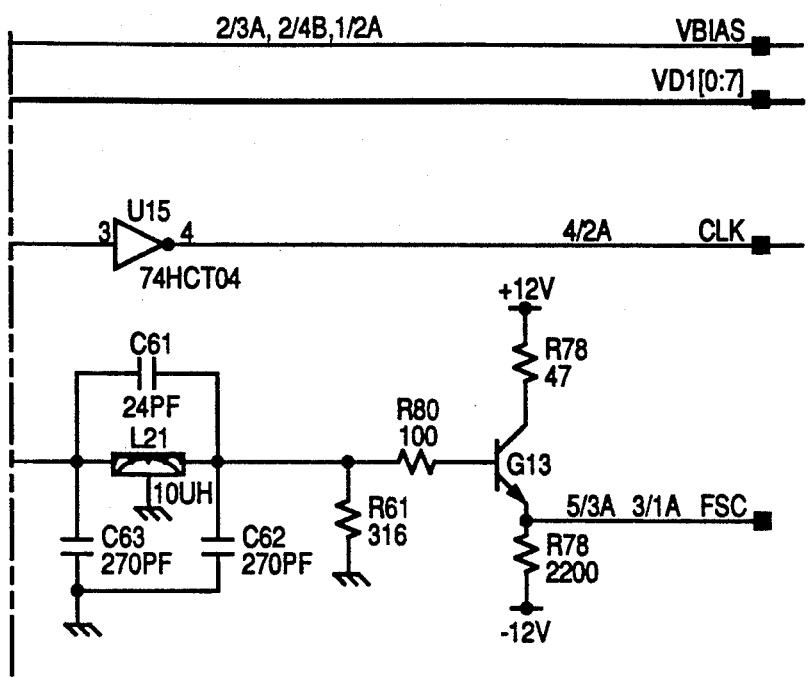
Figure 3C:
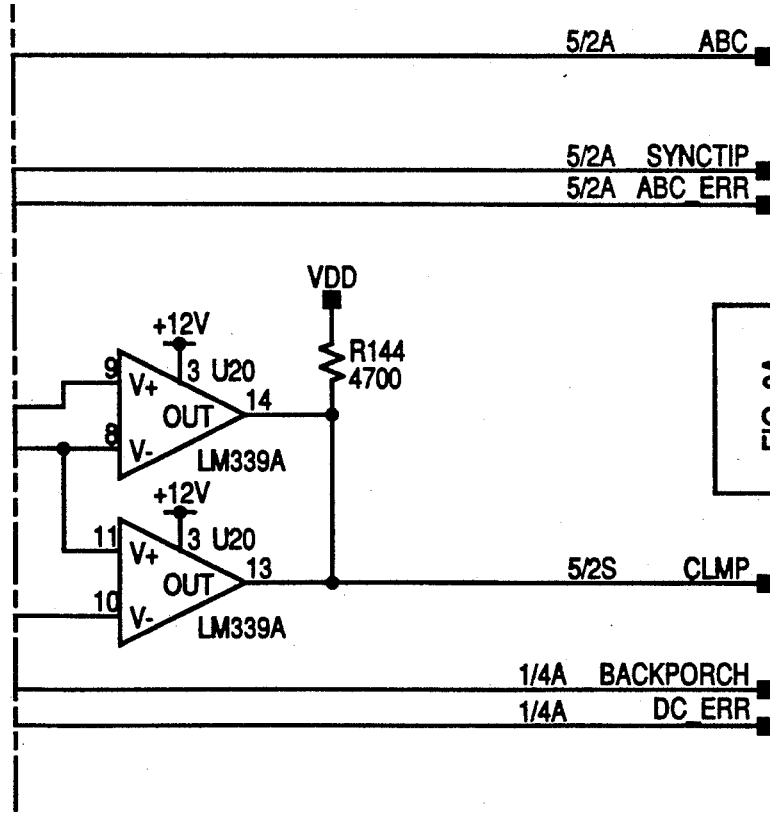
Figure 4A:
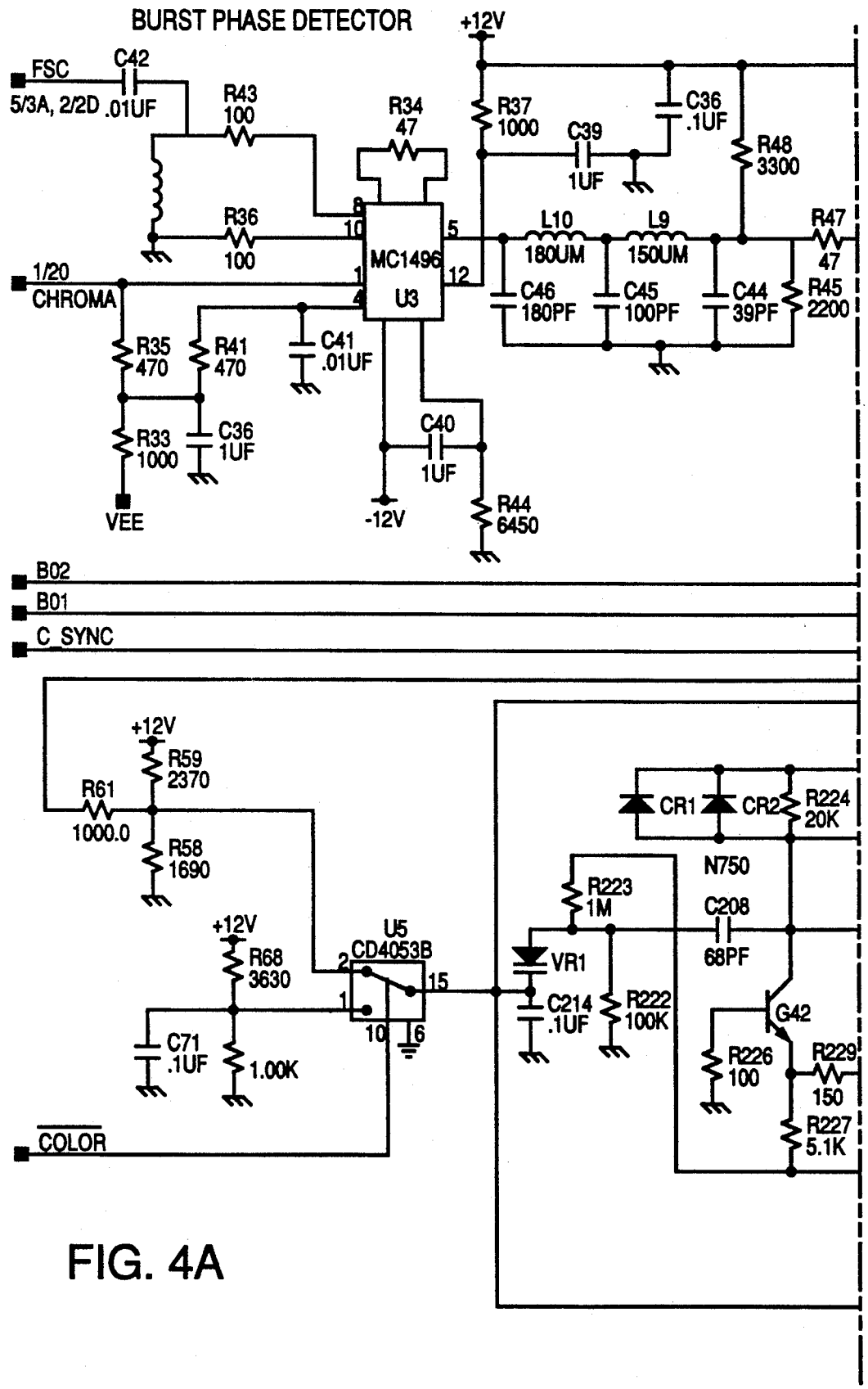
Figure 4B:
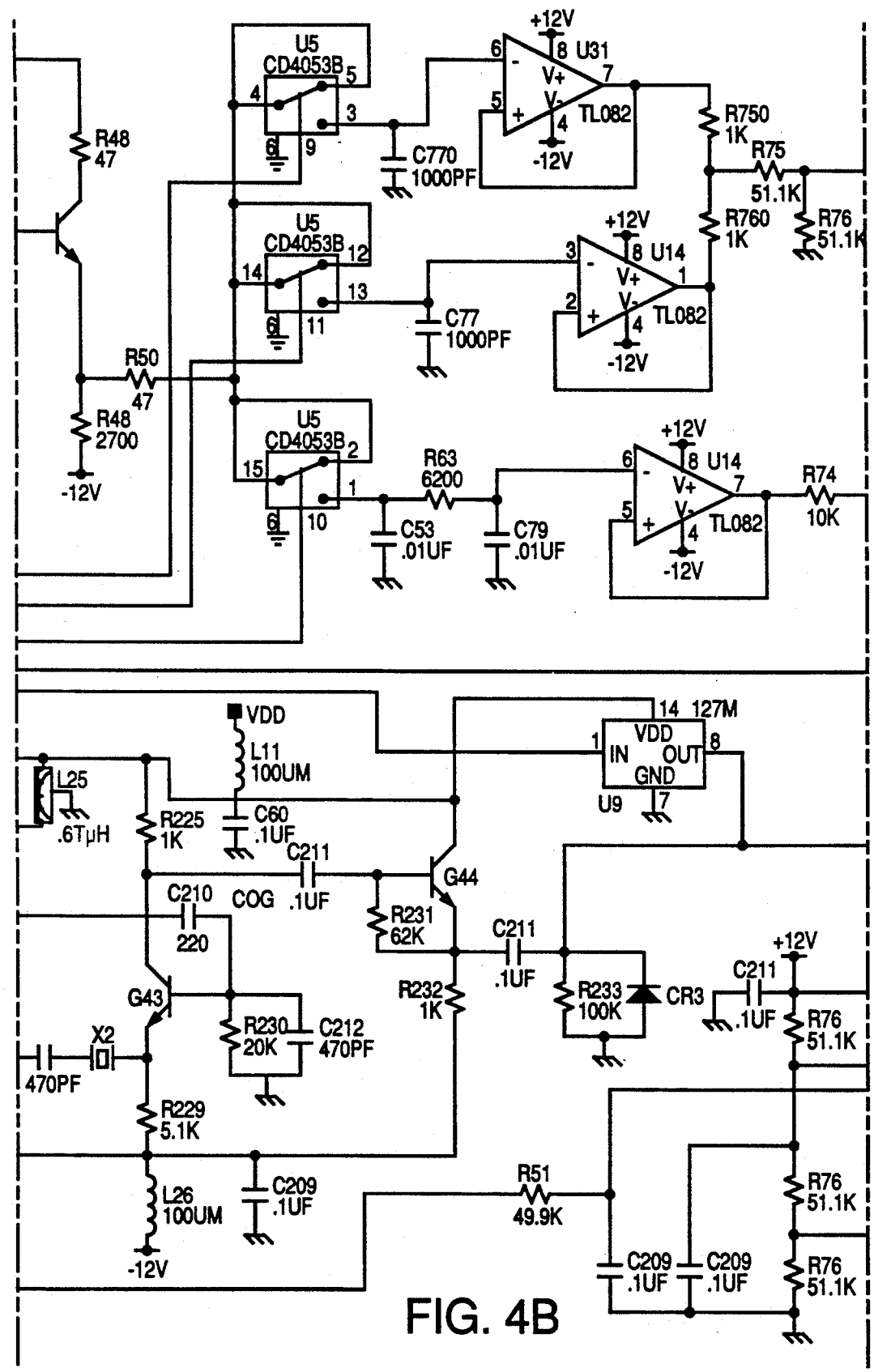
Figure 4C:
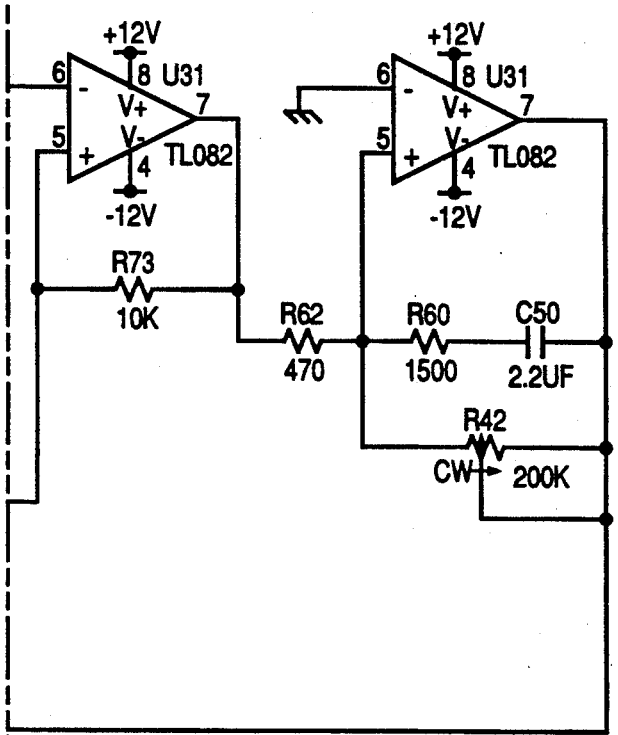
Figure 4C:
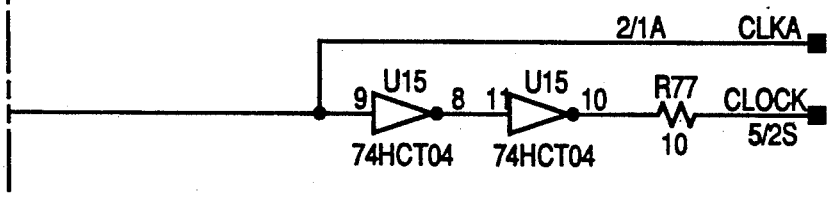
Figure 4C:
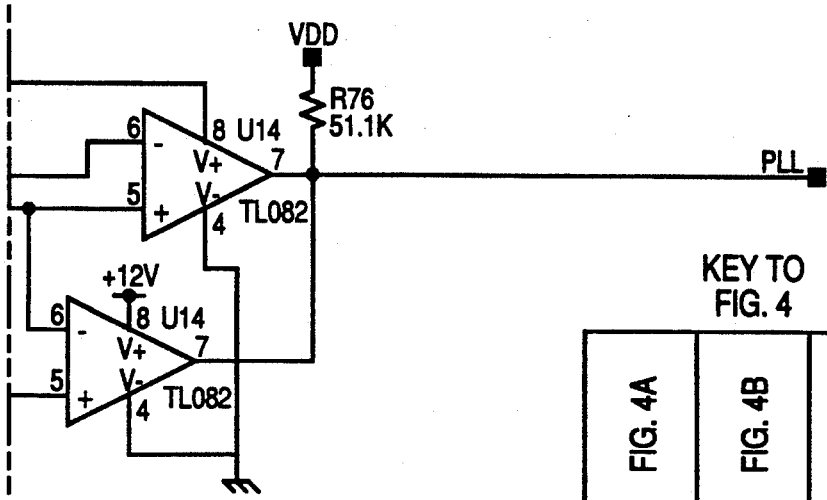
Figure 4C:
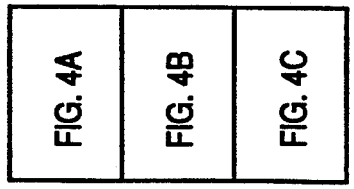

FIG. 1 shows in a block diagram an encoding (scrambling) system processor in accordance with the invention.

An input video signal is provided to the terminal labelled "VI" (standing for "video in") into the video input processor 10. At video input processor 10, the input horizontal sync (synchronization) signal is separated and fed to the sync/timing generator 30. The timing signals provided by the sync/timing generator 30 are also provided to the phase-locked loop and clock generator 40. The sync/timing generator 30 also provides the vertical interval i.e. VI signal from terminal VI1 of sync/timing generator 30 to the VI decoder 50. VI decoder 50 is part of "processors 1 and 2" (components of both video processors are mounted on conventional printed circuit boards). The video input processor 10 then provides the video signal, conventionally normalized with respect to black level, frequency response, and amplitude to the A/D (analog to digital) converter 20 at terminal VA2 thereof. The video input processor 10, the A/D converter 20, the sync/timing generator 30, and the phase-locked loop and clock generator 40 circuitry are all (in one embodiment) comprised of components mounted on the first conventional printed circuit board which is denoted "processor 1".

Returning to the upper center part of FIG. 1, the A/D converter 20 provides its digital output terminal VD10 of signal to the memory block 60. Memory block 60 is a serial, i.e. high speed SRAM (static random access memory) memory, which is driven by an address bus ADD1 and a control signal bus CTL1 both connected to memory controller 70. This SRAM-type memory is of sufficient duration to hold one video line, i.e., 910 memory cells for NTSC TV. The memory controller 70 includes a memory address counter which is in phase with line counter 80. Thus, digital scrambling and descrambling is accomplished by memory block 60 and memory controller 70. The video signal which is the output of memory block 60 is provided to terminal VD20 of burst alignment processor 90, which in turn is driven by burst phase detector 100 via bus CTL2.

The FIFO memory delay line for correction of phase errors is a part of the burst alignment processor 90. In one embodiment, the length of this FIFO memory delay line is such that it encompasses the portion of a single horizontal video line extending from the leading edge of horizontal sync through the center of the color burst (about 9.3 microseconds for NTSC TV). This delay line length allows the system to evaluate the burst phase (FIG. 11 VD4 [0.7]) at the center of the burst pulse and make a connection to the digital video signal (FIG. 11, VI) at a moment in time before the leading edge of the horizontal sync pulse has entered VI in FIG. 11.

Output code formatter 110 takes data provided by the CPU via the control bus (CR[0:15]) in parallel form and converts it into serial form in order to insert the data into the digital video data stream. Thus a numerical value is assigned to the logical "0" state of the data that corresponds to the numerical value of the blanking level and a numerical value of 80 IRE units (80% of peak white) is assigned to the logical "1" state of the data. This data is inserted during the duration of the vertical blanking interval on any two lines between line 14 and line 20 and is utilized during decoding to authorize the proper decoder and to provide the decoder with information required for decoding.

The system of FIG. 1 is controlled by a conventional 8 bit microprocessor which includes process register 120, control register 130, and status register 140 and which also conventionally includes the scrambling "kernel" in memory. The microprocessor operates asynchronously relative to the video signal. Registers 130, 140 are connected to a 16 bit bus CPU BUS which provides (via control register 130) the decoding data to be inserted into the video signal in the vertical interval to provide the desired scrambling decoding data.

In the descrambling process the extracted decoding data from the video signal is provided from VI decoder 50 via the vertical interval bus VI1 to the processor register 120 and back to the microprocessor CPU bus.

The status register 140 provides two control signals (scramble and active) to the video processor.

The output of burst alignment processor 90 is provided to terminal VD30 of D/A (digital to analog) converter 150 in the upper right-hand portion of FIG. 1 and from D/A converter 150 to video output processor 160. Thus, the output video signal is converted from the digital domain back to analog by D/A converter 150, and then video output processor 160 clamps the output video signal to ground (i.e. provides the proper black level) and provides output signals at terminals V03 and V04 to be conventionally connected to, for instance, a television monitor.

Detail of the "processor 1" board which includes the video input processor 10, A to D converter 20, sync/timing generator 30, and phase locked loop and clock generator 40 of FIG. 1 is shown schematically in FIGS. 2 through 7. Operation of the processor 1 board is as follows.

The processor 1 circuitry described above normalizes the video input signal with respect to gain, DC potential and bandwidth, and separates the horizontal and vertical synchronization signals from the composite video signal. The video input processor includes the AGC amplifier (transistor Q28, I.C. U29, transistors Q20, Q21, Q22, Q26), the input filter (inductors L16, L17, L18, L19, L20, L21 and the associated capacitors) and the video driver (transistors Q24 and Q25) that delivers the video signal to the A/D converter U28. The control signal for the AGC amplifier is created by sampling the sync tip amplitude at I.C. U27 and shaping the DC voltage through amplifier U23. The control signal for the DC restoration is sampled through a second switch of I.C. U27 and amplified by two stages of I.C. U10.

The output of the AGC amplifier is also fed to the phase detector U3 of the phase-locked loop via the chroma bandpass filter (inductor L15 and capacitor C92). The output of the phase detector is sampled by U5, buffered by U14 and U31, and amplified by U6, and drives the crystal oscillator (transistors Q42, Q43, Q44) through the switch U12. The output of the oscillator provides the sampling clock and reference clock for the digital video processor 2 described hereinafter.

FIGS. 8 through 12 show in detail the circuitry of processor 2 which is a digital video processor which includes all of the circuitry of FIG. 1 with the exception of the video input processor circuitry (video input processor 10, A/D converter 20, sync/timing generator 30, and phase-locked loop and clock generator 40), the video output processor 160, and the microprocessor which is on the "controller" board and which includes the process register 120, the status register 140, and control register 130.

FIG. 8 shows the video path and scrambling/descrambling mechanism of the digital video processor. The eight bit digital video bus VD1 from the A/D converter 20 (FIG. 1) is latched into the octal latch U40. The tristate output bus VD12 from latch 40 drives the memory cell U48 and the octal latch U44. The memory cell U48 operates in a read-modify-write mode and performs the scrambling function in cooperation with the memory address counter U49, U50, U51 of the scrambling system. Memory cell 48 holds one entire horizontal line of video data as described above as 910 eight bit pixels.

The octal latch U9 re-clocks the video bus VD2 from the octal latch U44 and drives the delay line FIFO's U1, U2, U3 of FIG. 11 as well as the D/A converter U4 via the bus VD4. The delay FIFO's U2, U3 are each fixed $64 \times 9$ bit modules connected in series and also in series with one variable length module U1. The variable module U1 is adjustable from 3 to 18 steps each of eight bits, to provide for a total delay for U1, U2, U3 of about 9.3 $\mu$sec which is nominally $(64+64+5) \times 69.84$ $\mu$sec = 9.2889 $\mu$sec. This 9.3 $\mu$sec delay compensates for the processing delay through the burst-phase corrector 100 of FIG. 11 and bridges the time gap between the leading edge of horizontal sync and the center of color burst as described above. Therefore, the video signal at the output of the delay line section U1, U2, U3 is still at the front porch of the horizontal blanking interval, while the input to the burst phase corrector 100 of FIG. 1 has been advanced to the center of the color burst.

The output of the D/A converter 20 of FIG. 1 is filtered by the bandpass filter including inductors L3 and L4 of FIG. 11 and the associated capacitors (with the pass band centered around a frequency of 3.58 MHz) and the output is fed to the phase-detector U5 via the driver/amplifier transistors Q1, Q2. The second input to the phase-detector U5 is a continuous sine wave derived from the sampling clock signal. The output of the crystal oscillator (FIG. 4) CLKA is buffered by U15 (FIG. 3) and divided by 4 in U17. The resultant square is filtered via lowpass L12 and the associated capacitors and the driver Q13 supplies a sine wave with the same frequency as the color subcarrier $$\left( \frac{4 \times f_{sc}}{4} = f_{sc} \right)$$

to the input of the PLL burst phase detector (FIG. 4) and to the burst phase detector of the burst phase connection system (FIG. 11). The phase of the sine wave is adjusted to generate DC reference voltage (cos 90°=0) if the burst phase is "in phase" with the sampling clock. A burst signal arriving one clock pulse too early (cos 180°=−1) creates an excursion into the negative direction with respect to the reference voltage, and a late burst signal (cos 0°=1) deviates into the positive direction. The output of the phase detector is applied to a limit detector U10 of FIG. 11. The reference inputs of U10 are set at 70% of the excursion and if triggered supply high inputs to the data inputs of the dual latch U14. The outputs of the latch U14 are supplied to the programming inputs L0, L1 of the variable delay module U1 in order to correct the output burst phase.

The logical operation of the burst phase corrector 100 is shown in the following truth table:

| Burstphase | Detector | Del 1 | Del 2 | L1 | L0 | # of Delays |
| --- | --- | --- | --- | --- | --- | --- |
| correct | at reference | 0 | 0 | 1 | 0 | 5 |
| early | negative | 1 | 0 | 1 | 1 | 6 |
| late | positive | 0 | 1 | 0 | 1 | 4 |

The output of the variable delay module U1, now delay corrected, is fed to the sync insertion PAL (program array logic) U90, where at the correct time (as defined by the line counter) the data during the leading edge of sync is replaced with calculated values. This insures that the sync edge is positioned with respect to the phase of the sampling clock. The reference input to U5 comes via a jumper JP1 from the sub-carrier FSC. For PAL (the European TV standard), switch U19 and the associated circuitry provides a delay or advance of 45%, because PAL has a "swinging sub carrier". Otherwise (for American NTSC TV) U19 is by-passed.

As described above, programmable memory module U1 is controlled at its terminals L0 and L1 which are schematically labelled respectively 5 and 6. Thus, if no delay correction is made a nominal delay of five cells is programmed in. For correction, the delay is adjusted to either 6 cells or 4 cells i.e. a delay of plus or minus one cell from the nominal 5 cells.

Thus the voltage supplied from U5 is a voltage that varies around a bias point of 2.5 V as the chroma signal from Q2 varies with respect to amplitude and phase; this is exactly like a chroma decoder in an ordinary TV set. The higher frequency components are filtered out by the following low pass filter which includes components L7 and L6. The signal is then applied to a threshold detector as shown in the lower right hand portion of FIG. 11. This threshold detector includes component U10 having two comparators as shown.

Thus there is a ladder R22, R21 and R33 which determines an upper and lower threshold for the threshold detector U10. By definition, normally the detected burst signal will be within the limits defined by the two thresholds. If the detected burst signal is early or late it will exceed one of the two thresholds, thus providing a "high" state at one of the outputs of U10. Thus, there will be a high signal at either pin 2 (DEL1) or pin 12 (DEL2) which are the input terminals of D-type dual flip-flop U14. The dual flip-flop U4 is clocked at the time when the center of the colorburst is decoded by U5. The outputs of the flip-flop provide the programming controls to the delay module U1 according to the above truth table.

As shown in the truth table, the outputs of dual flip-flop U14 are connected to respectively pins L0 and L1 of memory module U1. The outputs of dual flip-flop U14 are such that there will always be a value of two on the output, if the upper flip-flop of U14 is defined as bit zero and the lower flip flop of U14 is defined as bit one. Then if no correction is to be made, the line start signal resets both the flip-flops in U14 to a high signal on the $\overline{Q}$ output of the lower flip-flop and to a low signal at the output of the upper flip-flop. This represents a 0 value on pin 5 which is the output of the upper flip-flop and a 1 value on pin 8 which is the output of the lower flip flop, representing a value of 2. If there is a need for additional delay, the output jumps to a value of 3. If there is a need for less delay, the value of output is a value of 1.

Referring back to FIG. 1, the detailed circuitry of line counter 80 is shown in FIG. 9. The line counter of FIG. 9 starts to count from the beginning of each video line to the end of the line and operates independently whether the system is in a scrambling mode, descrambling mode or in the bypass mode which means just passing the video through, without scrambling or descrambling. The line counter actively maintains timing of all signals of each horizontal video line from the beginning of line to the end of the line. The count of the line counter is 0 to 909 which is defined by the length of the horizontal line (approximately 63.5 μsec for NTSC). This line is divided into portions of the duration of four times the sub-carrier frequency. At the end of the count 910, which is detected by the line decoder LNDEC2 (designated U53), the line counter is reset so that it keeps counting. All of the signals decoded by the two line decoders U46 and U53 are utilized as timing signals and also to reset the memory counter.

In the left hand portion of FIG. 9 is an 8 bit counter circuit U23 to re-clock the composite sync signal into the reset logic. The composite sync signal enters U23 on both pins 1 and 2 thereof and is thereby clocked into U23. Since the phase of the composite sync signal is random with respect to the system clock the composite sync signal is random with respect to the system clock the composite sync signal needs to be redefined with respect to the system clock in order to reset the line counter. Thus U23 synchronizes the line counter 80 and also the memory address controller 70 of FIG. 1. Both of counters 70, 80 are reset with the same value. The output circuit U23 creates a timing process and the signals therefrom are decoded at PAL 2 (U36) to create a horizontal reset pulse HRESET which is applied to the load inputs of the counter. Thus, a predefined number is loaded (count 21) into the counter from a preset switch JP2 via the SETBUS; and into the memory address counter from U6 and U13 via the OFFSBUS.

FIG. 10 shows the digital circuitry of the output code formatter 110 and the digital portion of the VI. Decoder 50 of FIG. 1 which inserts and extracts decoding data for scrambling and descrambling purposes in the vertical interval of each television field. Typically, this decoding data is inserted on horizontal lines 17 and 18 of the television signal but it may be inserted at any two lines between line 14 and line 20. The purpose of this inserted decoding data is to transmit from the scrambling to the descrambling process a descrambling "key" which allows the descrambler to determine the right number with which to descramble.

This key number (in one embodiment) is a particular address in an EEPROM which holds the data to be retrieved and to actually calculate the offset numbers in order to scramble or descramble using the above-described line rotation method. The decoding data is provided on CR-BUS from the CR Registers 130 of FIG. 1 as shown in the left hand portion of FIG. 10 and fed to the parallel-to-serial converter U20. Microsequencer U21 is a state machine having six input lines connected to its input terminals T0 through T4. U21 provides the timing signals to control the CR registers and U20. Microsequencer U21 thus obtains from the control bus CR-BUS as shown in FIG. 1, i.e. from the microprocessor, data to be inserted into the video data stream via the DMUX U18 of FIG. 8 using the OC2 and INSERT control lines. Thus in the digital domain, the circuitry (U44) shuts off the data path from the video signal and forcibly inserts digital words into the video signal. These digital words include a recognition pattern, i.e. a sequence of ones and zeroes provided by U6 (in the upper left-hand portion of FIG. 10) and the PAL 16L8 shown immediately below U6. The recognition pattern allows the system during descrambling to automatically determine and locate the decoding data no matter which video lines on which it has been inserted. The only requirement is that the key is found on two video lines; first the recognition pattern is observed on the first part of the line and then the actual decoding data is found on the latter part of the line.

U20 (in the upper left-hand portion of FIG. 10) is a parallel-to-serial converter driving at terminal 6 the line OC2 which is the serial data stream timed to be inserted into the active portion of a video line in the vertical interval and is one of the inputs to the DMUX U18 of FIG. 8.

The right-hand portion of FIG. 10 is the circuitry to recover the data inserted during the scrambling process. The serial signal VI1 is received from the video input processor as described above.

The serial signal has been low pass filtered by the video input processor as described above and then processed through a comparator in order to provide a squared-up (normalized) signal. That squared-up signal drives the serial input of the serial-to-parallel converter U26. The descrambling path as shown is driven by U27, which is the identical part to U21 but is programmed for the descrambling process. U27 looks in the vertical interval of every active video line for the above-described recognition pattern which is supplied to two 8-bit comparators U32 and U41 as shown on the right-hand portion of FIG. 10. When the recognition pattern has been loaded into U32 and U41, the output pins 19 of both U32 and U41 are interrogated by the sequencer U27. If there is a match, then the remainder of the loaded signal is assumed to be the data which has been transmitted during the vertical interval. The data is then loaded onto the VII Bus and stored in the VII Register by the control signals of micro-sequencer U27, thus providing the feedback to the microprocessor as shown in FIG. 1.

FIG. 12 shows the interconnect for the circuitry of FIG. 1 to the system backplane which interconnects the three above-described processor boards which are processor 1, processor 2 and the controller. Also shown in FIG. 12 is a vertical counter including U38 and U31 which is a ten bit counter which counts to the number 525 divided by 2 (corresponding to the number of lines of NTSC television in one frame). This counter is triggered by twice the horizontal scan rate (because of interlace requirements) and addresses an EEPROM U37 which creates the vertical timing signals such as vertical blanking start and end of the vertical interval and the location to insert the VII data.

Figure 5A:
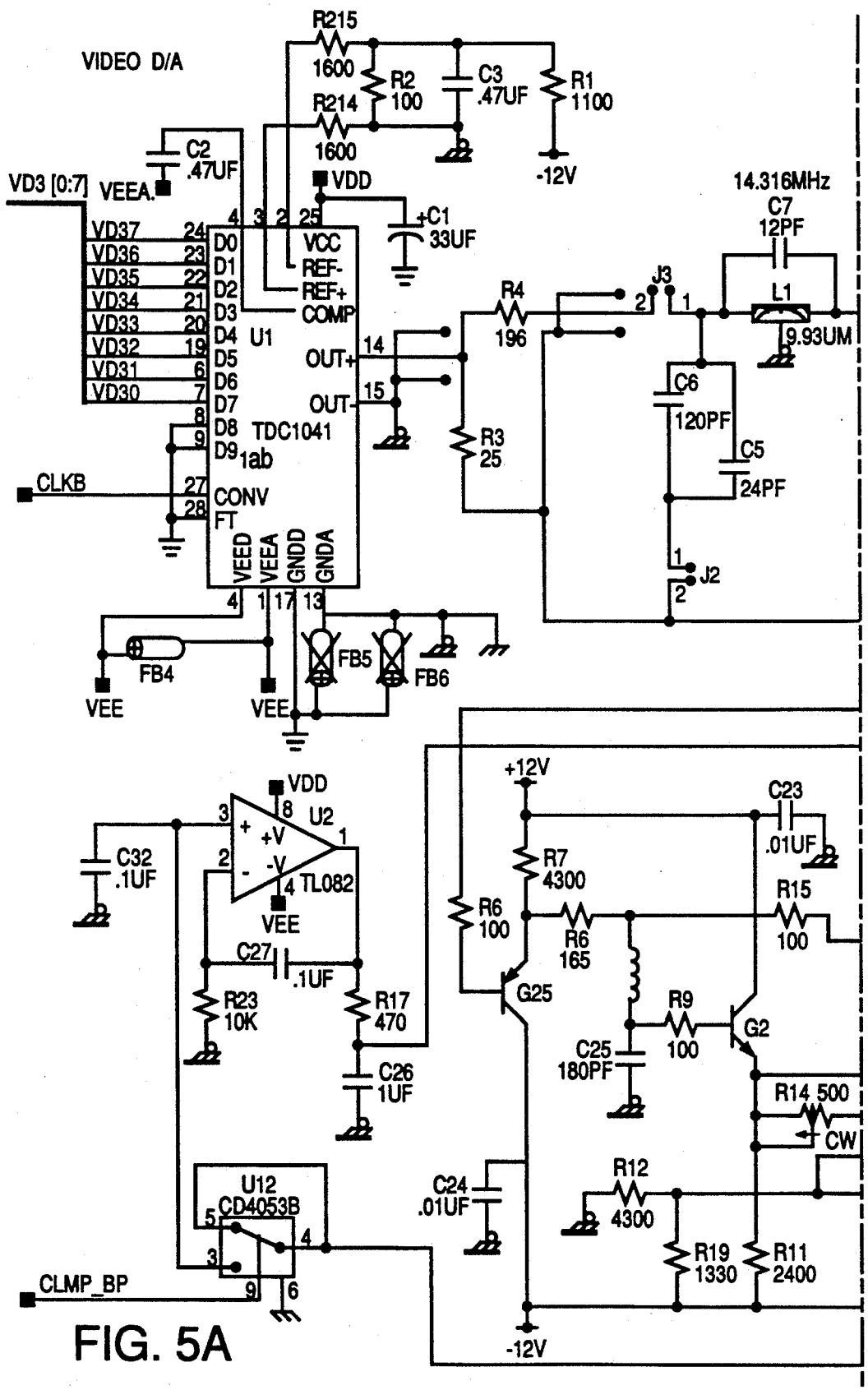
Figure 5B:
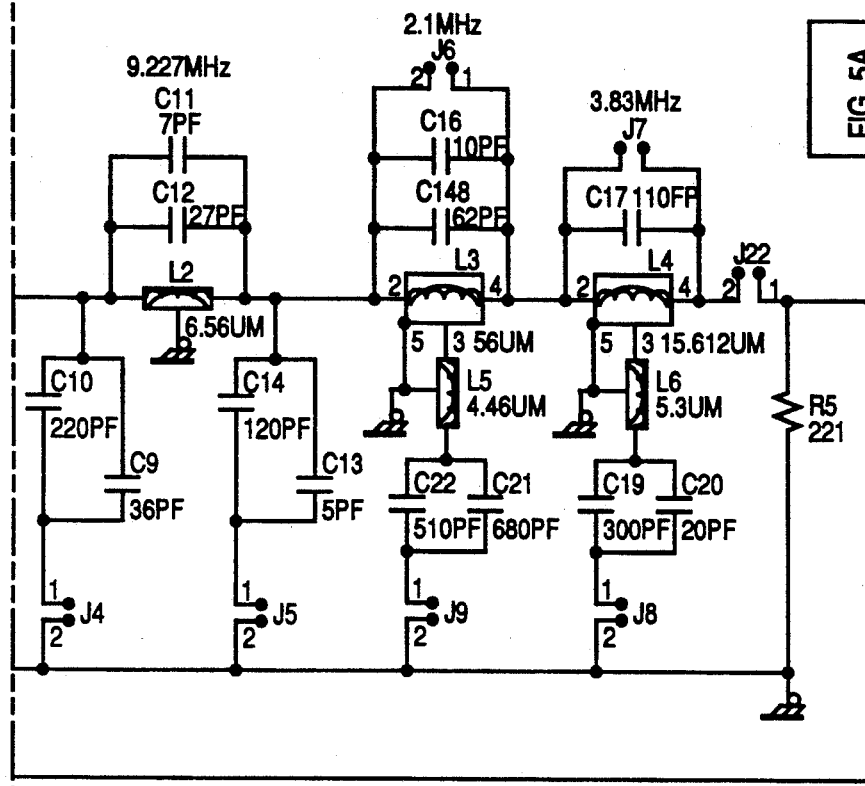
Figure 5B:
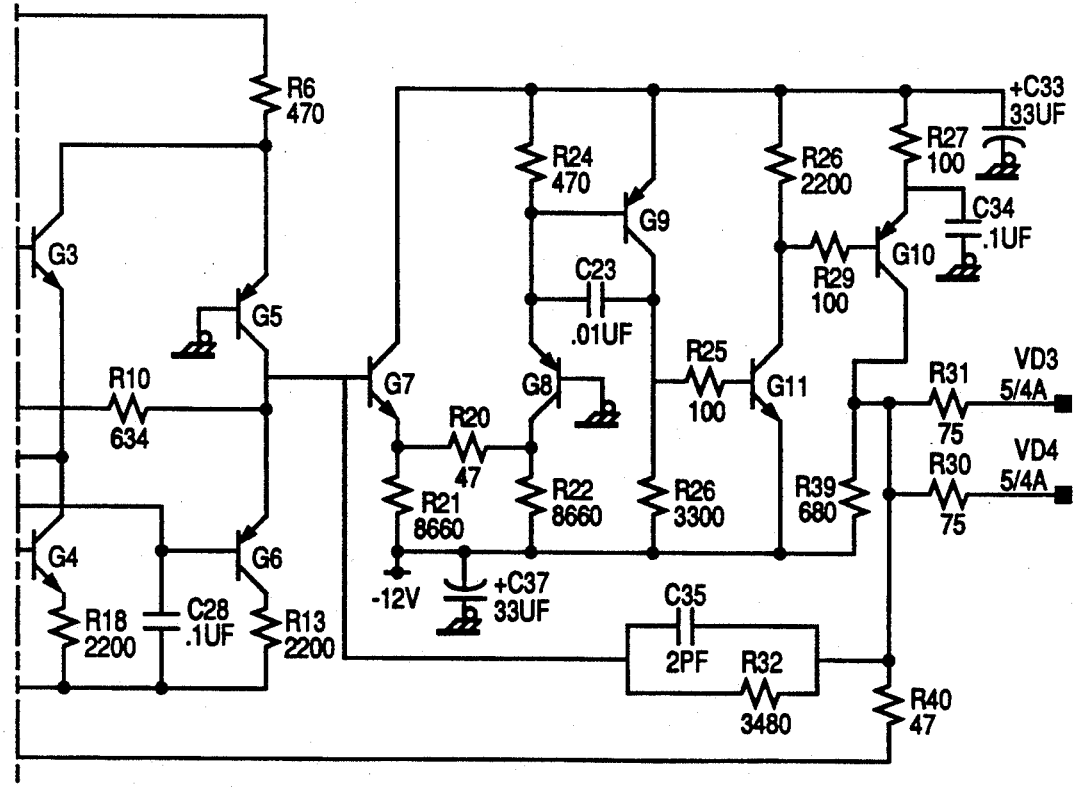
Figure 6A:
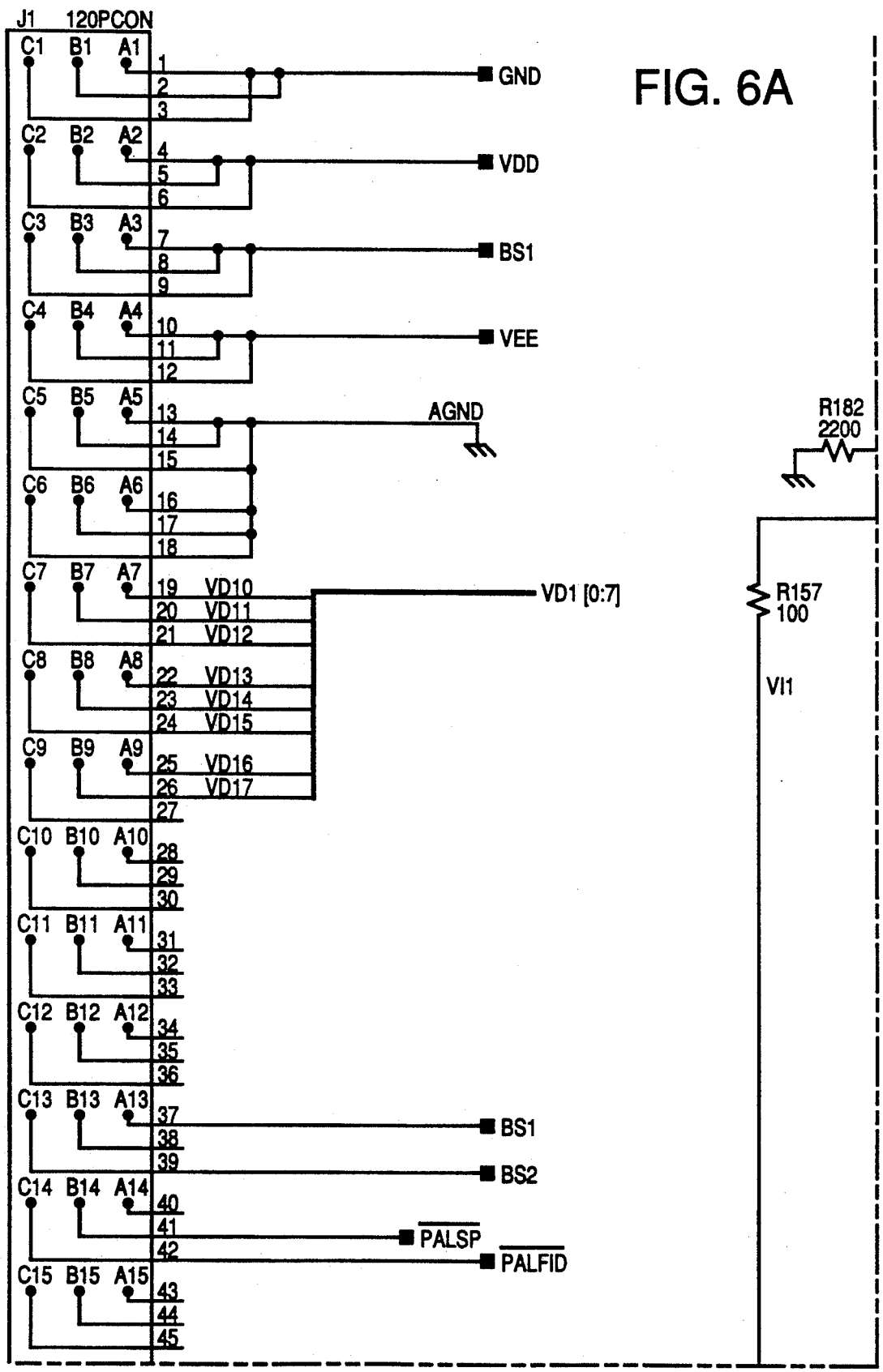
Figure 6B:
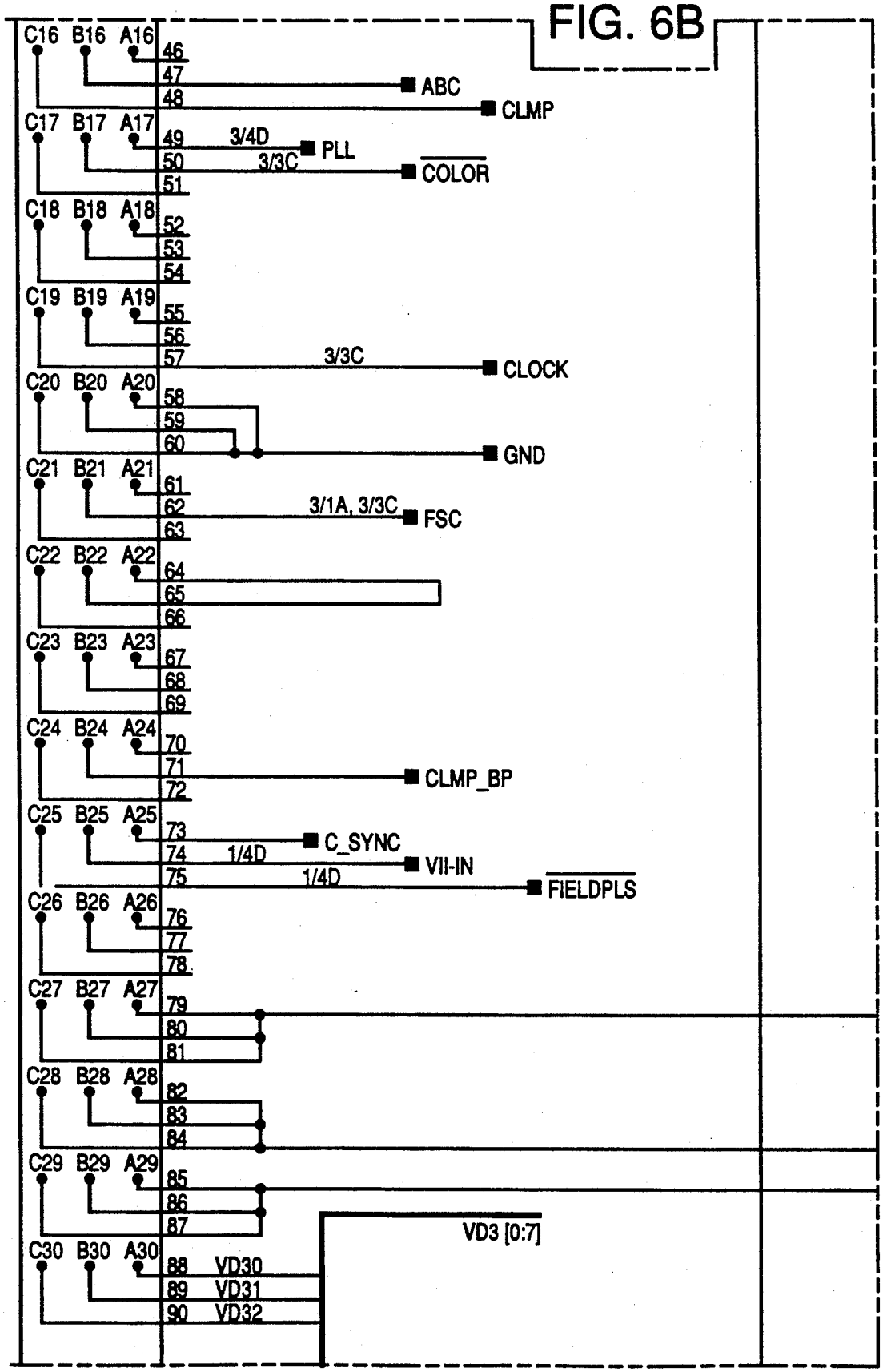
Figure 6C:
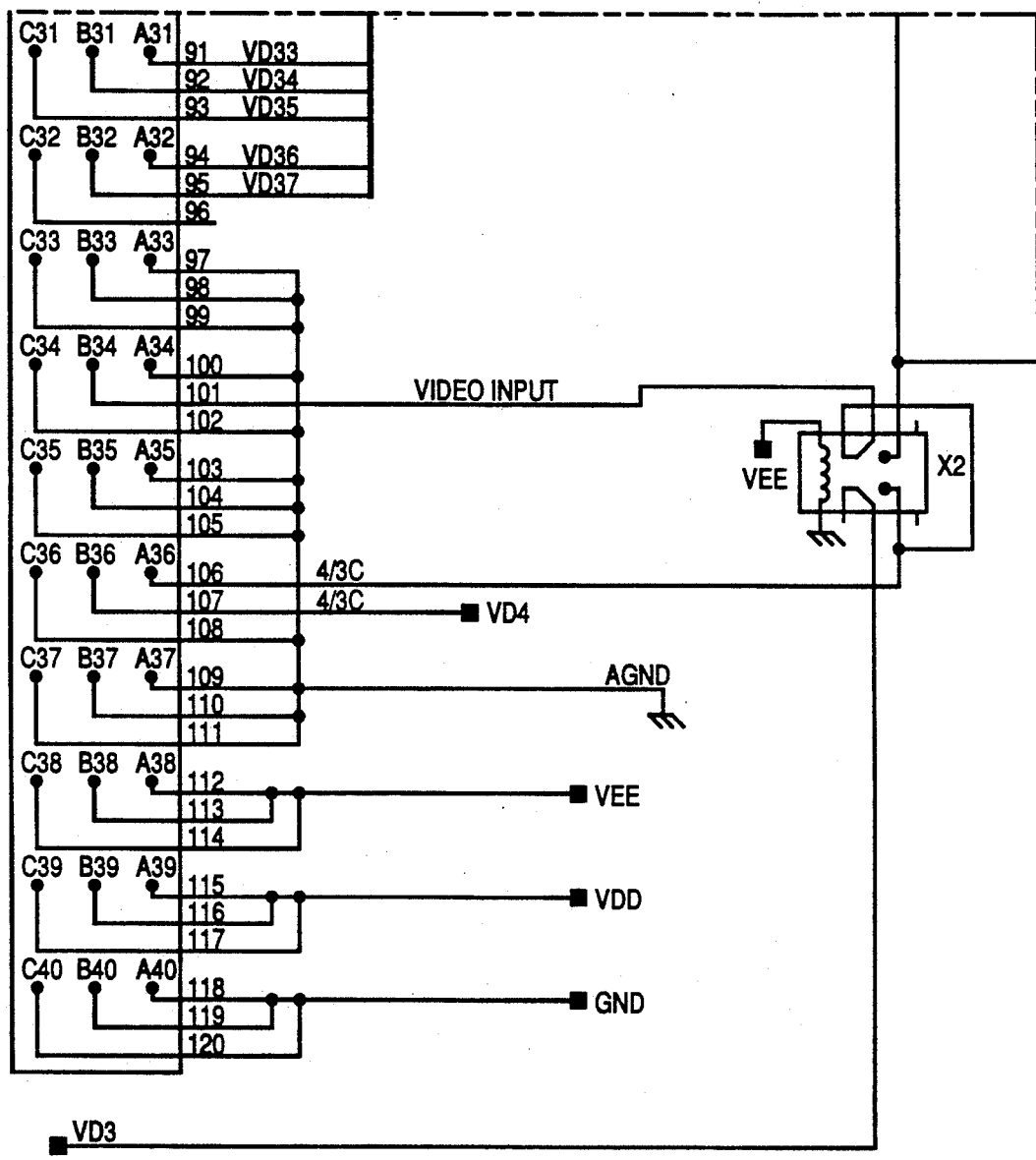
Figure 6D:
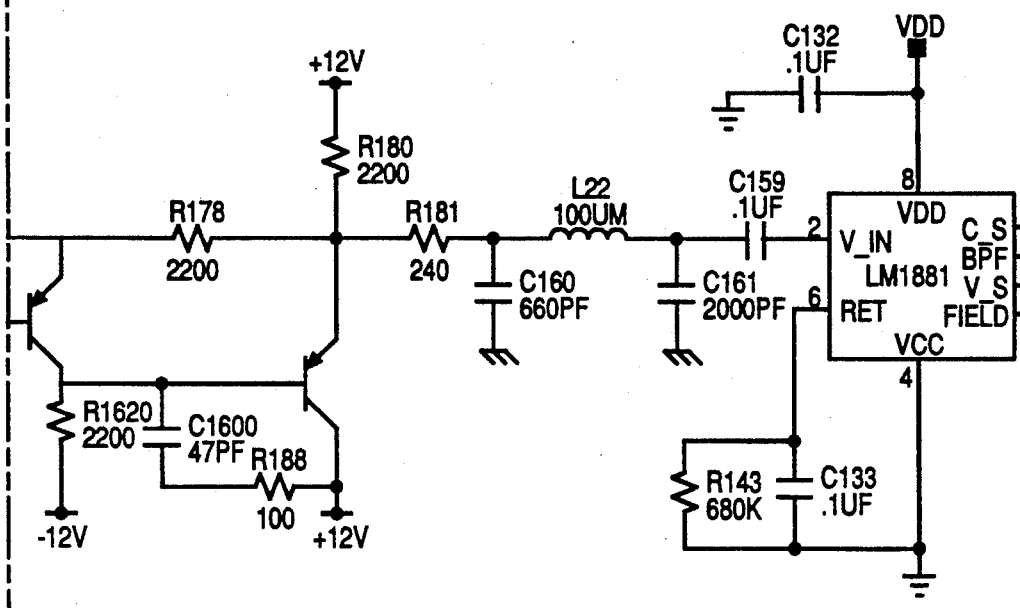
Figure 6E:
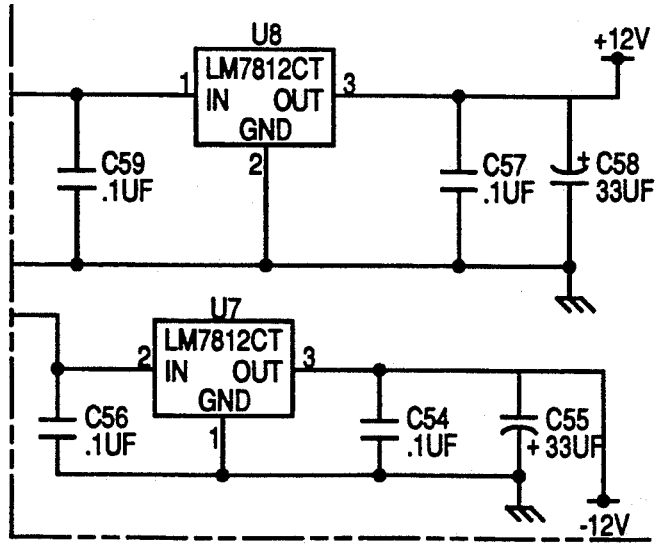
Figure 6F:
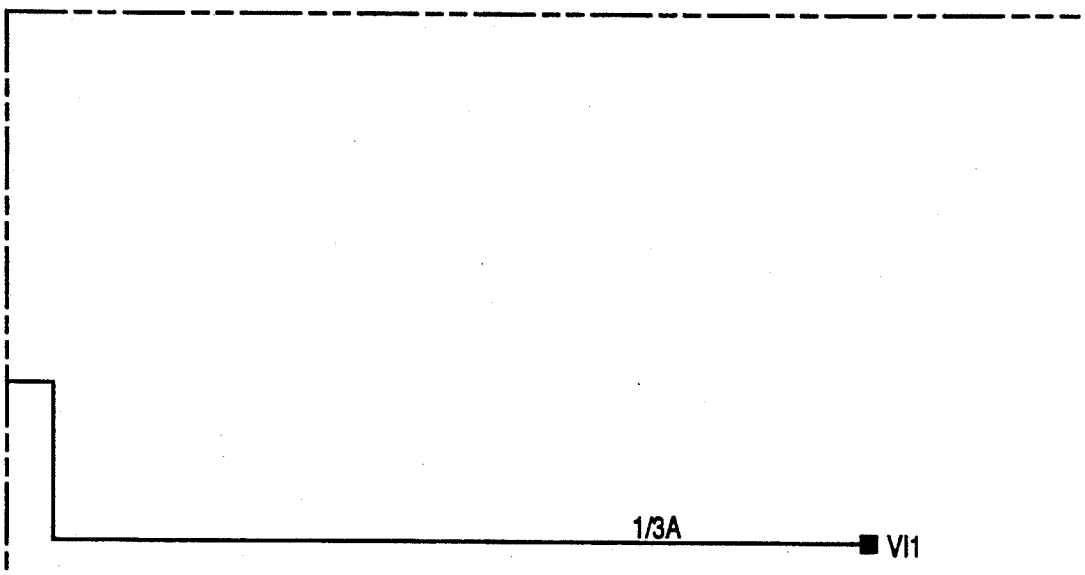
Figure 6G:
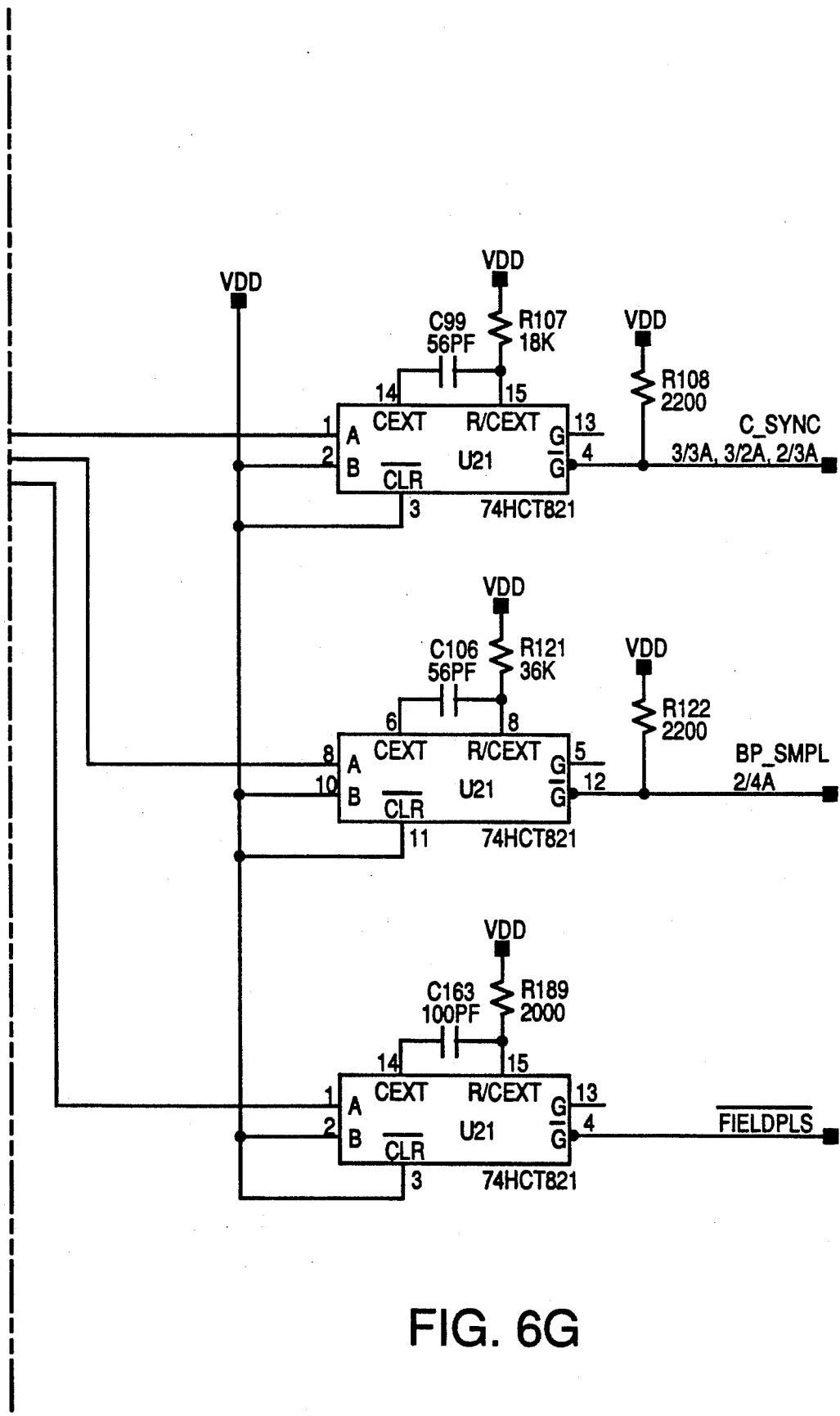
Figure 7A:
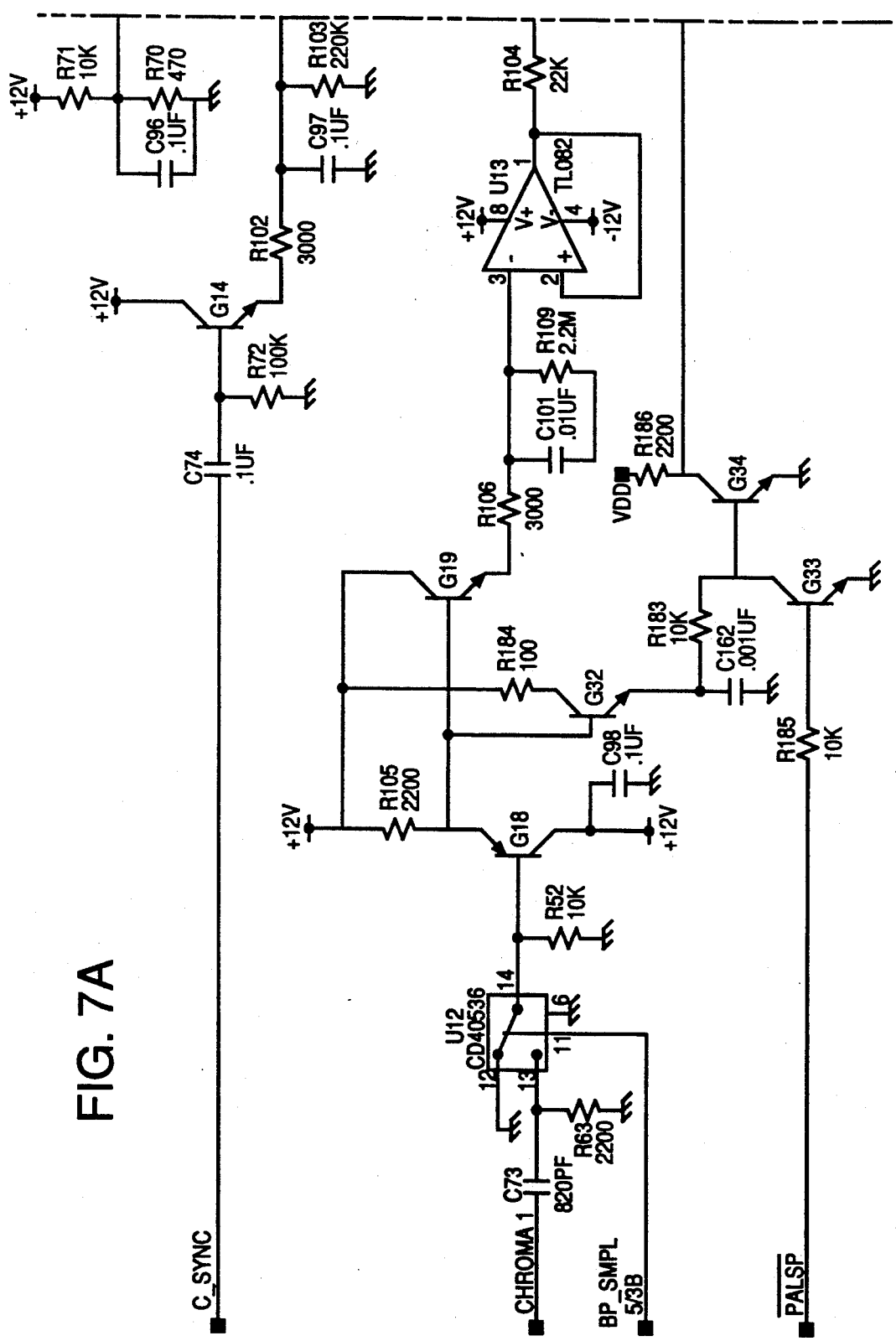
Figure 7B:
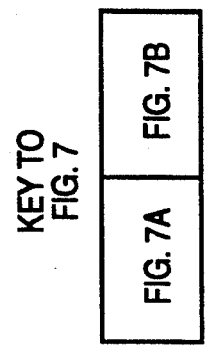
Figure 7B:
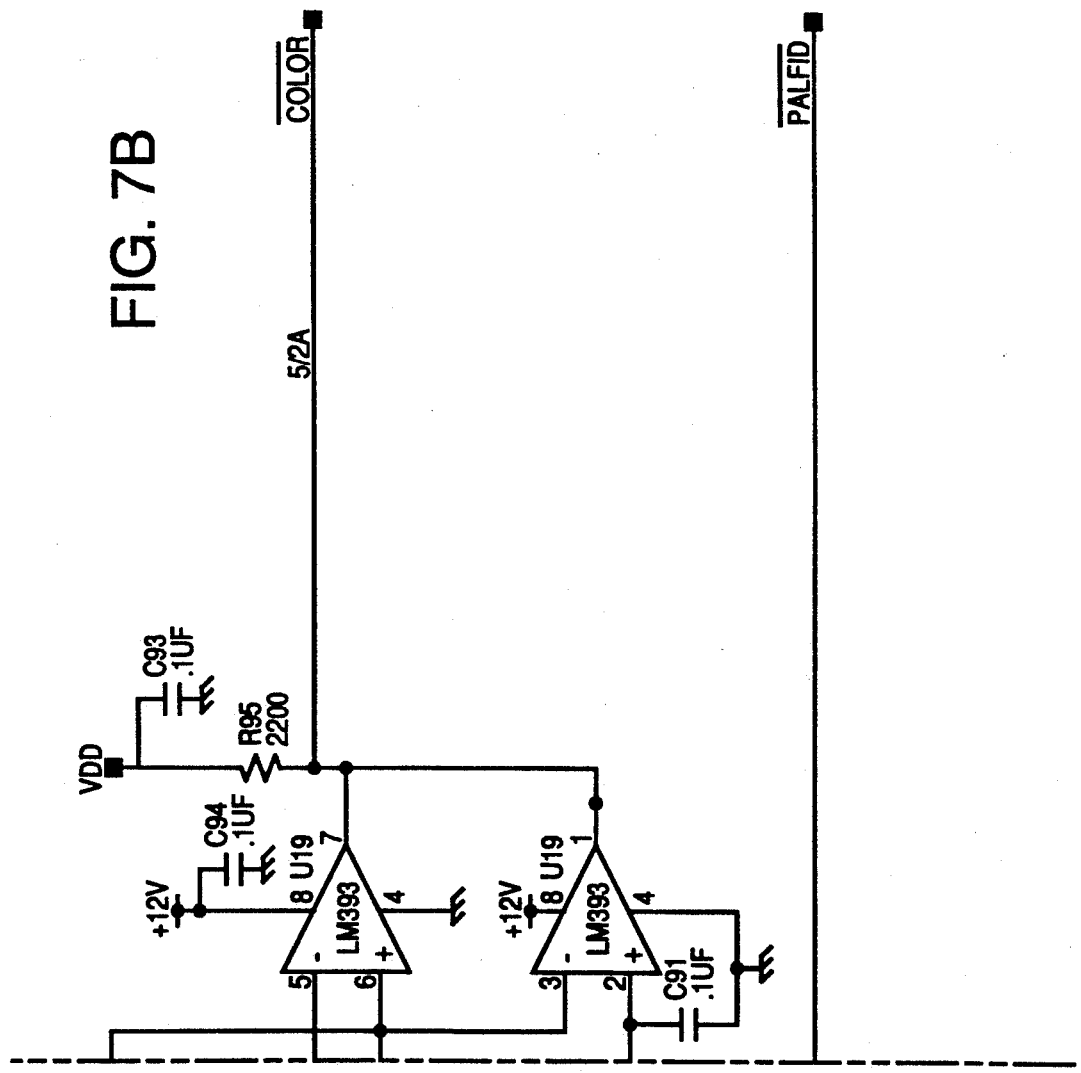
Figure 8A:
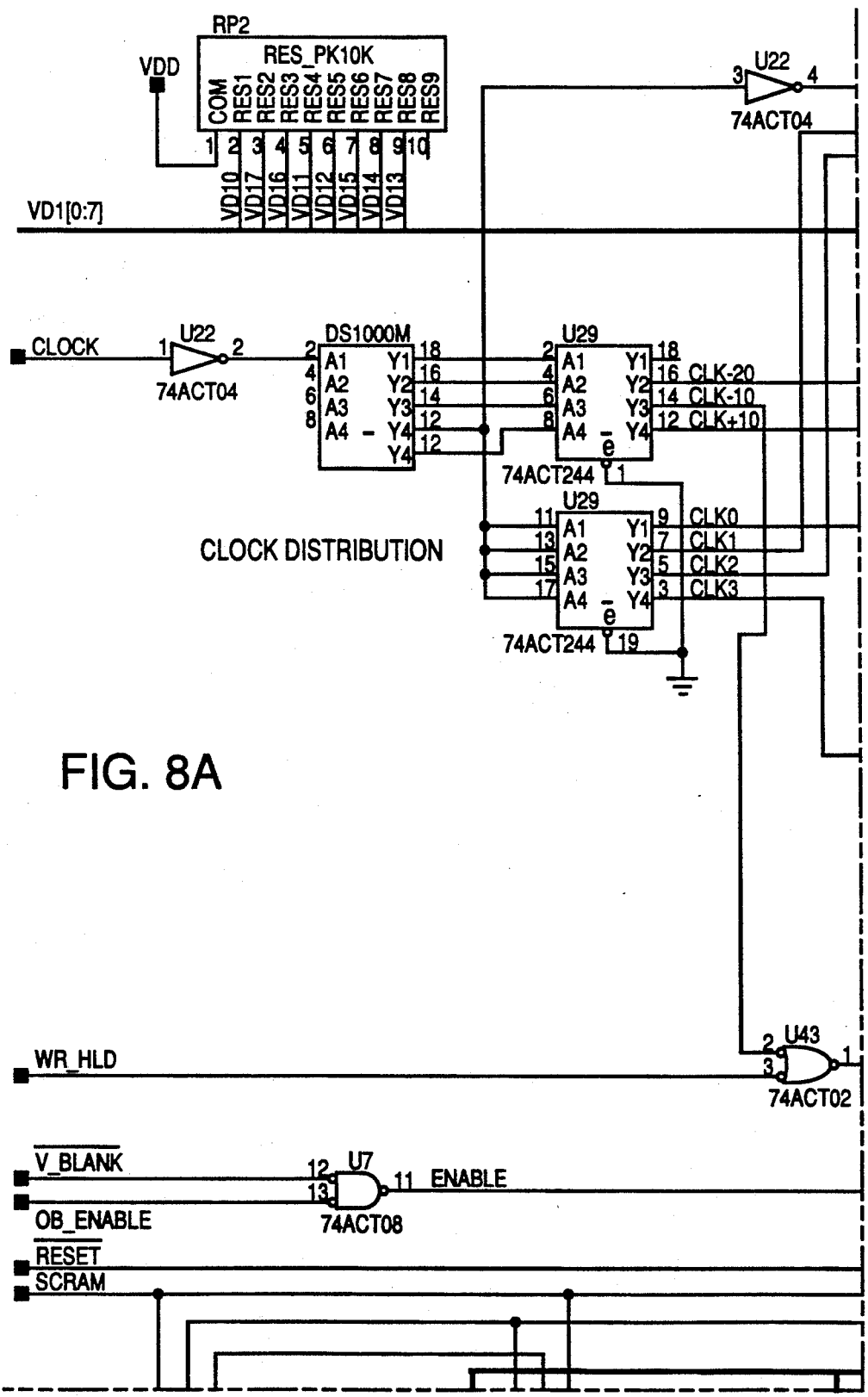
FIGS. 8A-12O show schematically digital video processing circuitry in accordance with the invention.
Figure 8B:
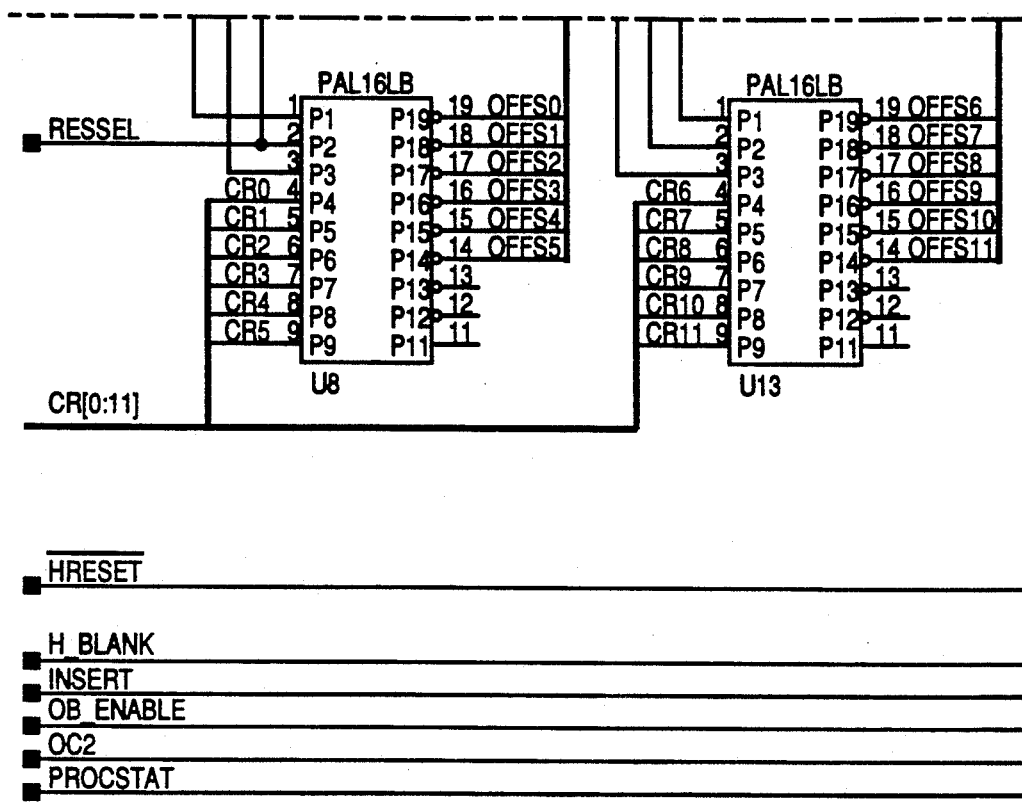
Figure 8C:
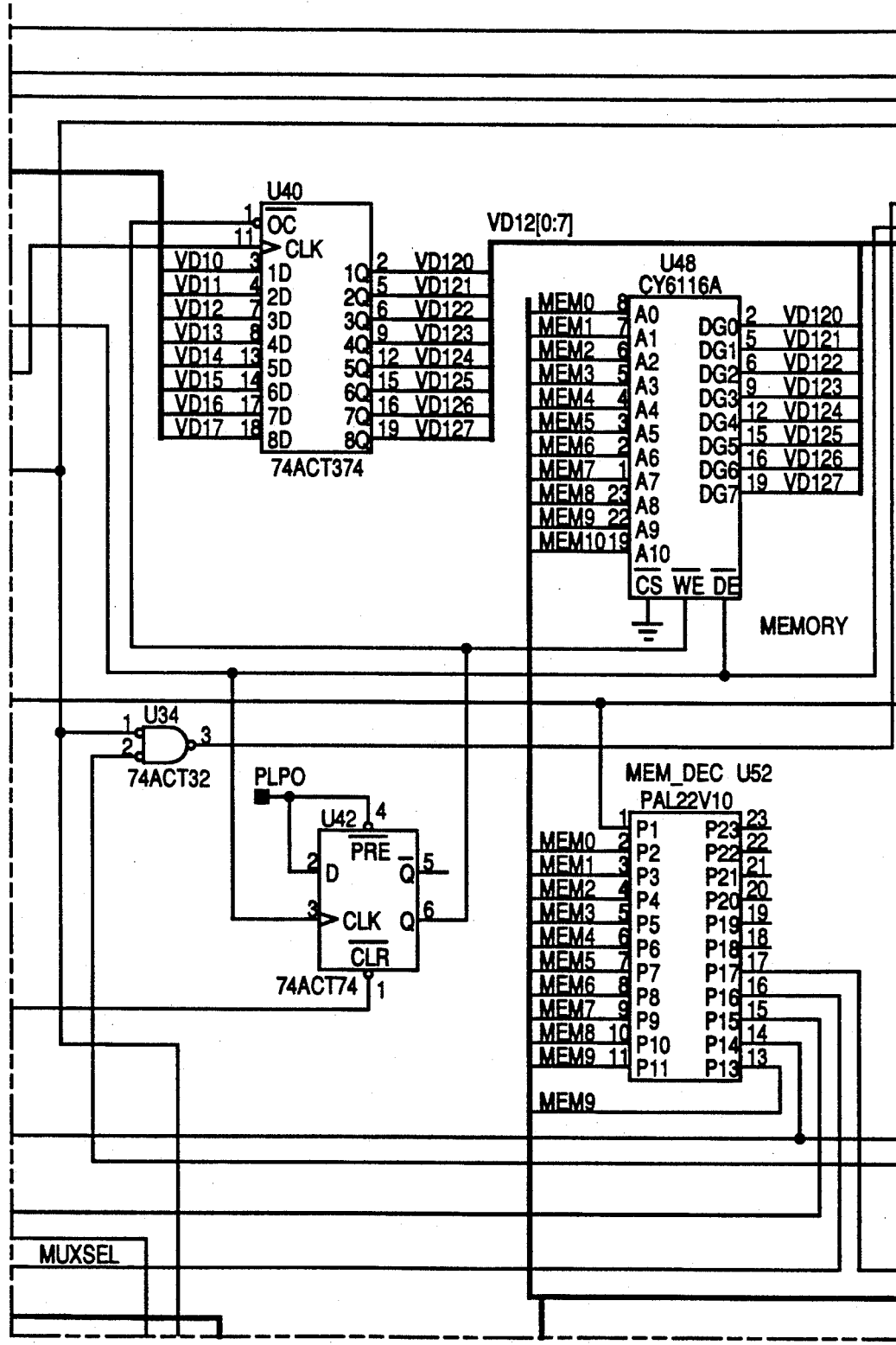
Figure 8D:
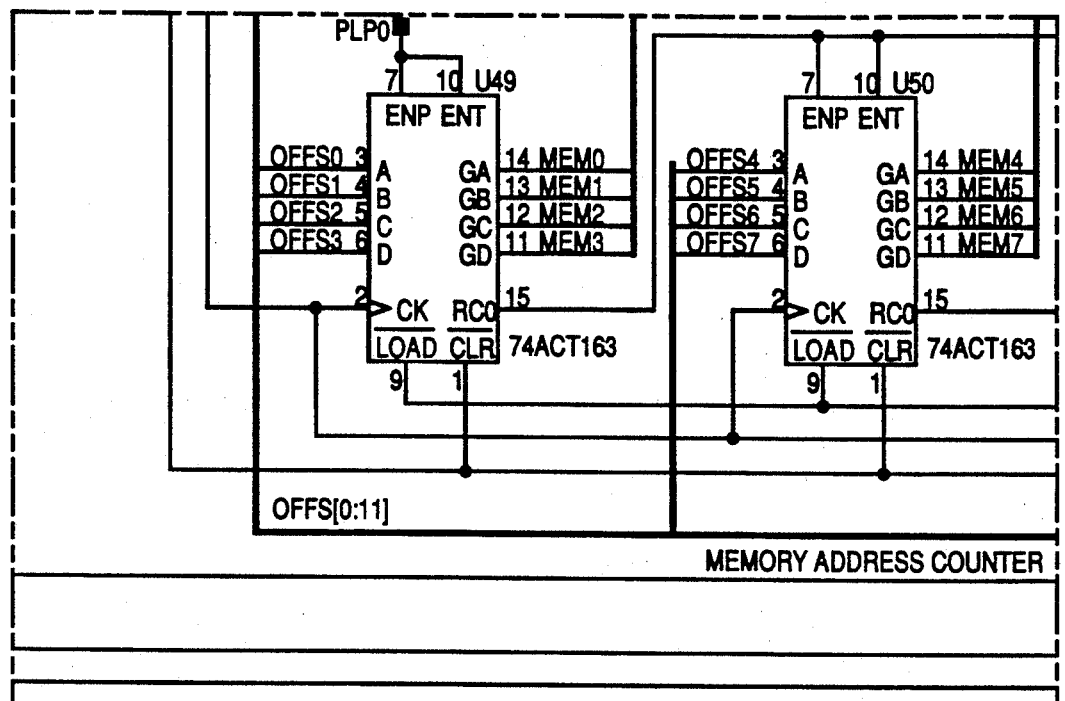
Figure 8E:
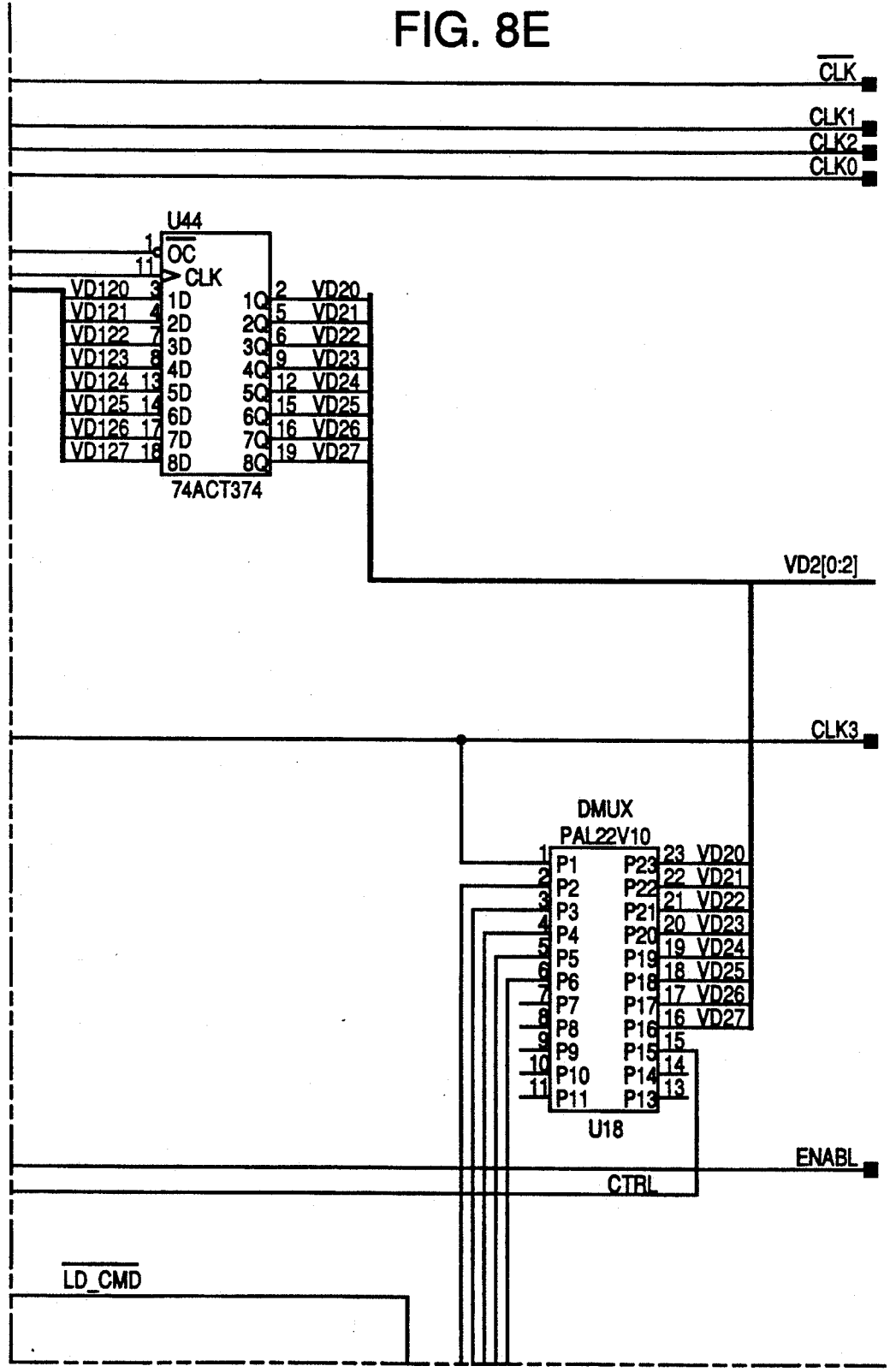
Figure 8F:
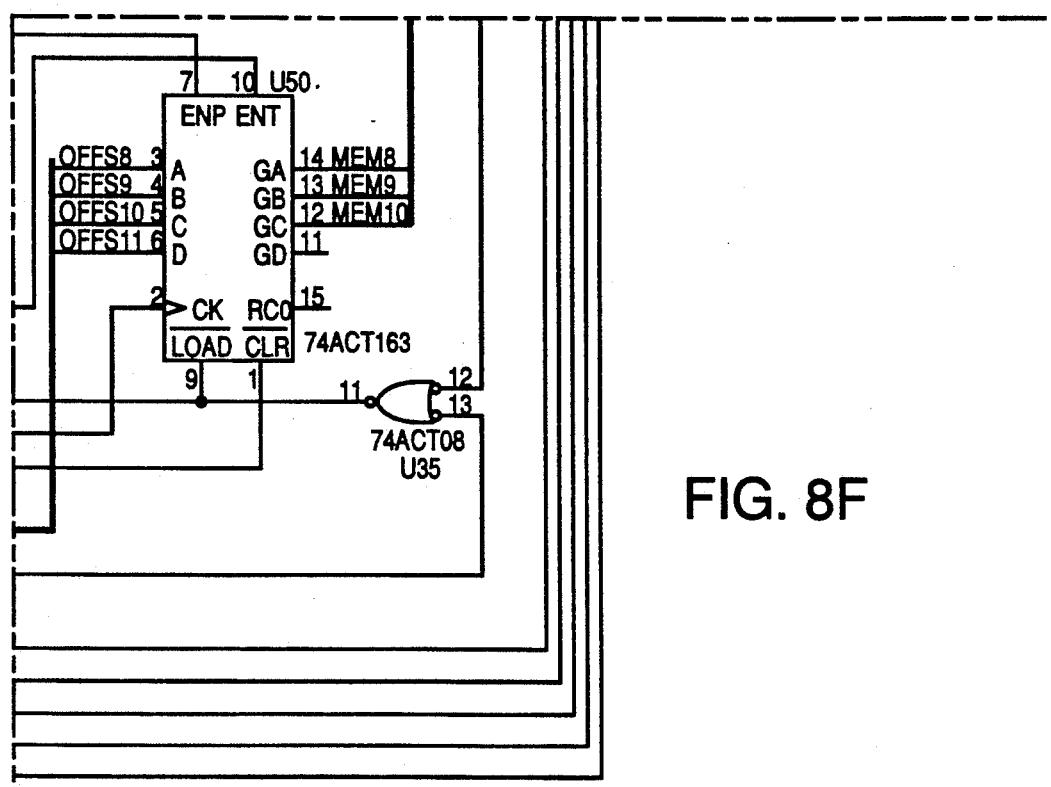
Figure 9A:
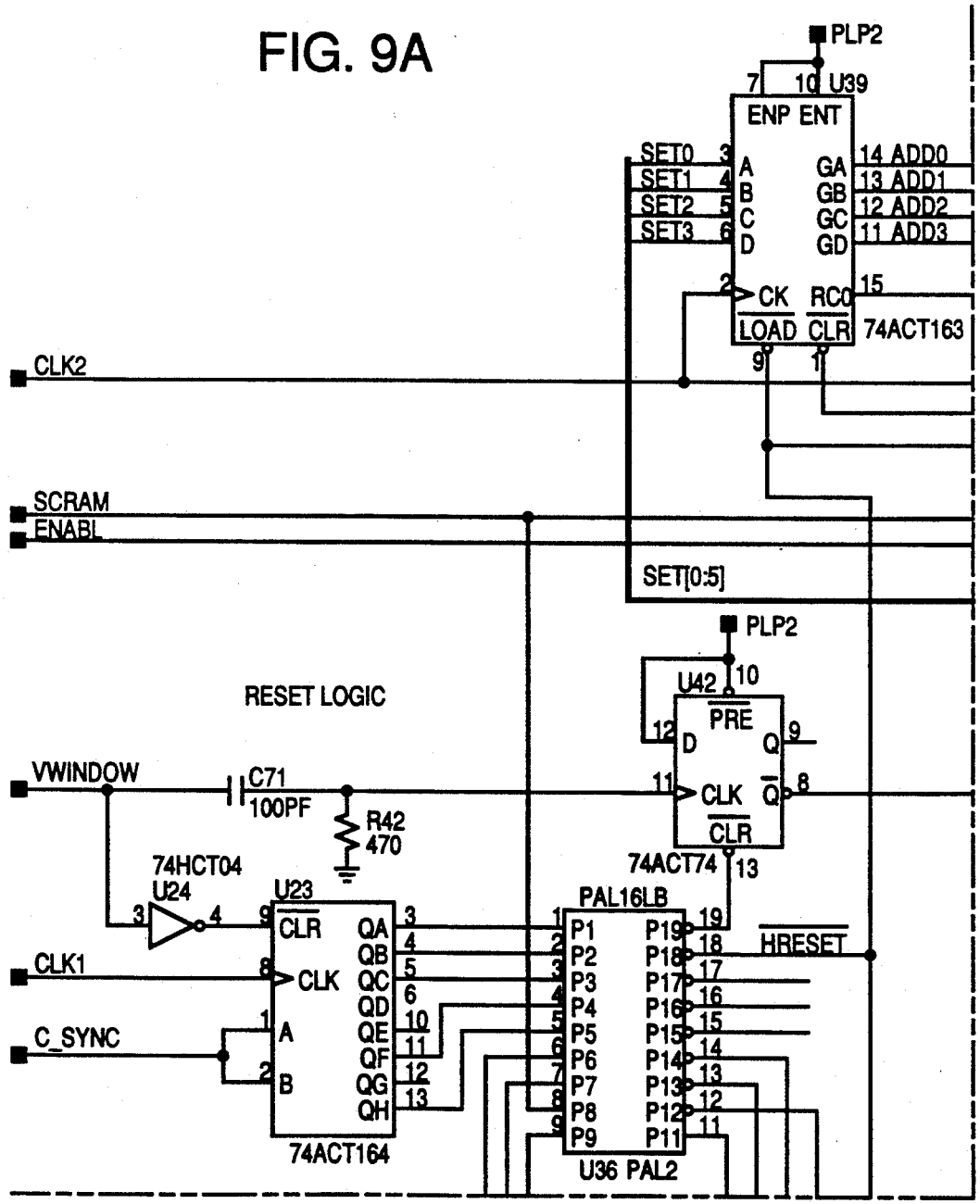
Figure 9B:
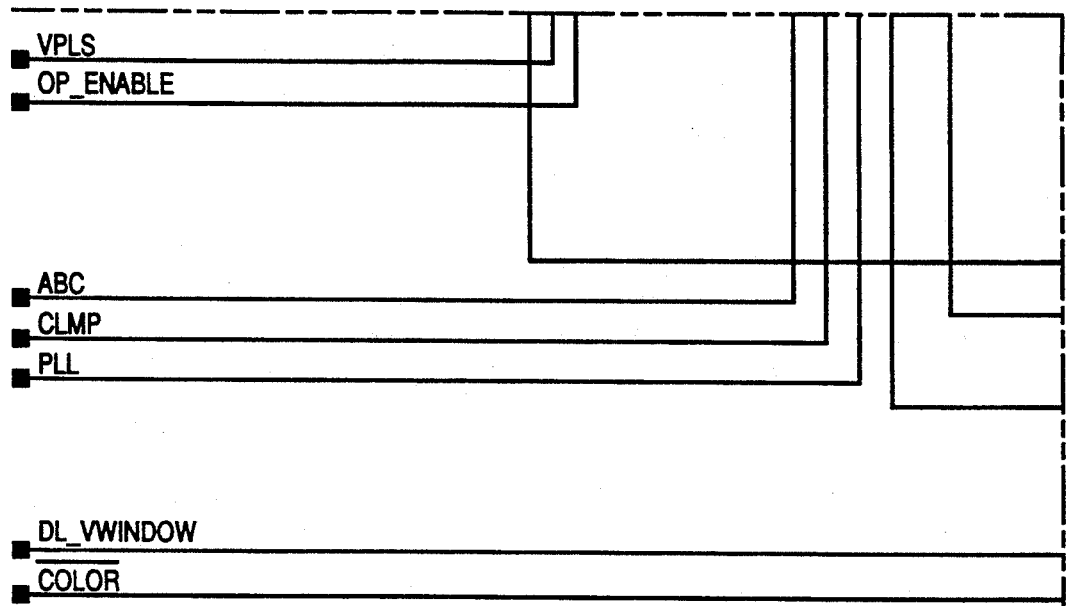
Figure 9C:
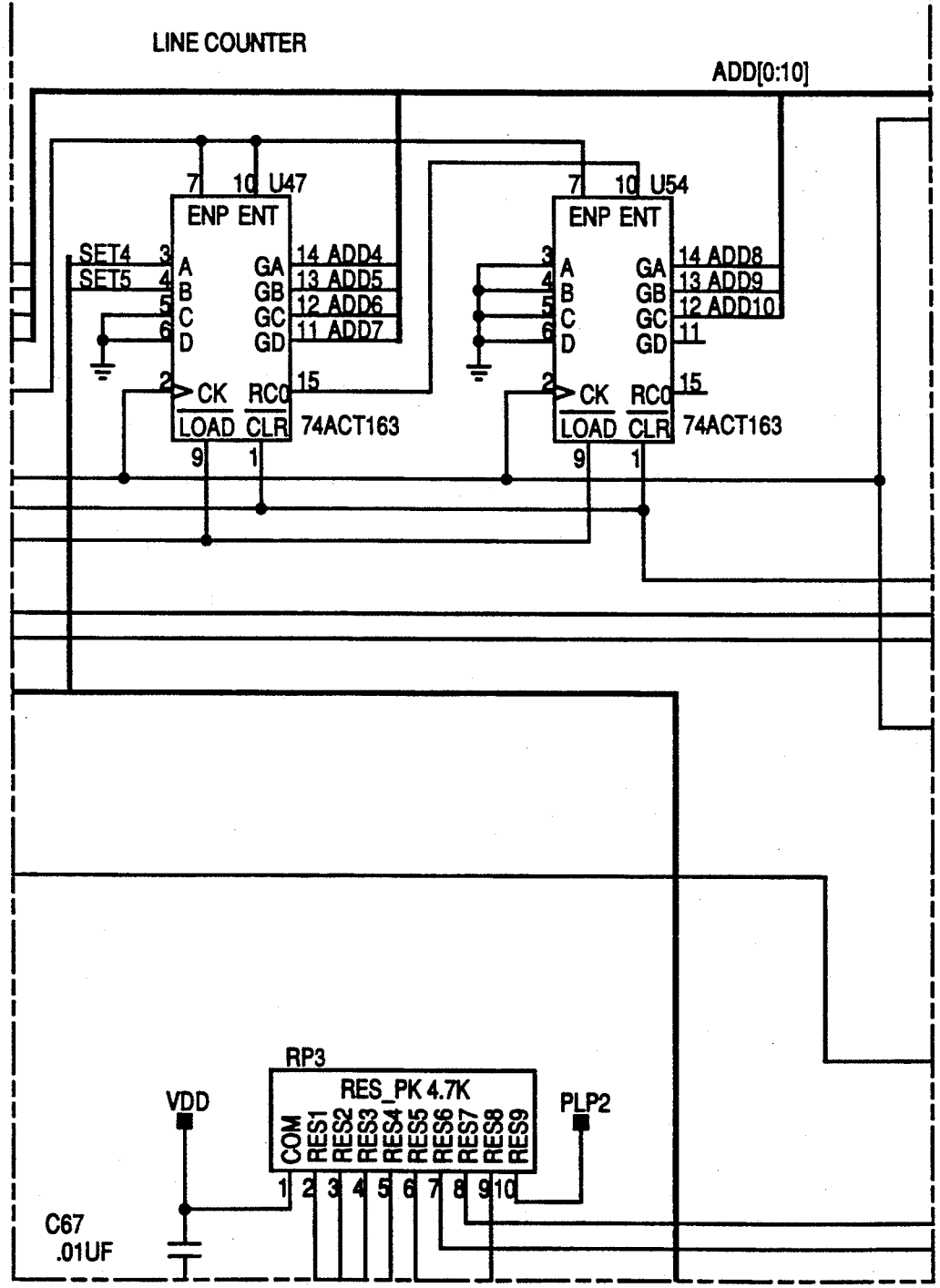
Figure 9D:
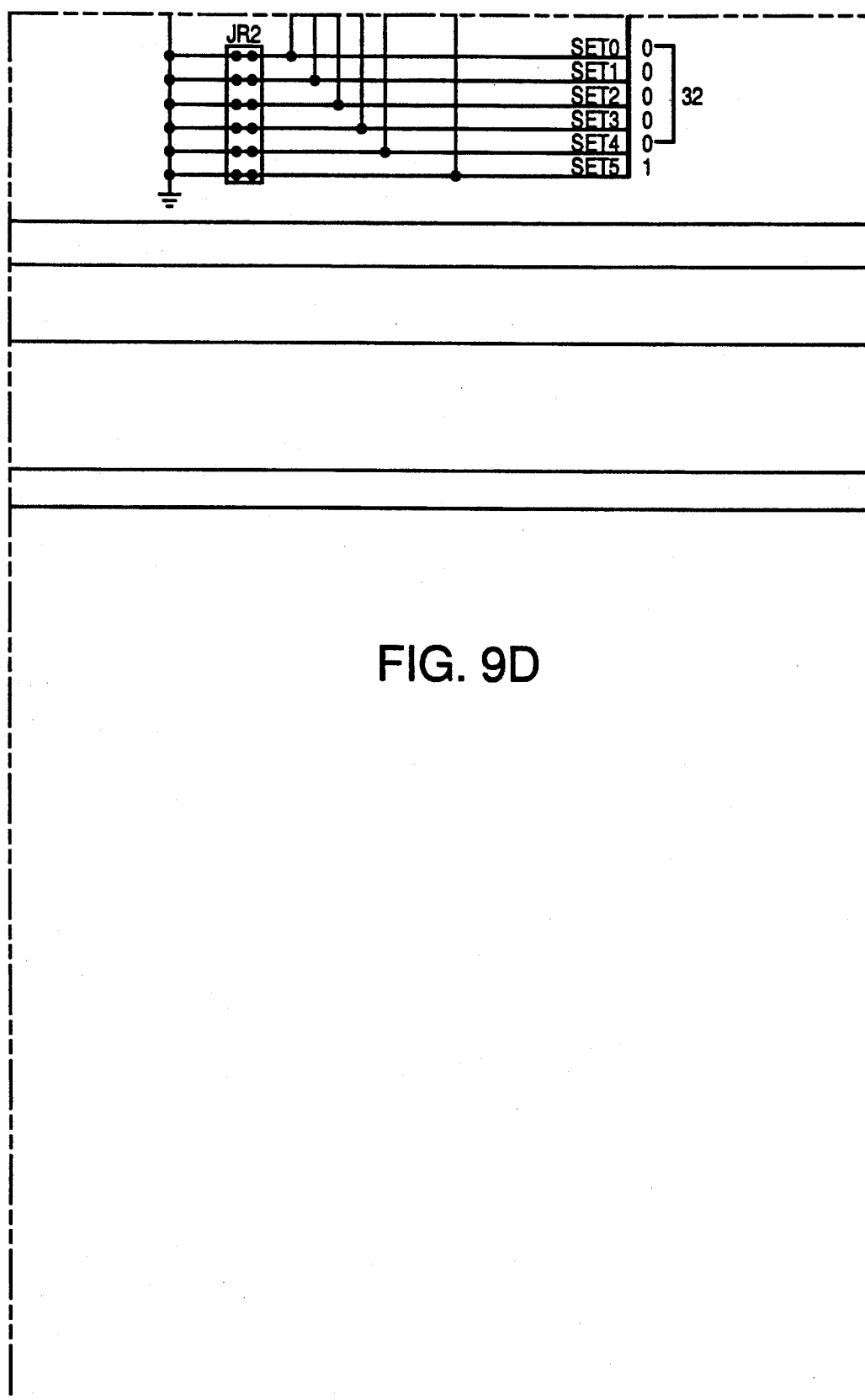
Figure 9E:
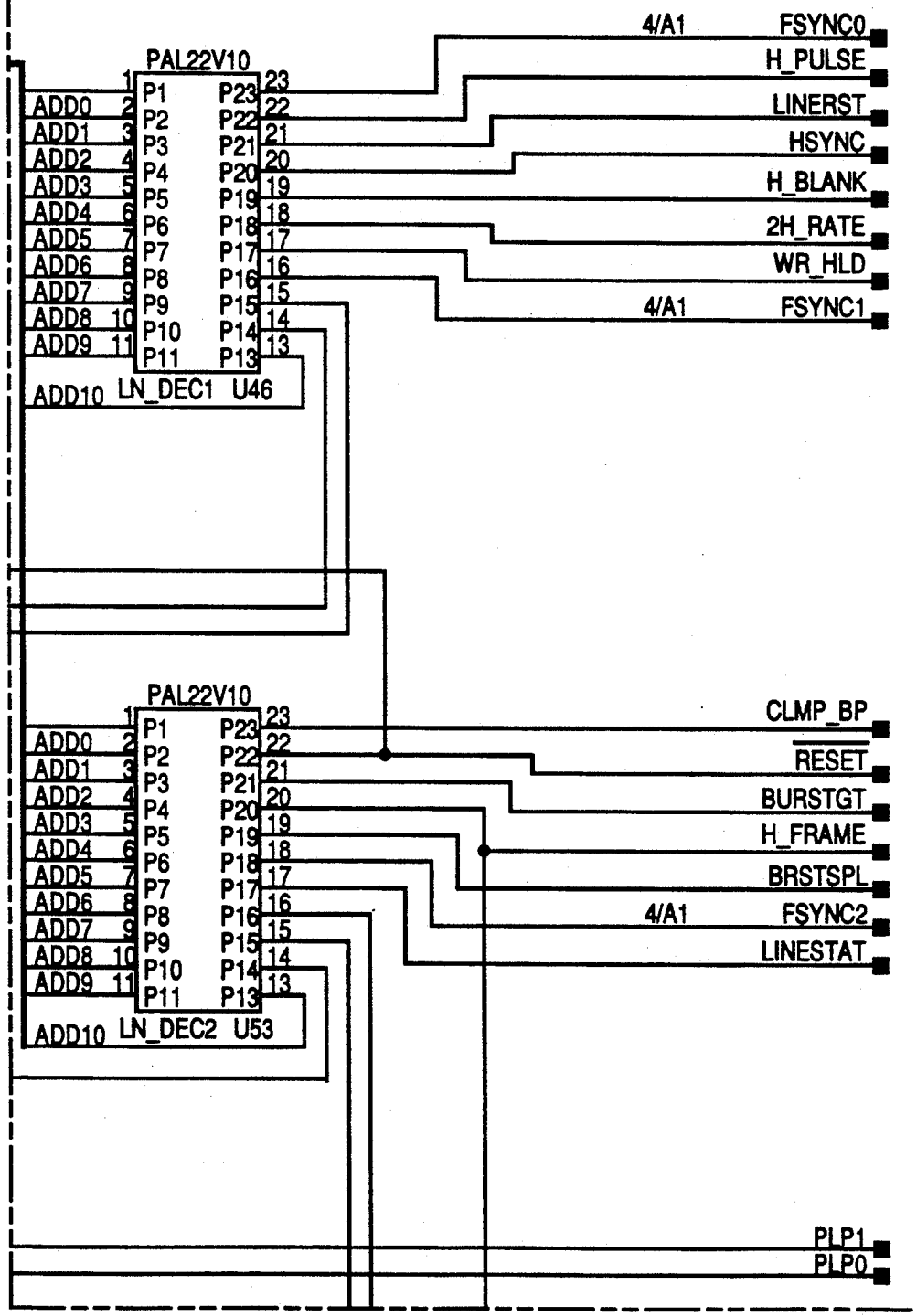
Figure 9F:
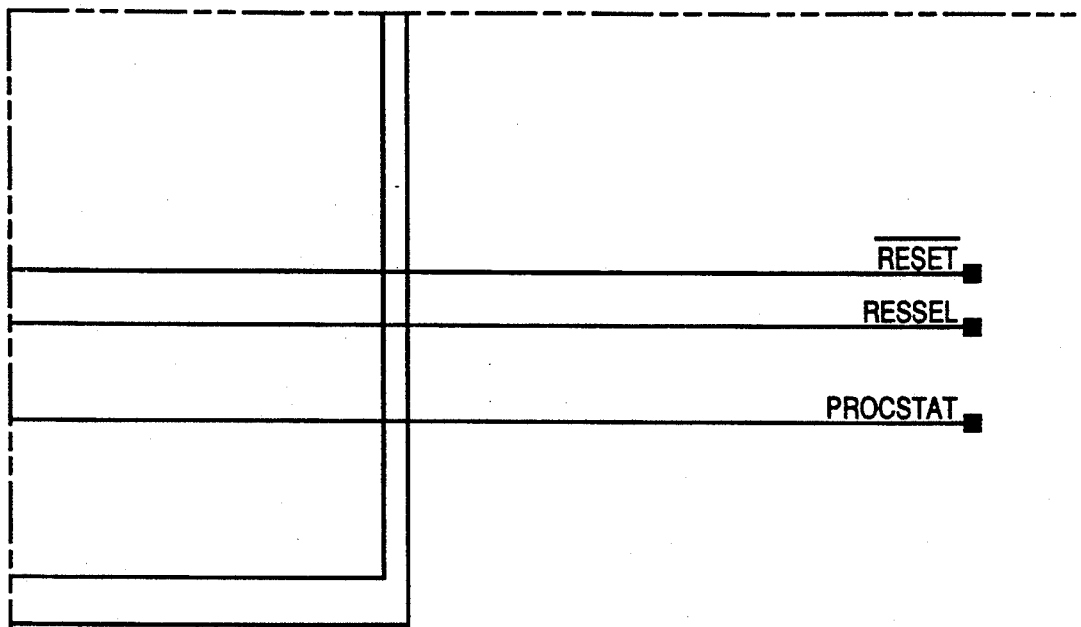
Figure 10A:
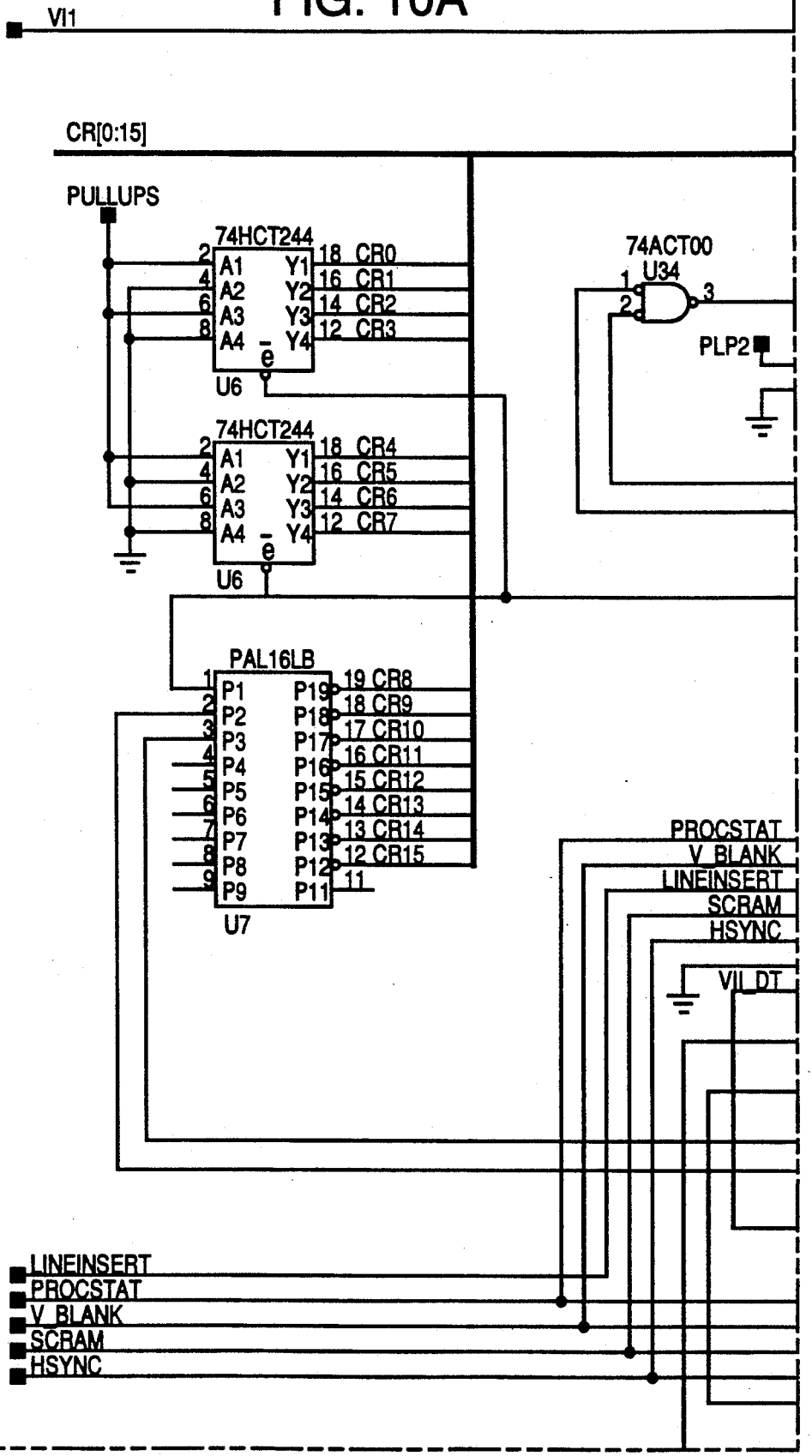
Figure 10B:
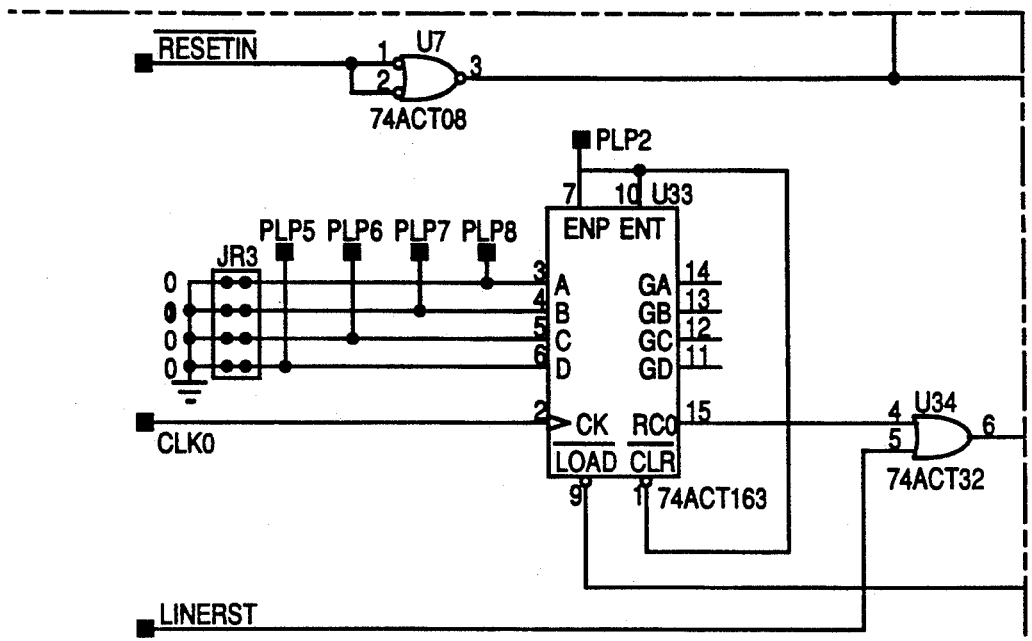
Figure 10C:
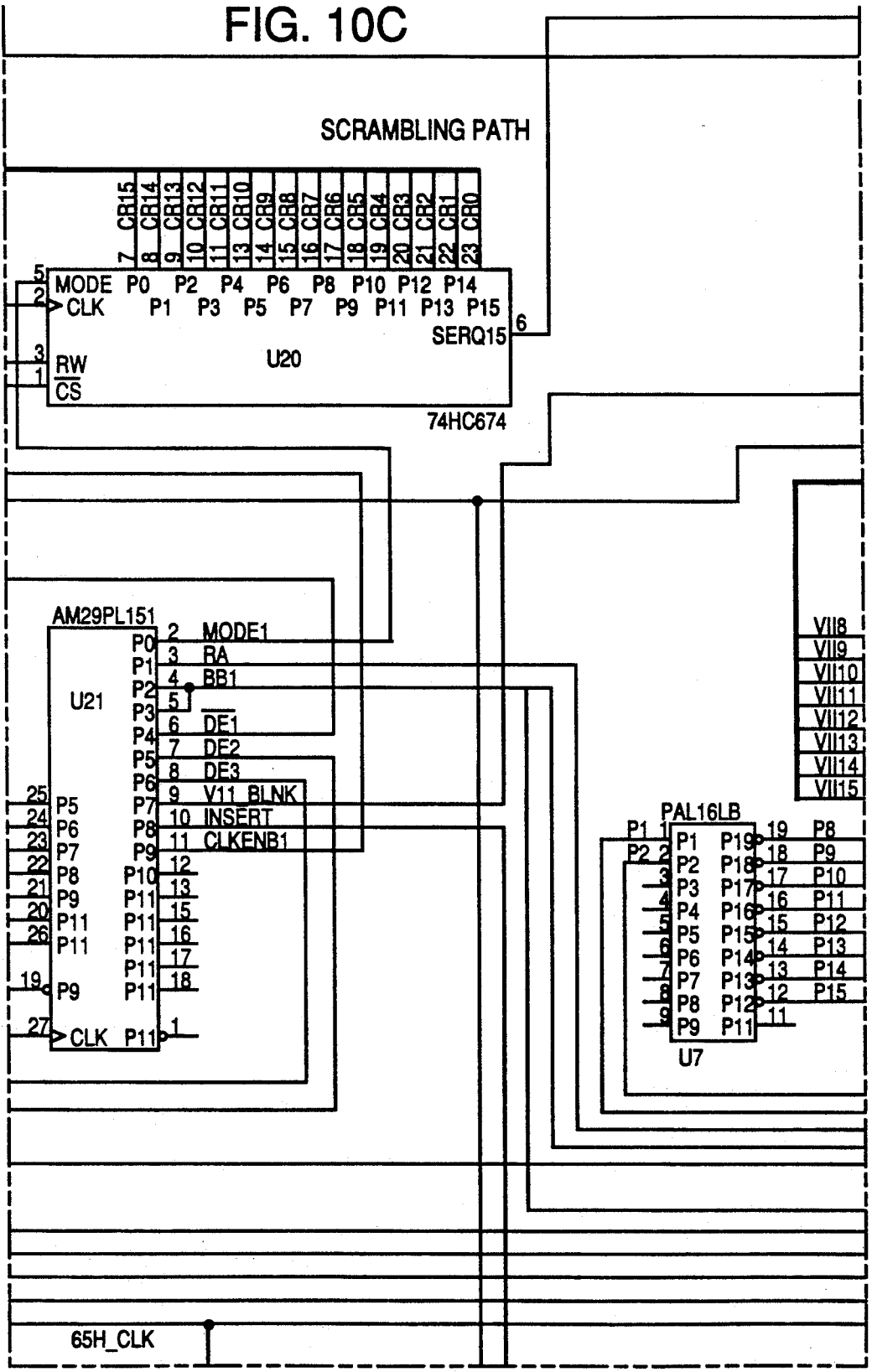
Figure 10D:
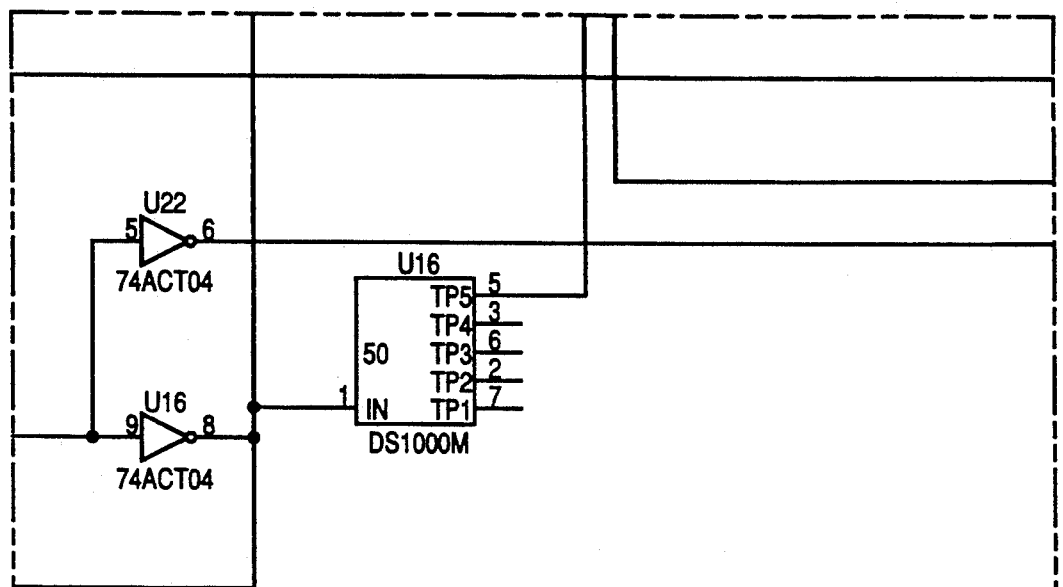
Figure 10E:
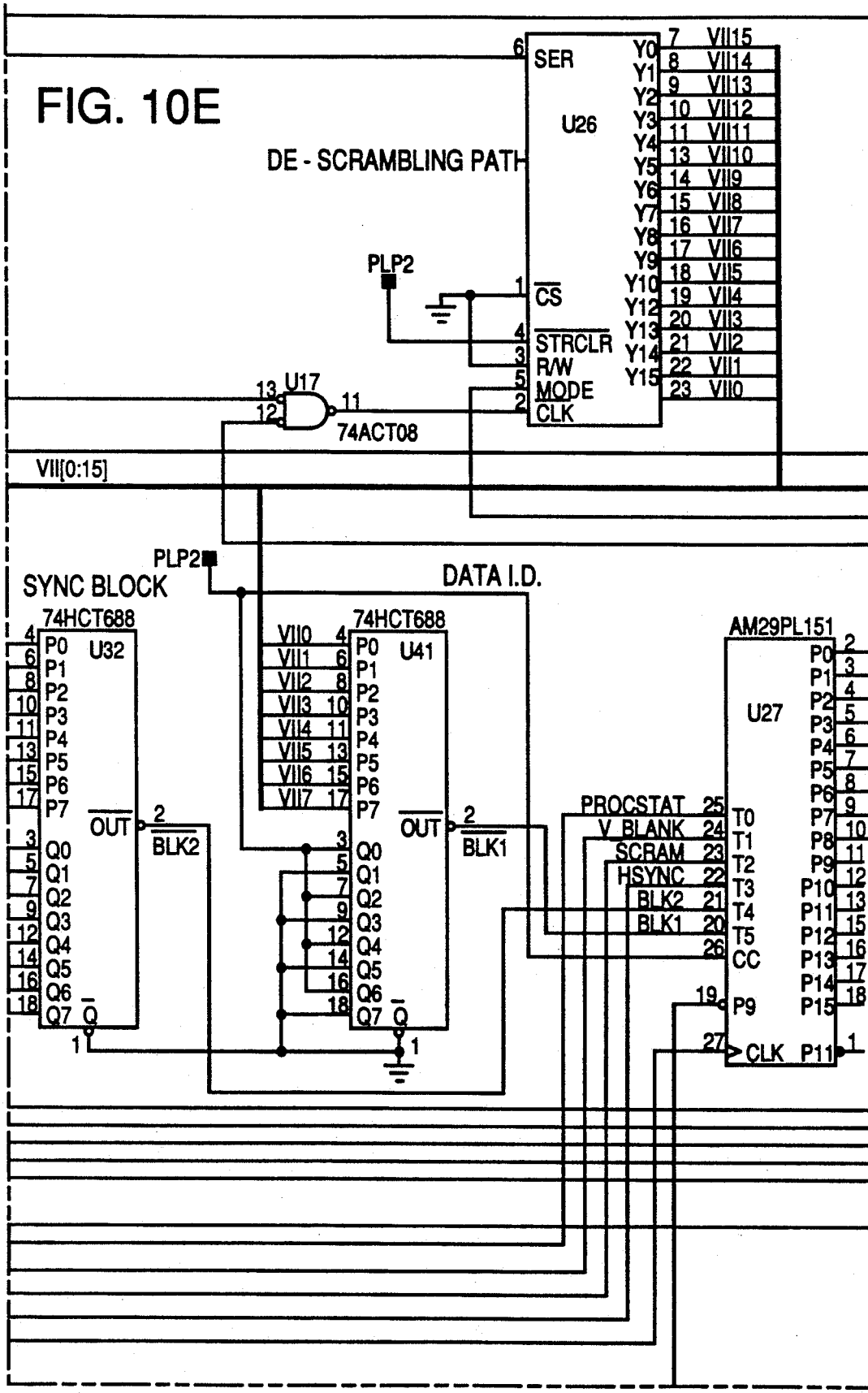
Figure 10G:
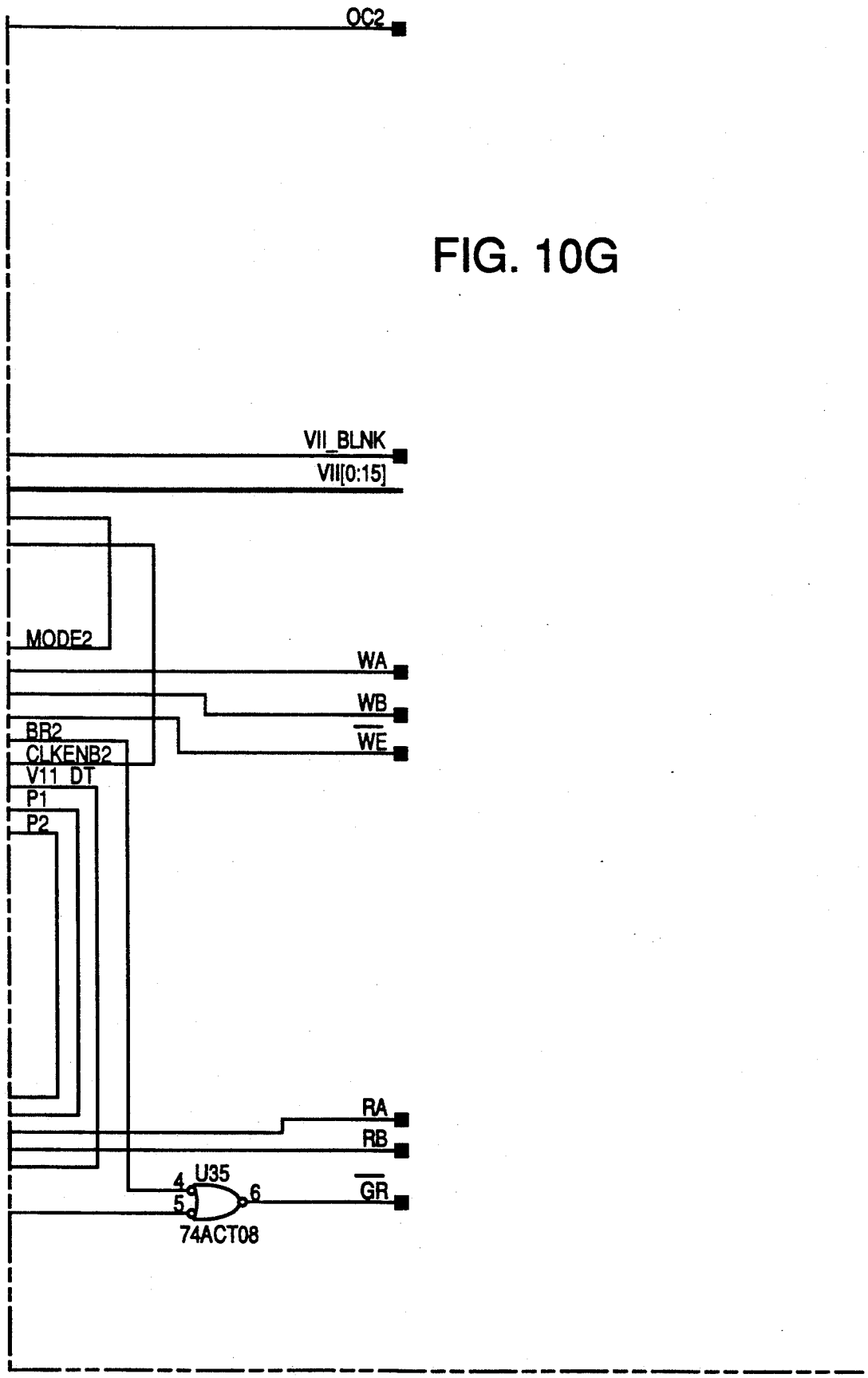
Figure 10H:
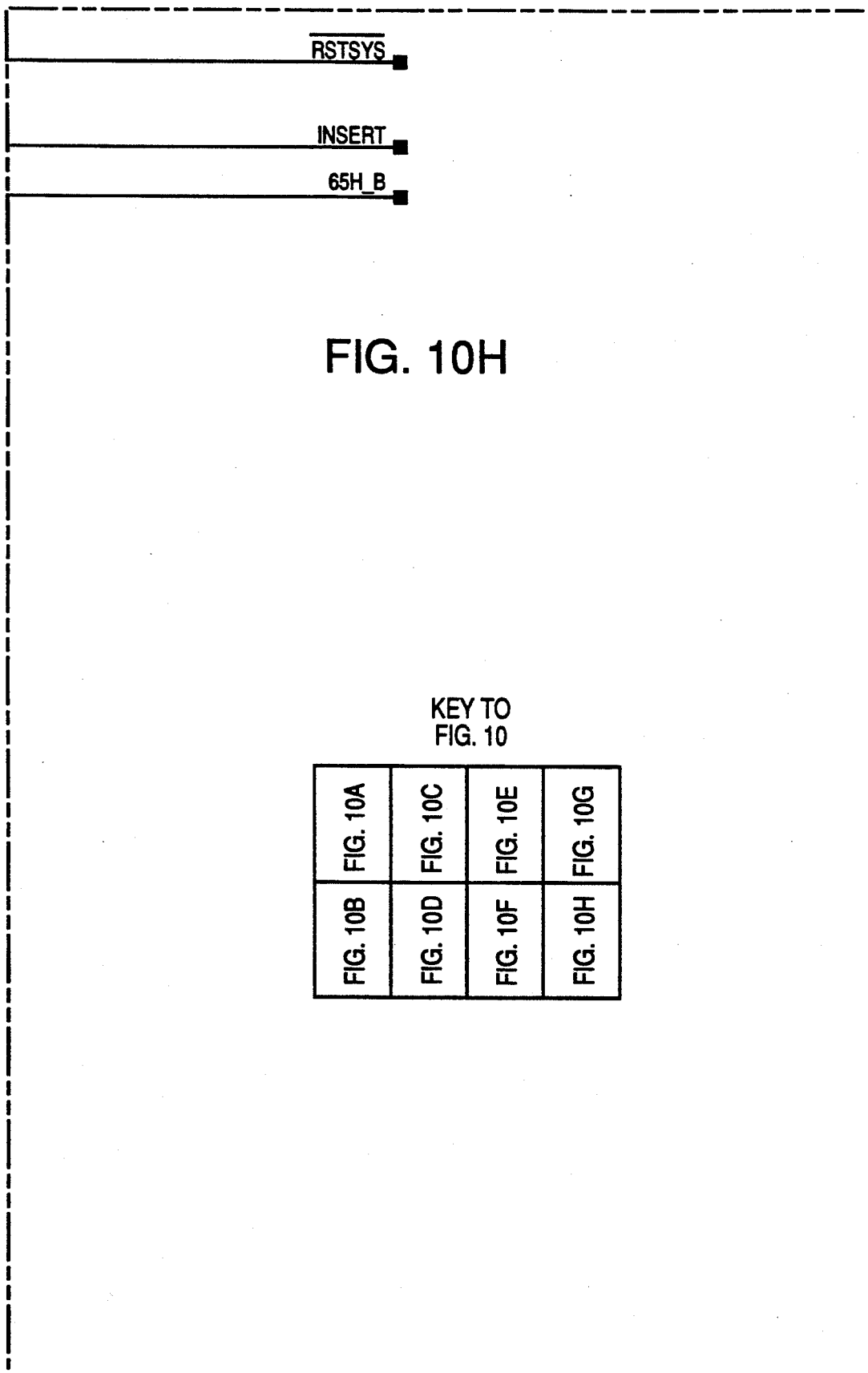
Figure 11A:
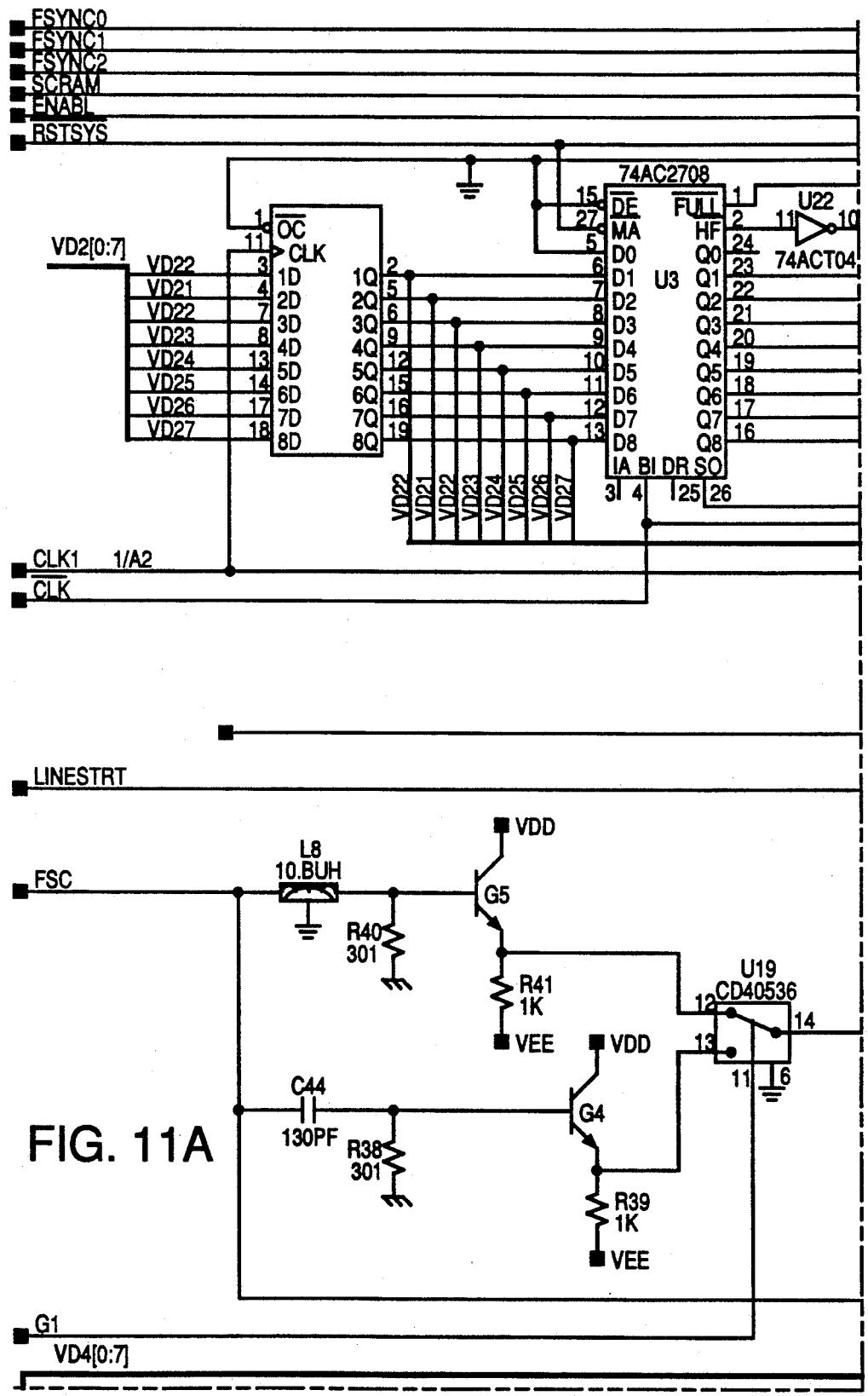
Figure 11B:
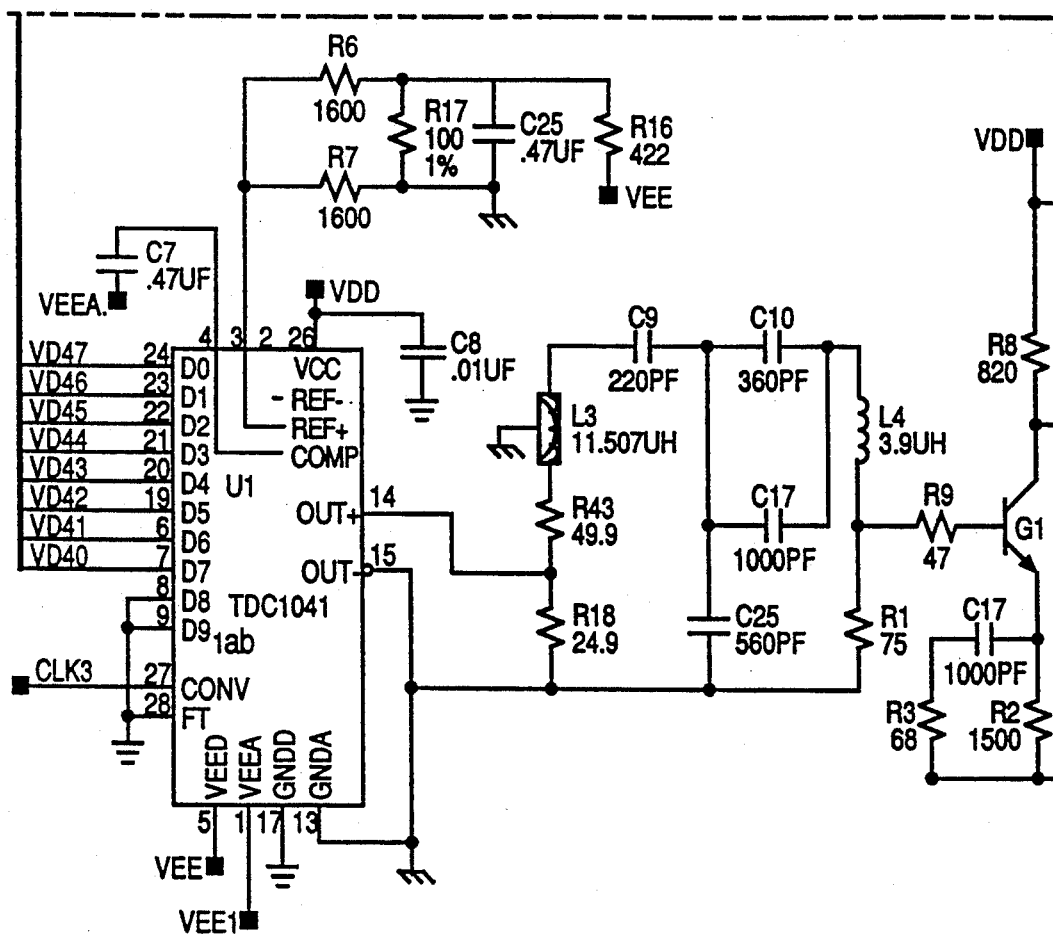
Figure 11C:
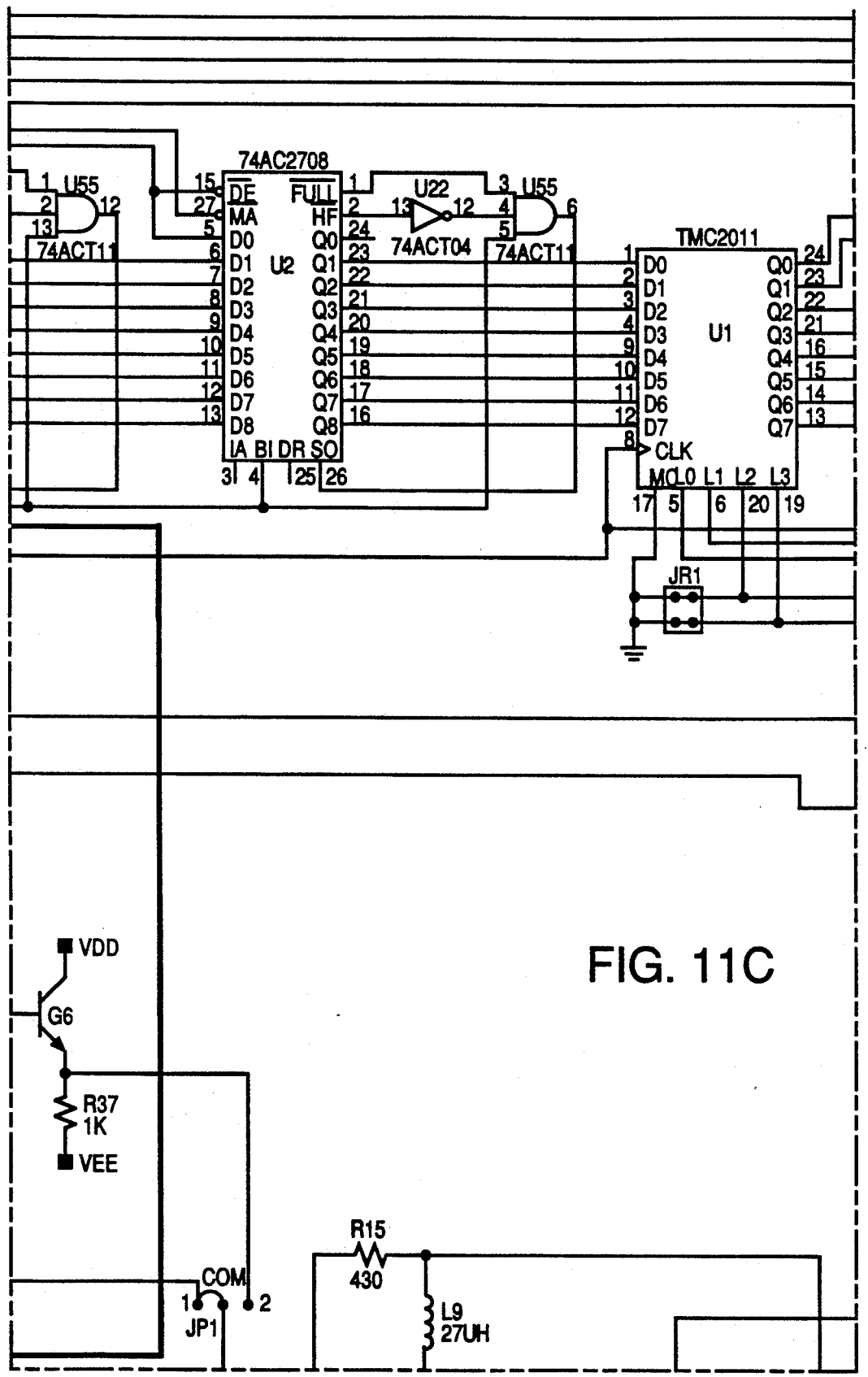
Figure 11D:
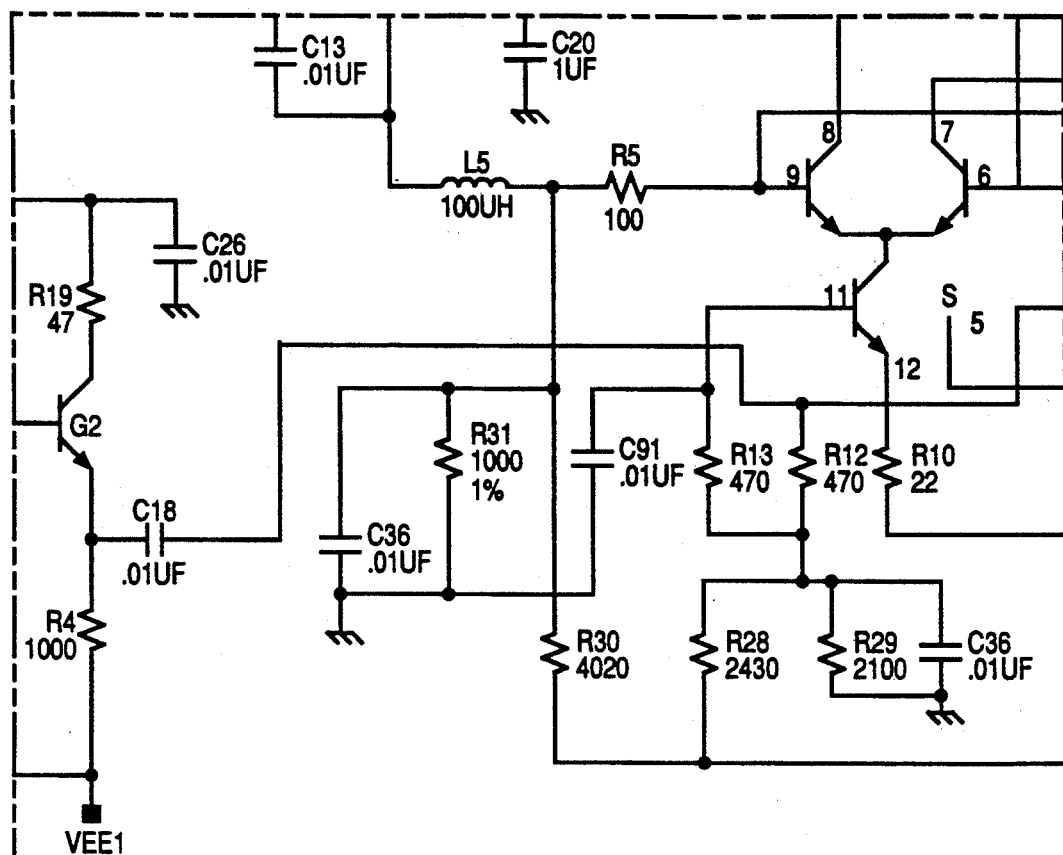
Figure 11E:
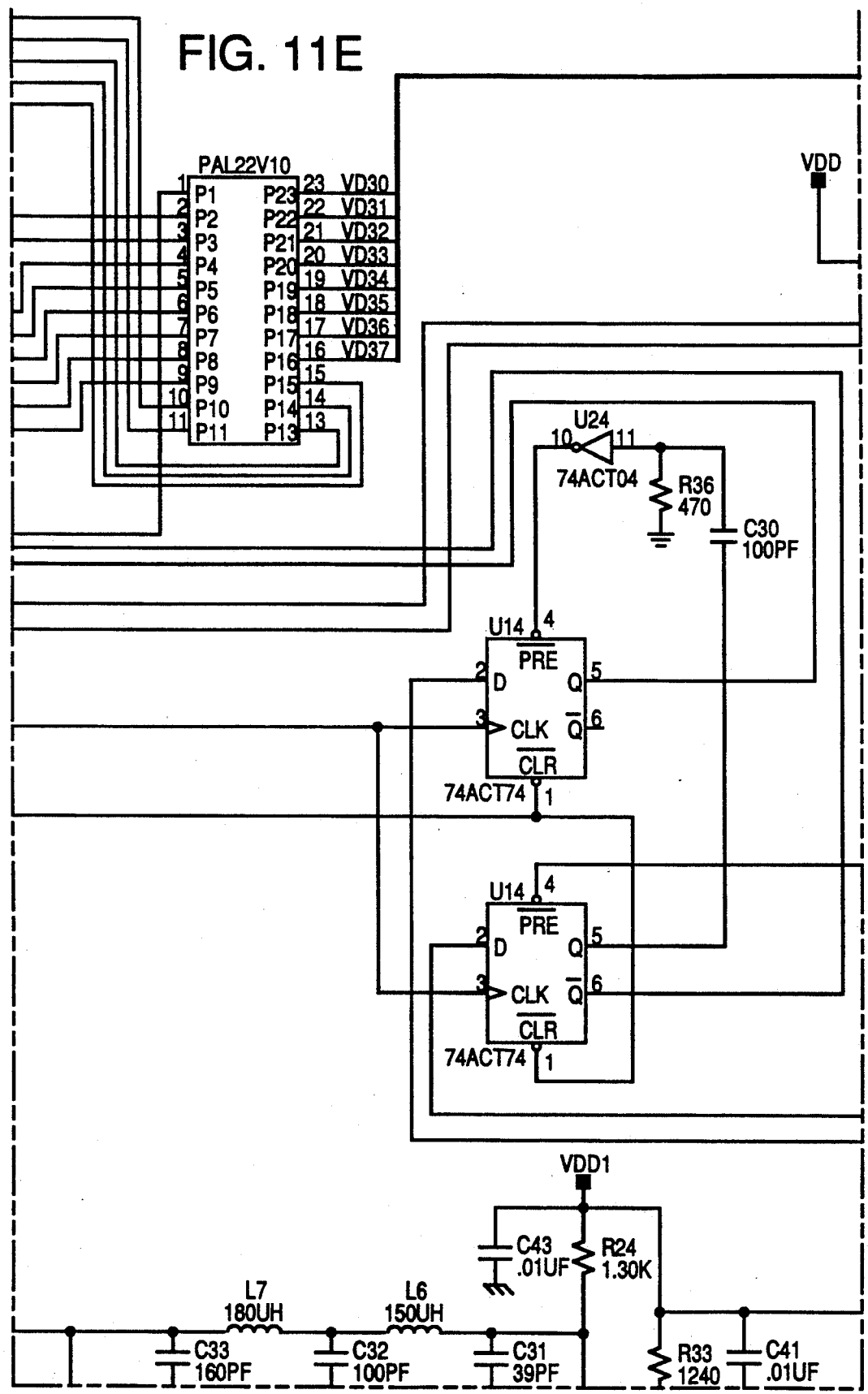
Figure 11F:
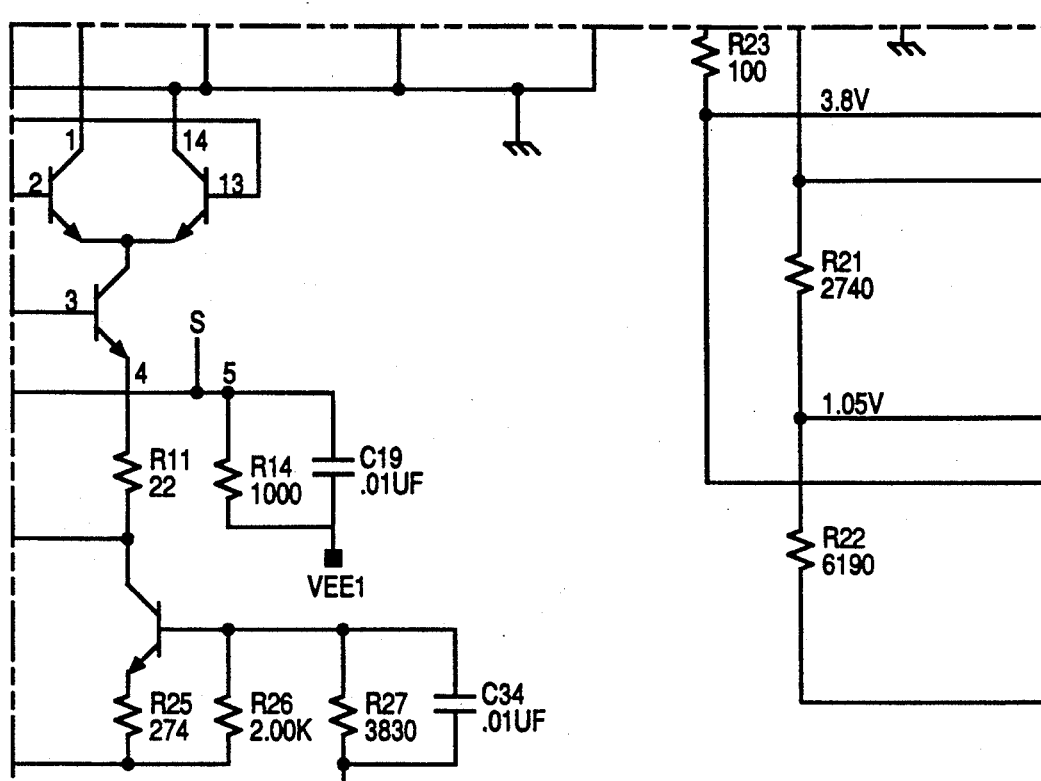
Figure 11G:
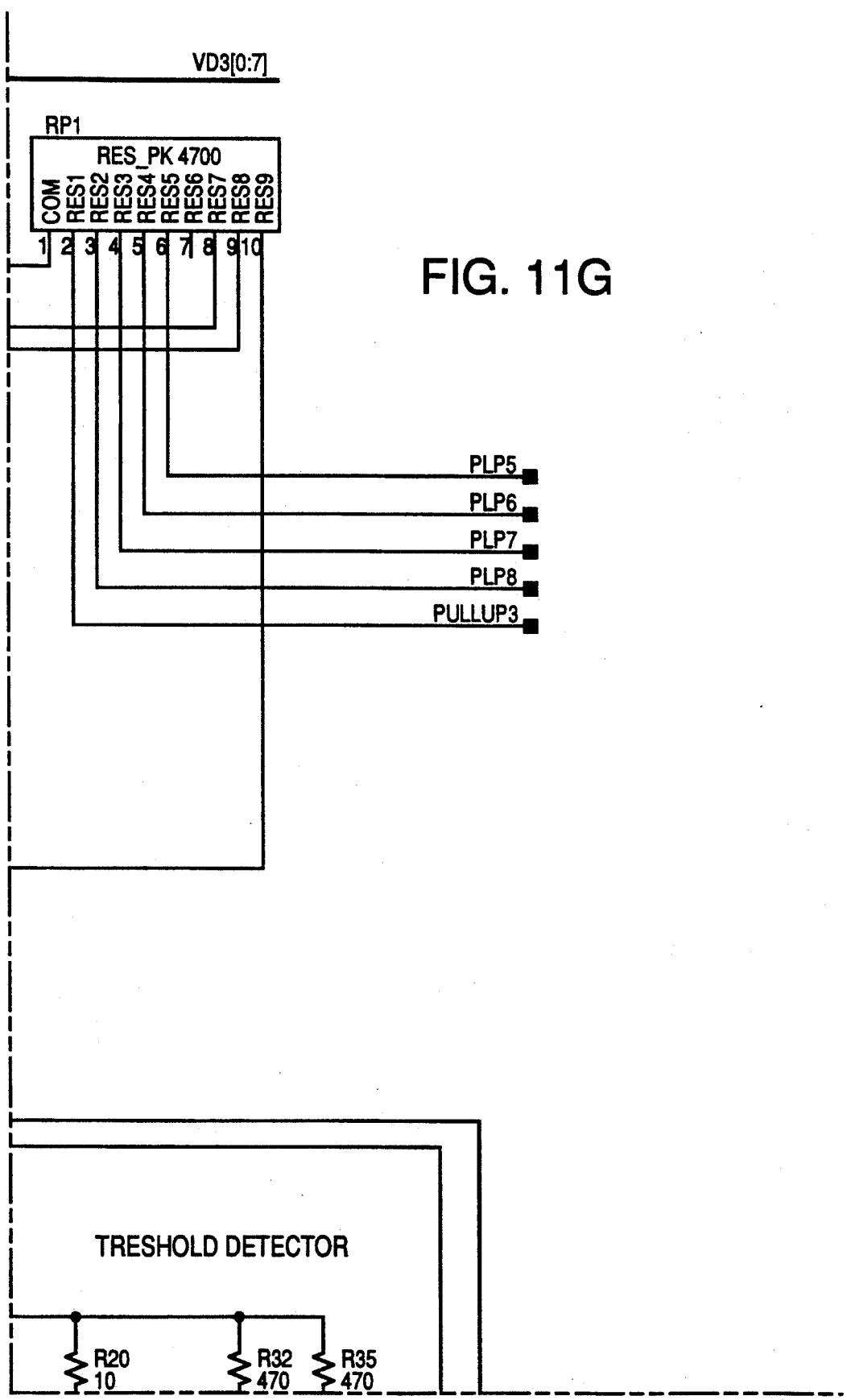
Figure 11H:
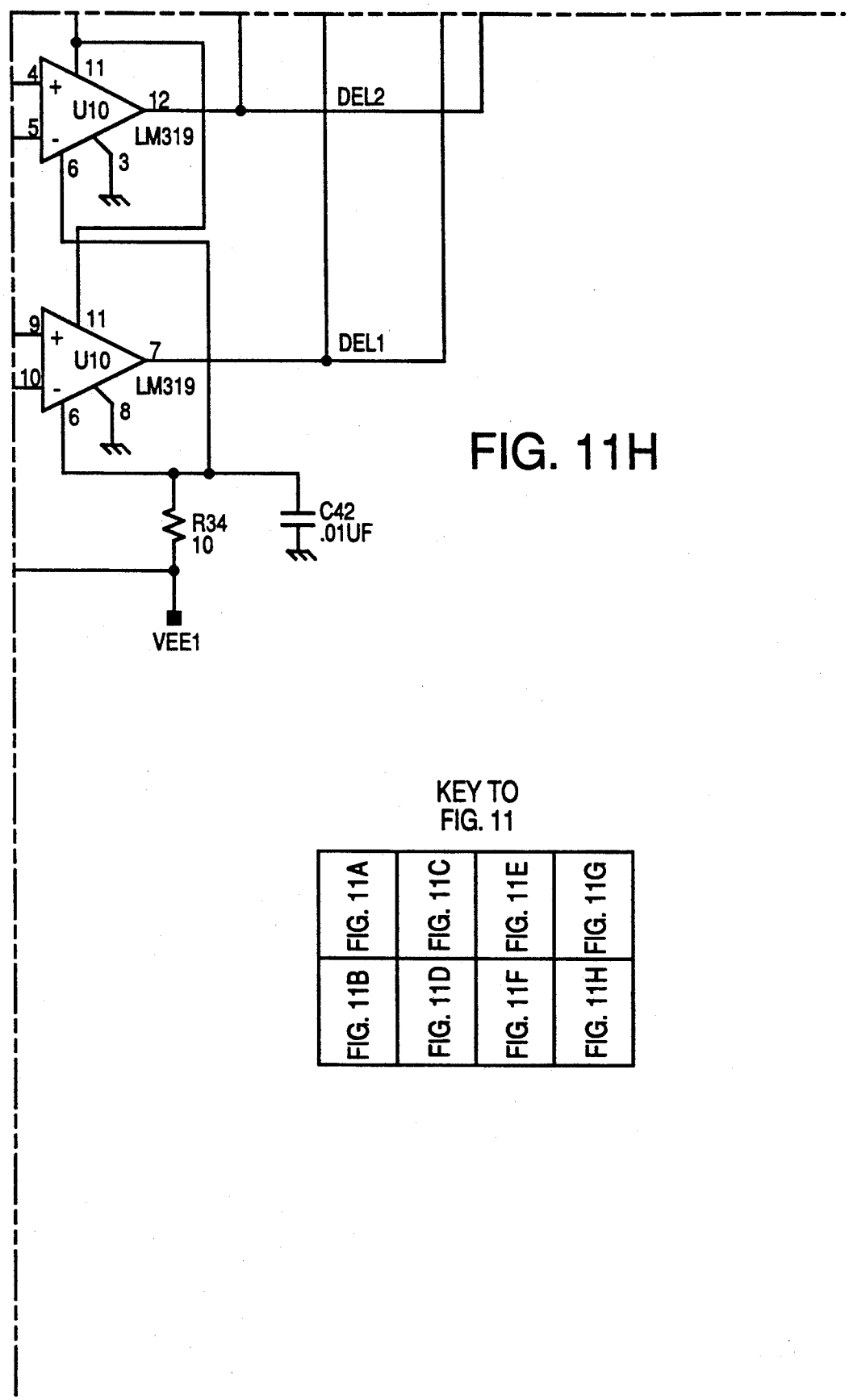
Figure 12A:
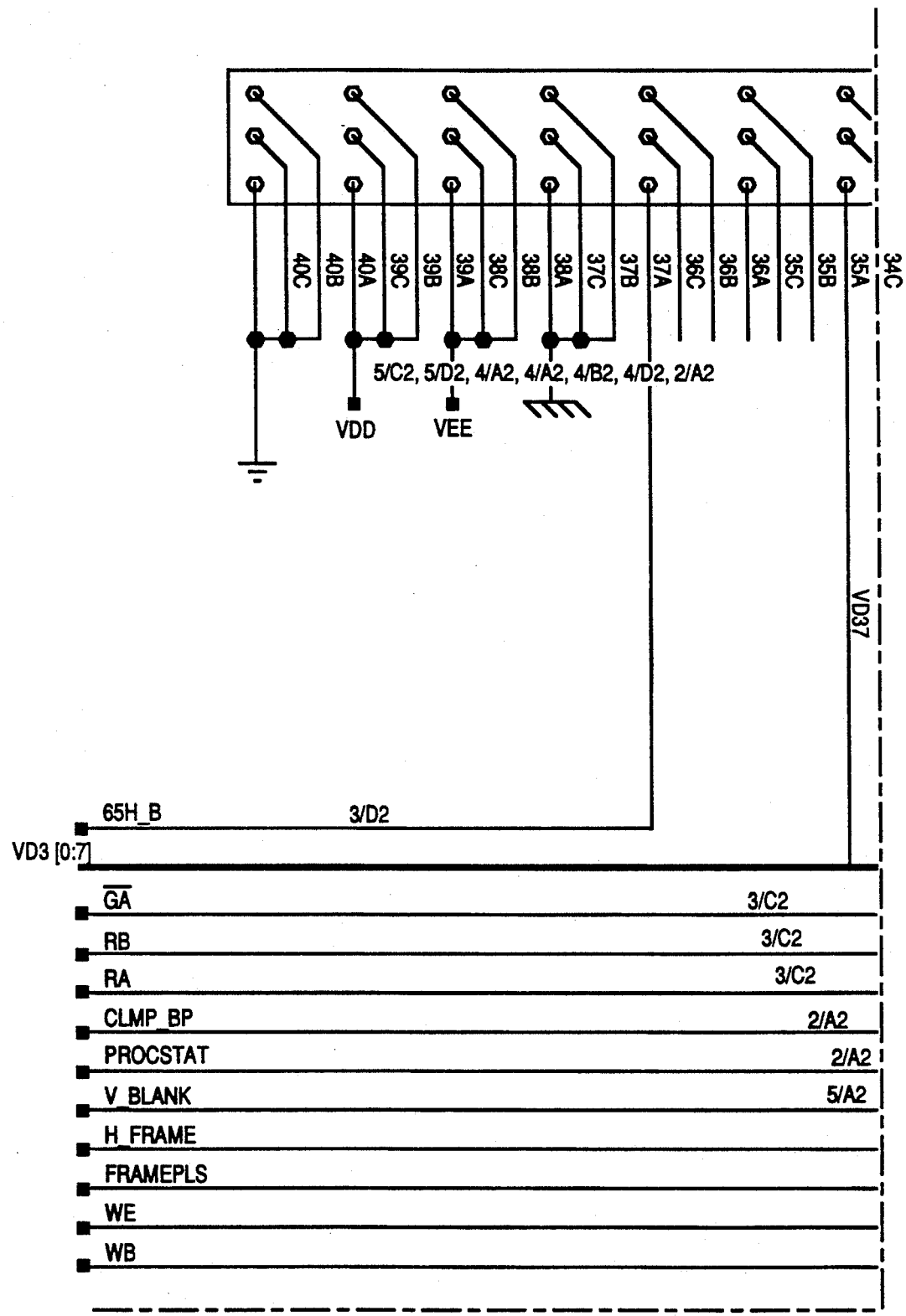
Figure 12B:
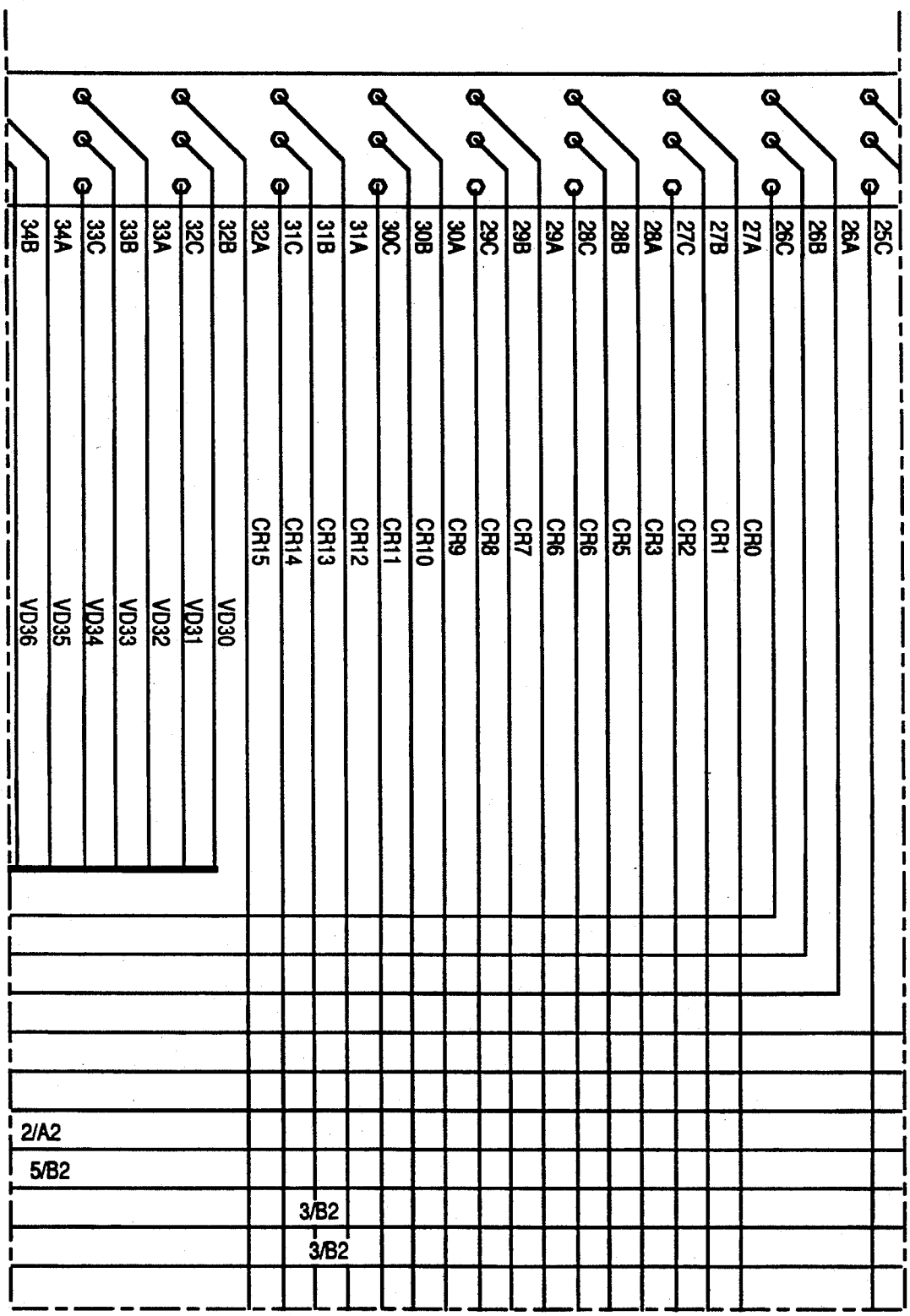
Figure 12C:
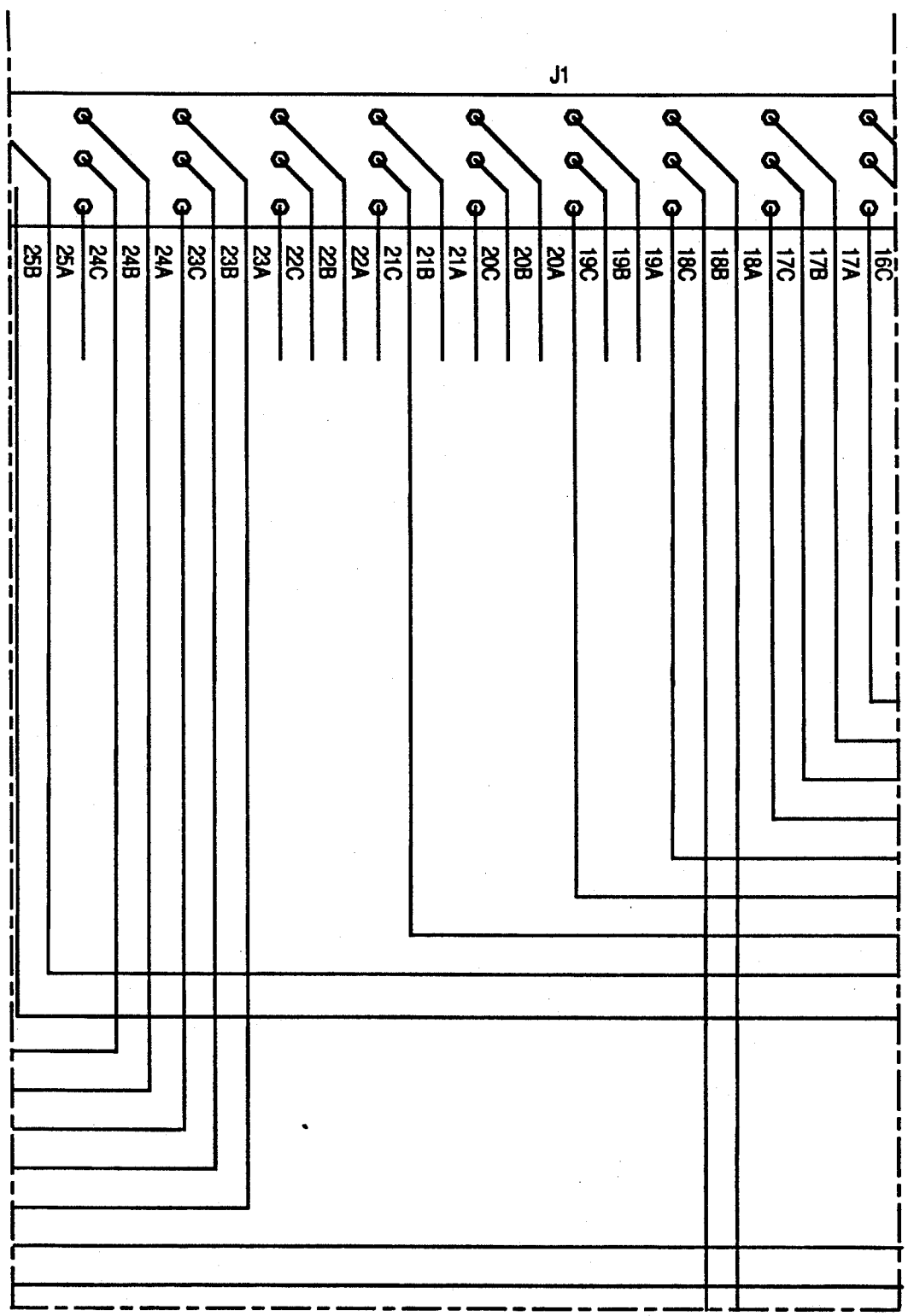
Figure 12D:
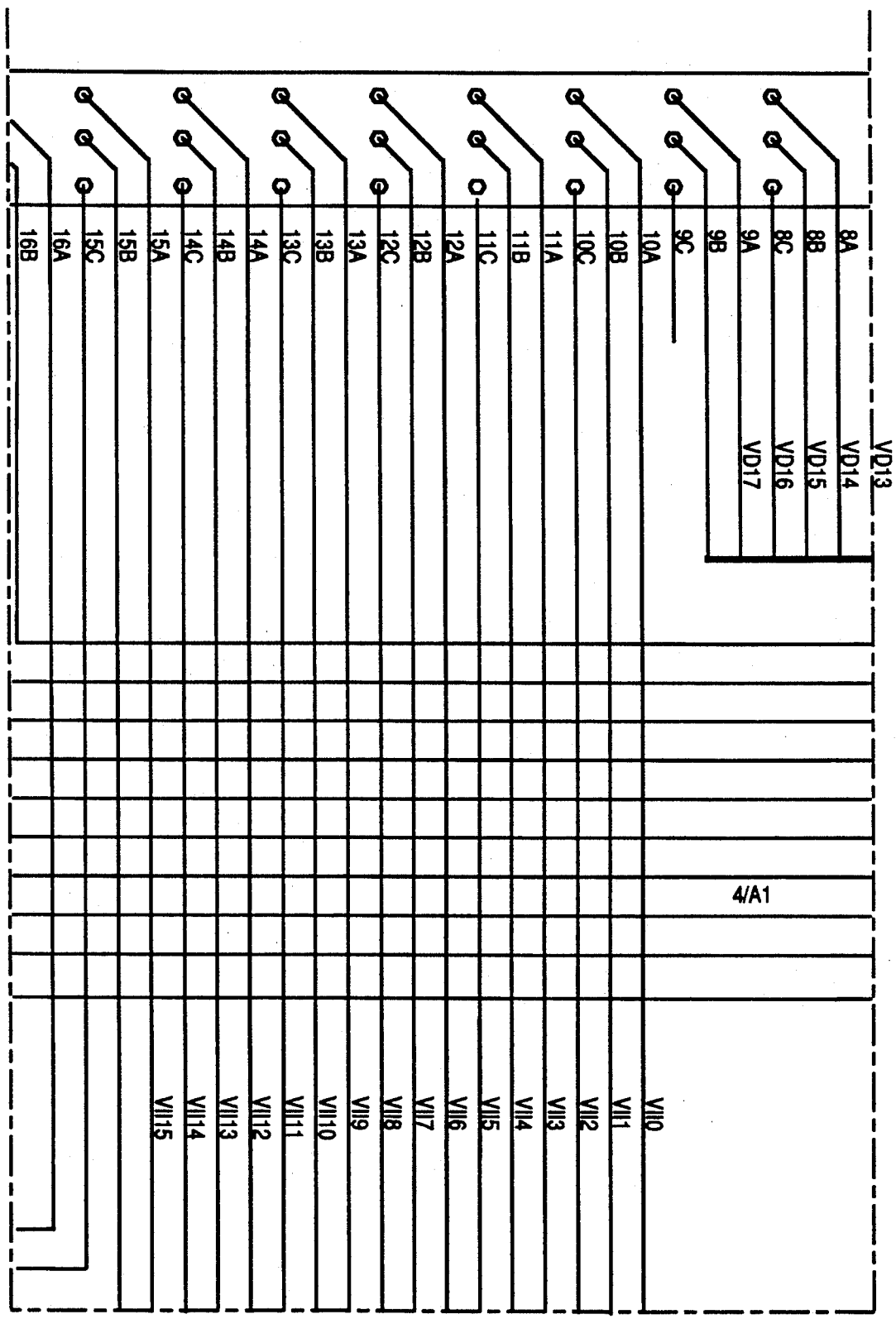
Figure 12E:
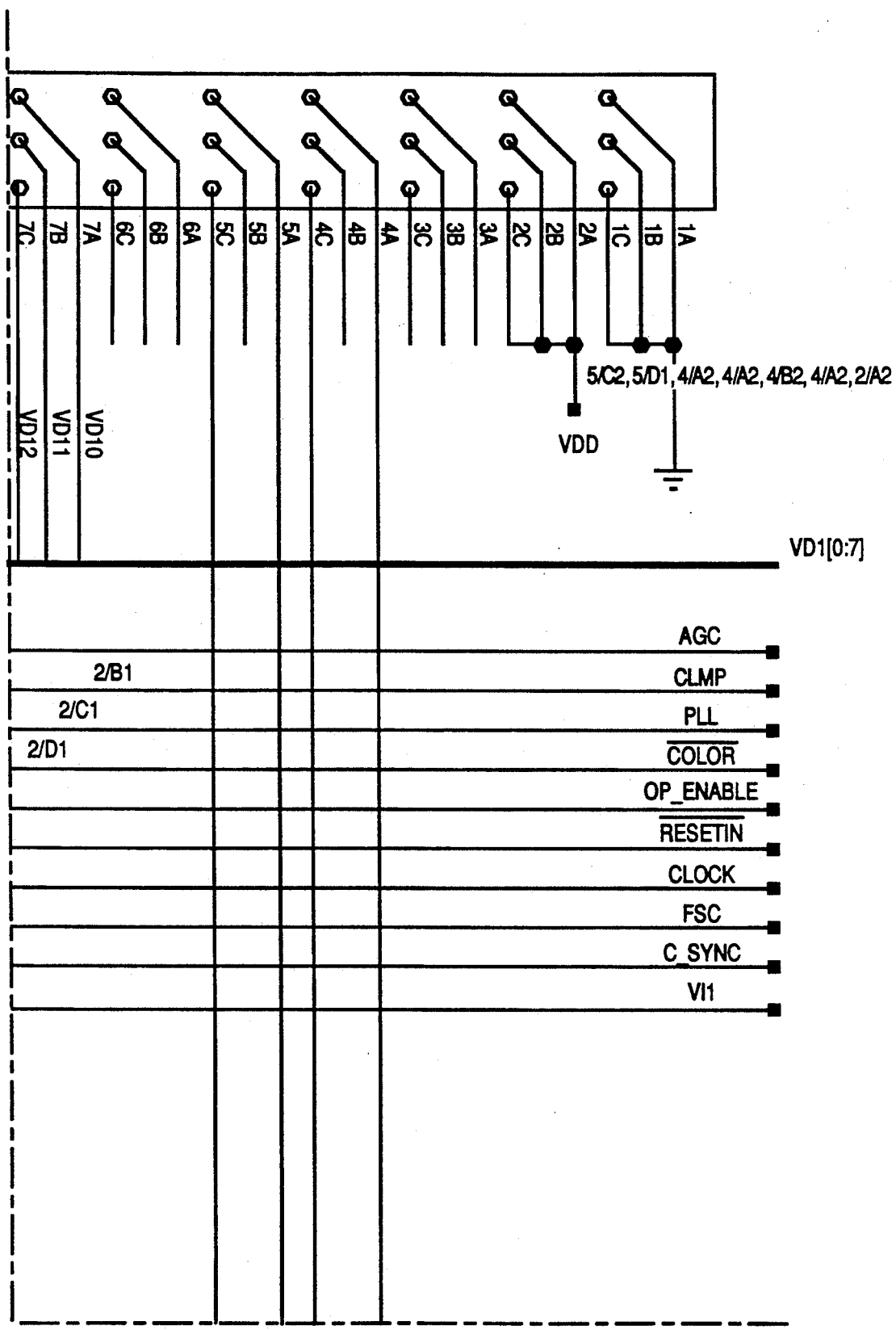
Figure 12F:
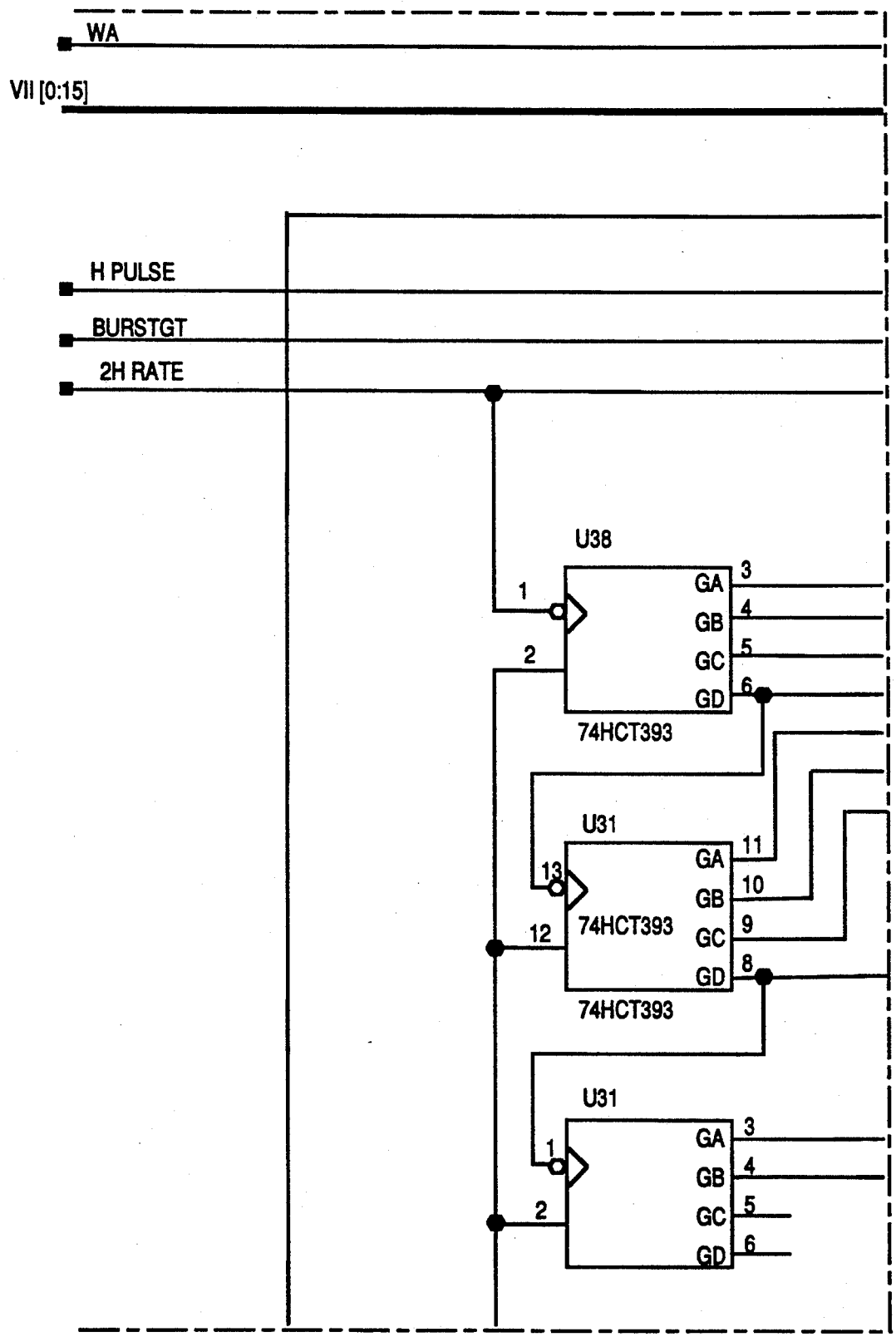
Figure 12G:
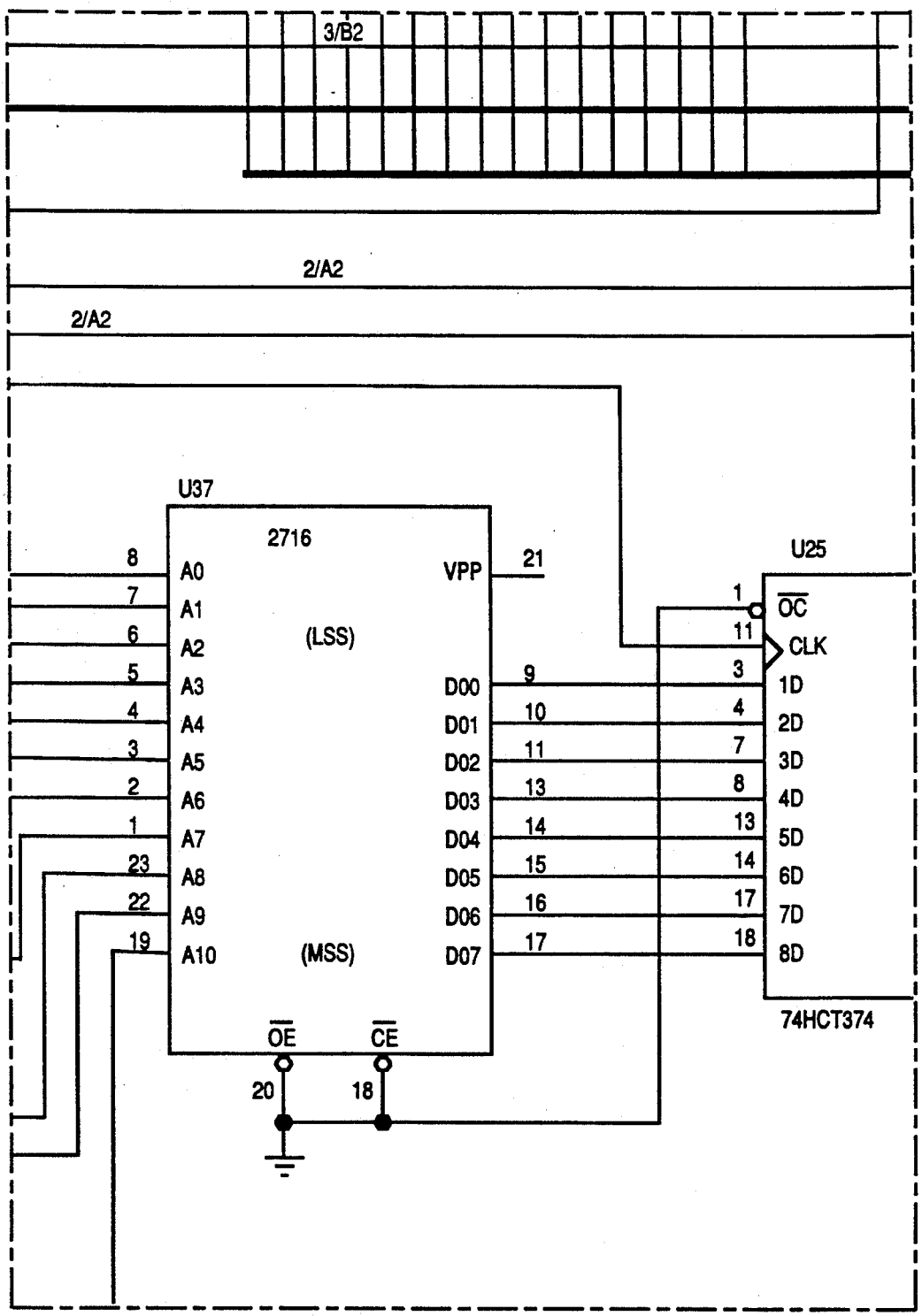
Figure 12H:
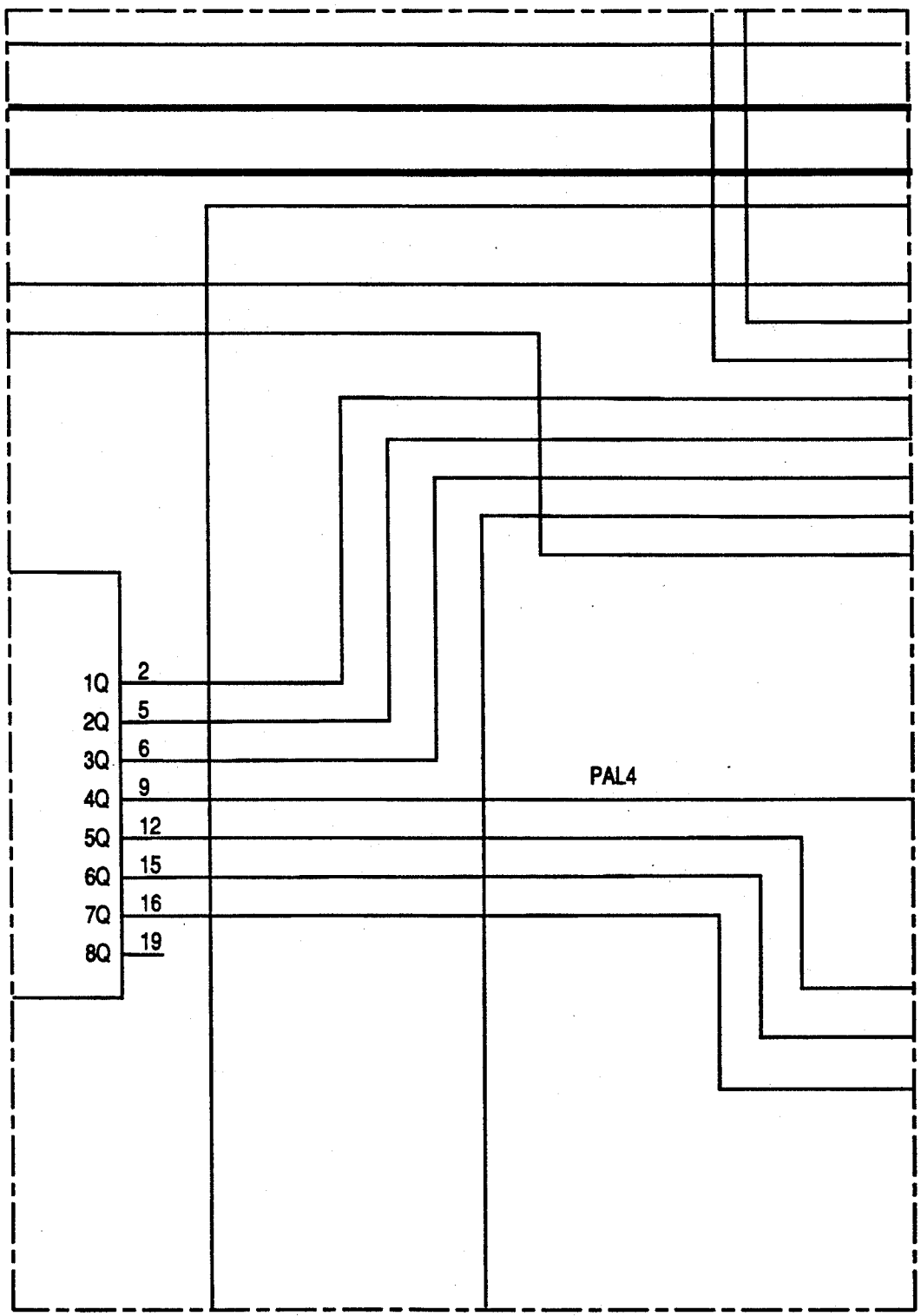
Figure 12I:
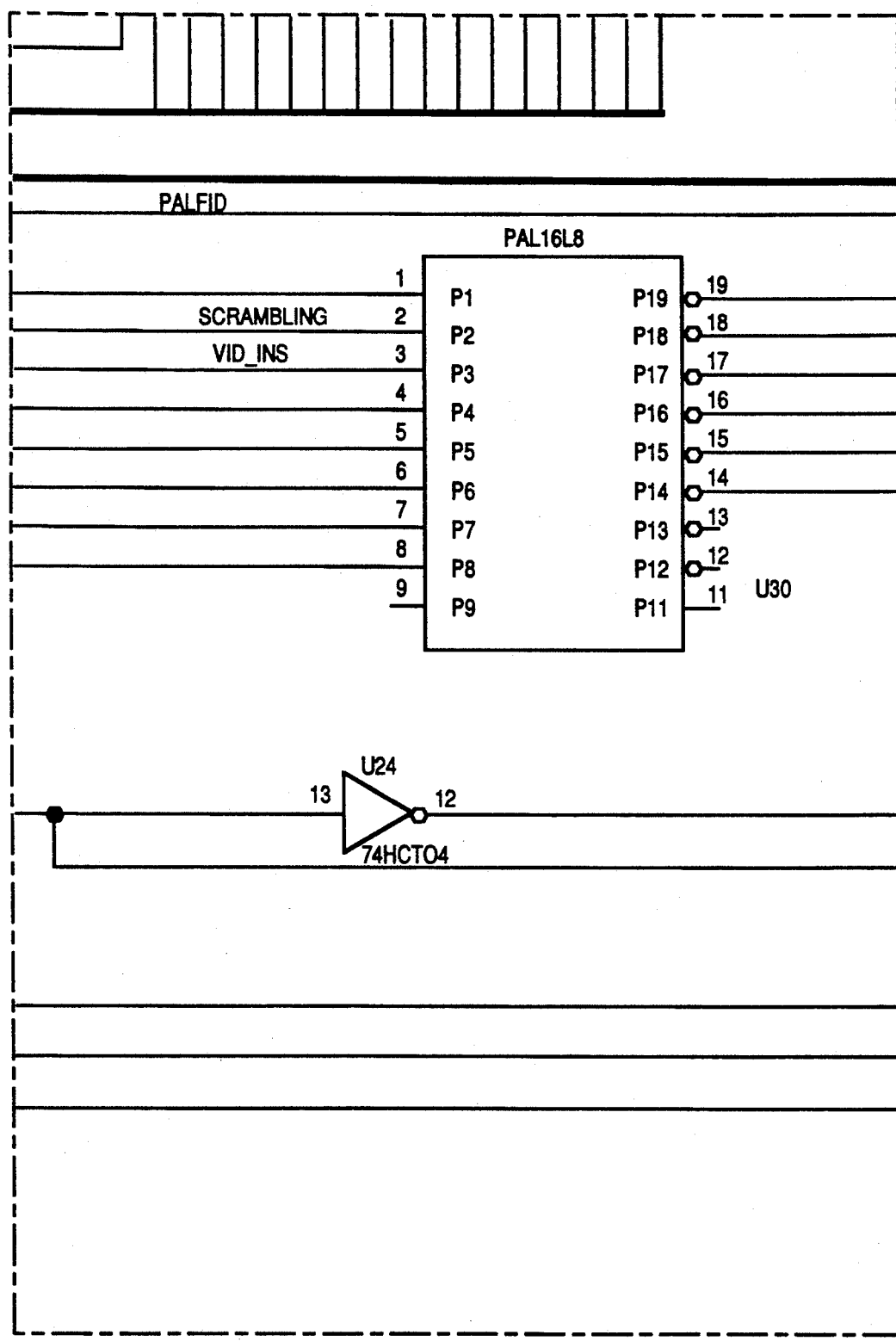
Figure 12J:
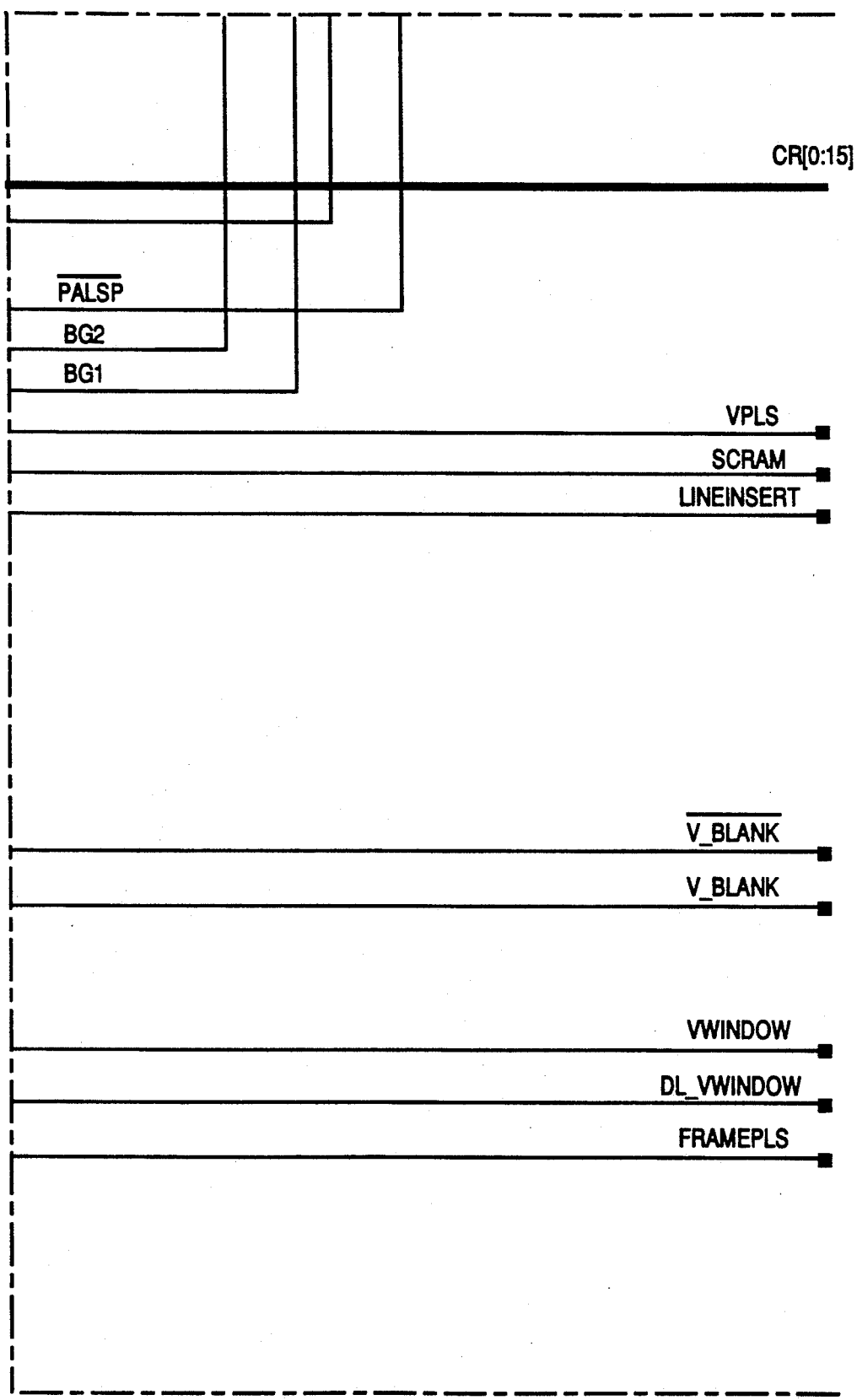
Figure 12K:
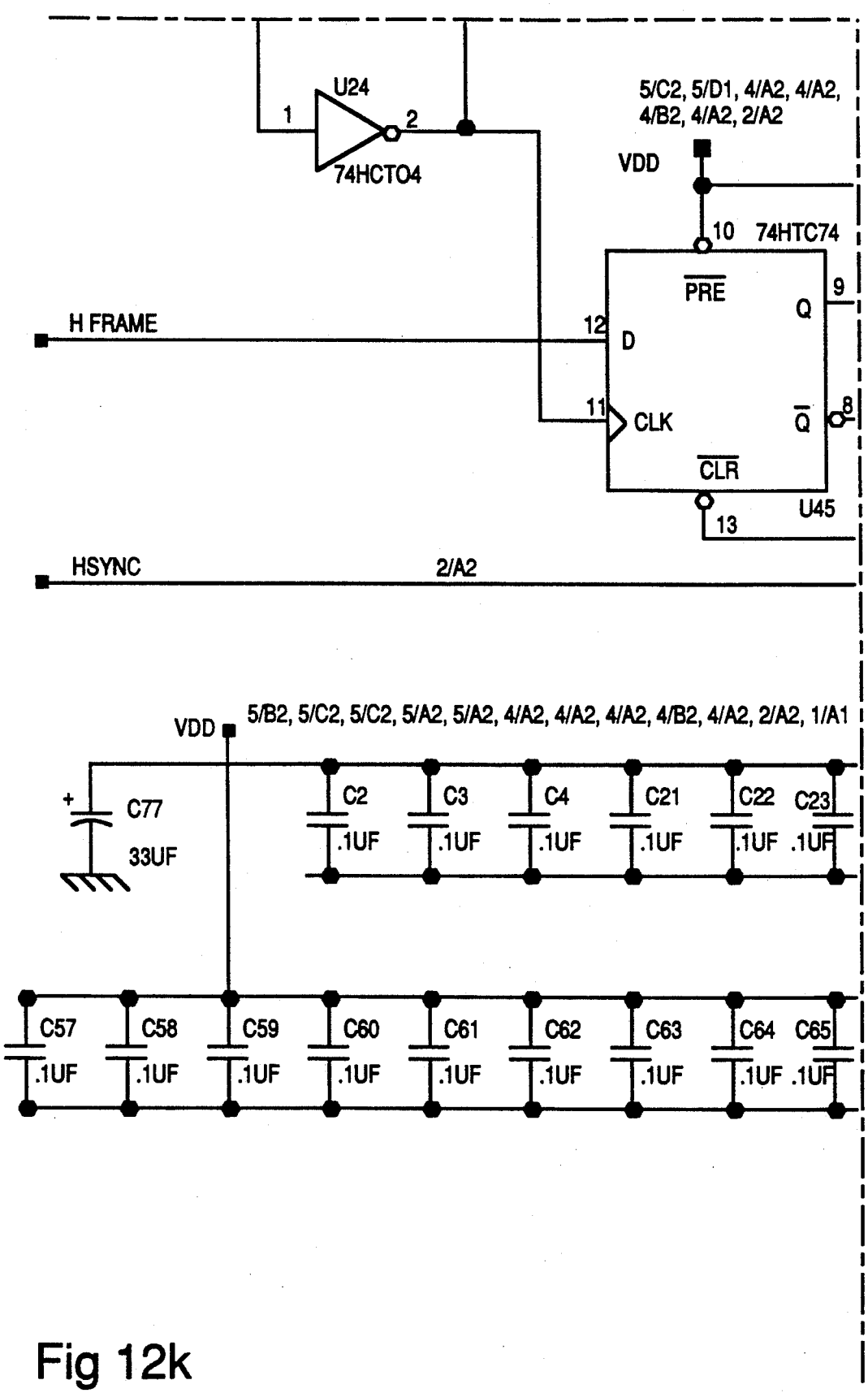
Figure 12I:
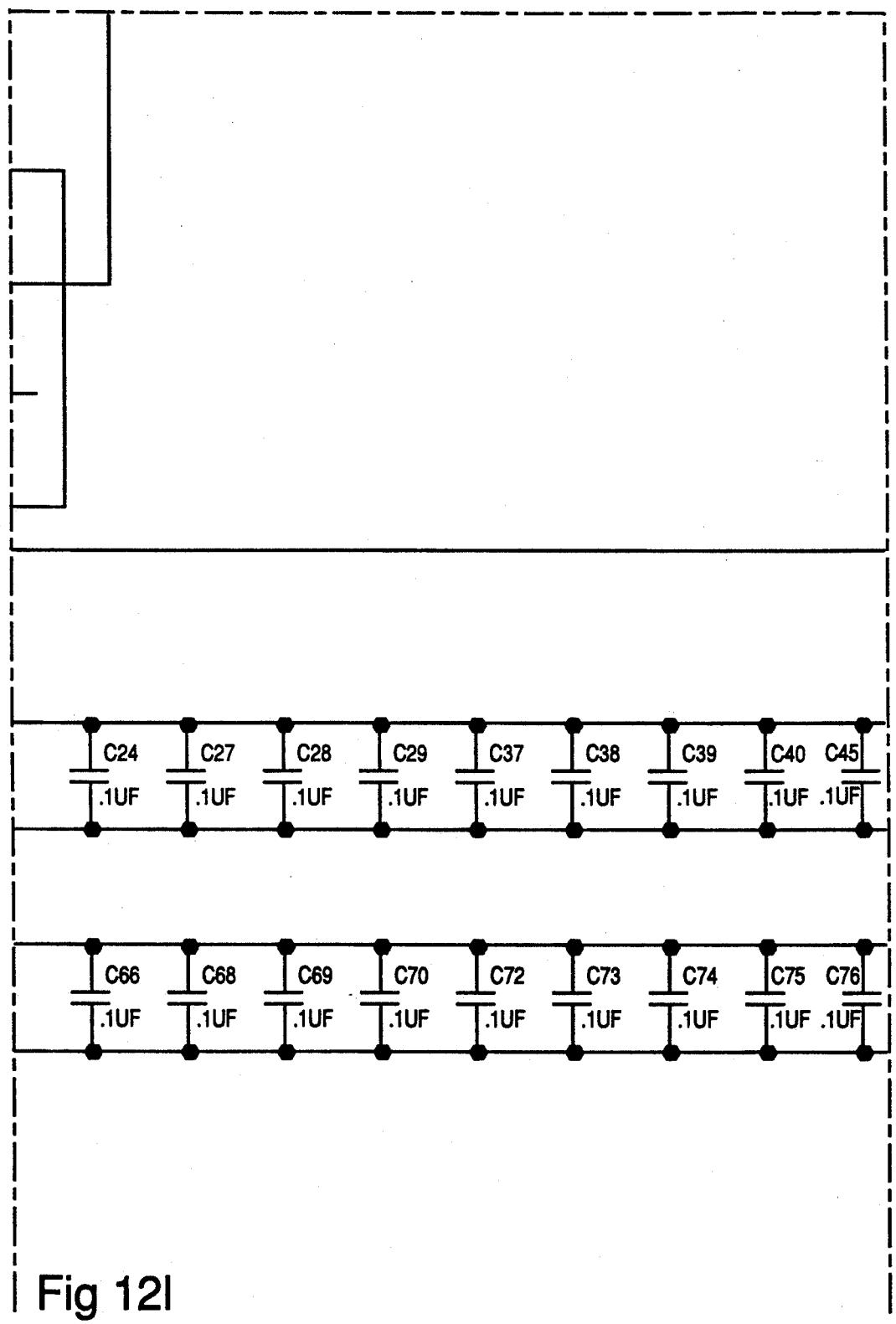
Figure 12M:
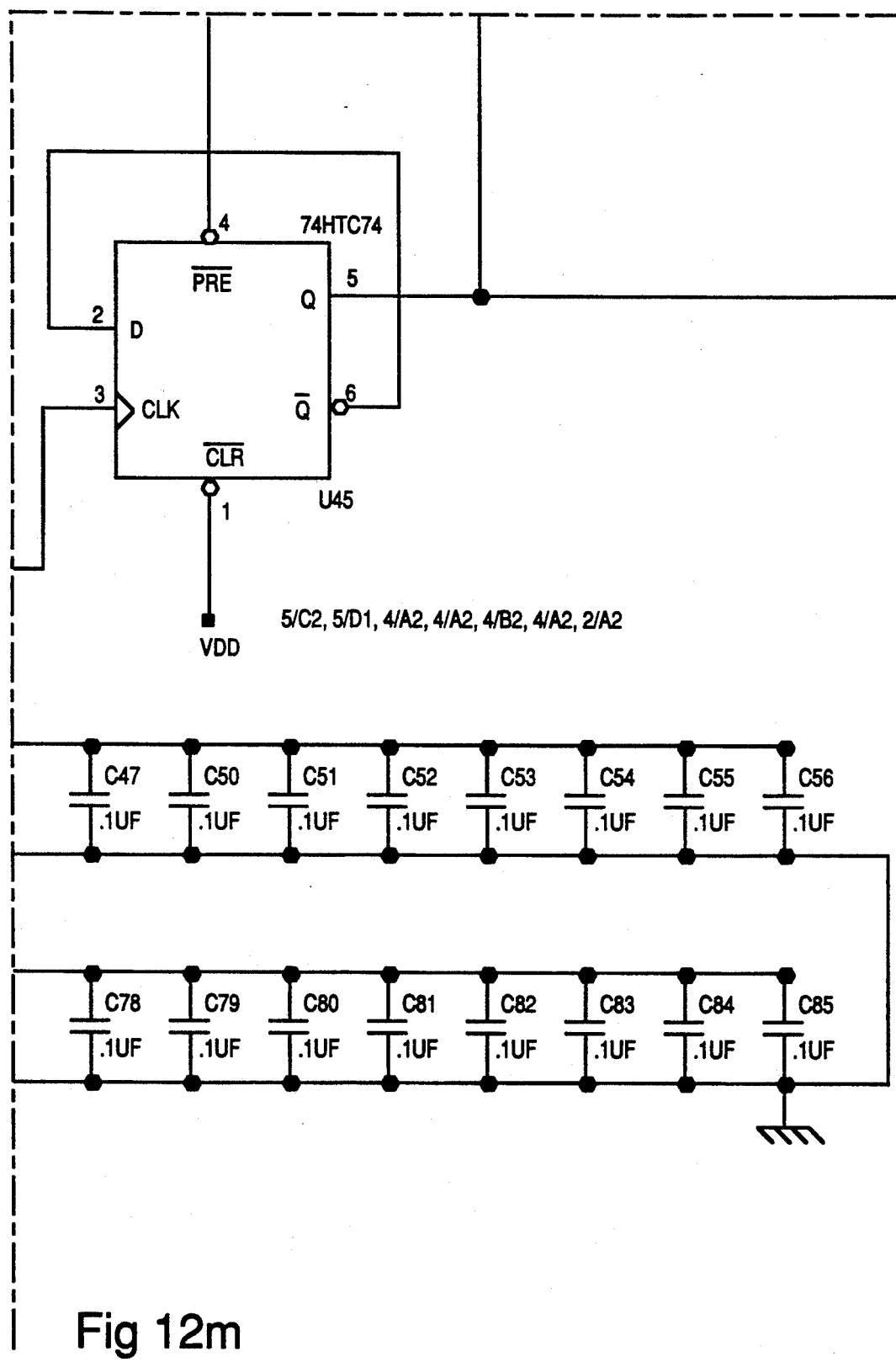
Figure 12N:
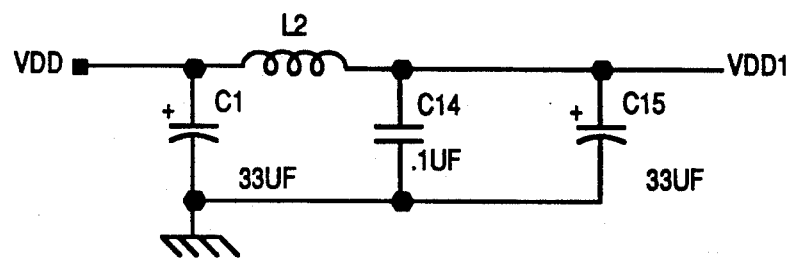
Figure 12O:
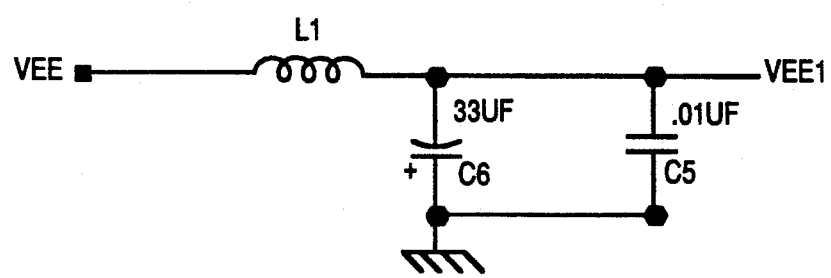

The D/A converter 150 together with the video output processor 160 of FIG. 1 are a portion of the processor 1 board and are shown in detail in FIG. 5.

The video output bus VD3 drives the D/A converter 150 which includes U1. The analog output of D/A converter U1 is filtered by the video output filter (L1, L2, L3, L4, L5, L6 of FIG. 5 and associated capacitors), frequency equalized to compensate for the sampling losses, by transistors Q1, Q2, Q3, Q4, Q5 and Q6 (also in FIG. 5) and amplified by the output amplifier transistors Q7, Q8, Q9, Q10, Q11. The output of Q10 provides the video output signal to the backplane at terminals V03, V04 (see also FIG. 1).

The above description of the invention is illustrative and not limiting. Further modifications will be apparent to one of ordinary skill in the art in light of this disclosure and the appended claims.

I claim:

1. A method for capturing a color composite video signal having time base error into a memory for signal manipulation, comprising the steps of:
   storing the composite video signal having the time base error in the memory;
   determining if the color burst of a horizontal line of the composite video signal has a phase discrepancy relative to a reference oscillator phase-locked to color bursts of the prior horizontal lines of the signal after reading the content of the memory;
   providing a delay having an adjustable length;
   adjusting the length of the delay to compensate for the phase discrepancy; and
   transmitting the composite video signal through the adjusted length delay.

2. The method of claim 1, wherein the color burst portions of the video signal have been phase corrected and the luminance portions remain randomized.

3. The method of claim 2, wherein the step of determining includes detecting if the phase discrepancy is zero, advanced 90°, or retarded 90°, and the step of adjusting includes adjusting the length of the delay by respectively 0, plus one count, or minus one count.

4. The method of claim 2, wherein the step of determining includes detecting if the phase is zero, advanced 90° or 180°, or retarded 90° or 180°, and the step of adjusting includes adjusting the length of the delay by respectively 0, plus one or two counts, or minus one or two counts.

5. The method of claim 1, further comprising the step of replacing the original horizontal synchronization signal in each horizontal line of the video signal with a horizontal synchronization signal referenced to an internal sampling clock.

6. The method of claim 1, wherein the delay is of a length to store a part of the video signal having a duration about from the leading edge of horizontal synchronization to the center of the color burst of the horizontal line.

7. A method of scrambling and descrambling a color composite video signal comprising the steps of:
 recording the video signal;
 scrambling the video signal by line rotation of each horizontal line thereof;
 determining if the chrominance portion of the composite signal, for each particular horizontal line thereof, has a phase discrepancy relative to a reference oscillator phase-locked to color bursts of the prior horizontal lines;
 digitizing the composite video signal;
 providing a digital delay line having a programmable length;
 programming the length of the delay line to compensate for the determined phase discrepancy;
 transmitting the digitized composite video signal through the programmed delay line;
 replacing the original horizontal synchronization signal in the particular horizontal line with a time-referenced horizontal synchronization signal; and
 descrambling the video signal.

8. The method of claim 6, wherein the step of scrambling includes insertion in two horizontal lines of recognition data and decoding data, and further comprising descrambling the video signal by recognizing the recognition data and extracting the decoding data.

9. A device for capturing a color composite video signal having time base errors for signal manipulation comprising:
 a memory for storing the composite video signal having the time base error;
 means for determining if the color burst of a line of the video signal has a phase discrepancy relative to a reference oscillator phase-locked to color bursts of the prior lines of the signal after reading the video signal stored in the memory;
 a delay having an adjustable length;
 means for adjusting the length of the delay to compensate for the phase discrepancy; and
 means for transmitting the composite video signal from the memory through the adjusted length delay.

10. The device of claim 9, wherein the color burst portion of the video signal has been phase corrected and the luminance portion retains the time base errors.

11. The device of claim 10, wherein the means for determining includes means for detecting if the amount of phase discrepancy is zero, advanced 90°, or retarded 90°, and the means for adjusting in response thereto adjusts the length of the delay by respectively 0, plus one count, or minus one count.

12. The device of claim 11, wherein the means for determining includes means for detecting if the phase discrepancy is zero, advanced 90° or 180°, or retarded 90° or 180°, and the means for adjusting includes means for adjusting the length of the delay by respectively 0, plus one or two counts, or minus one or two counts.

13. The device of claim 9, wherein the delay includes two fixed length FIFO memory modules and one programmable length FIFO memory module, the three memory models being connected in series and having a total delay time equal to the duration of a portion of one line of the video signal extending from the leading edge of horizontal sync to the center of the color bust of the one line.

14. A device for scrambling and descrambling a color composite video signal comprising:
 a scrambler for scrambling the composite video signal by line rotation of each horizontal line thereof;
 means for determining the amount of phase discrepancy between the chrominance portion of each horizontal line of the scrambled video signal and a reference oscillator phase-locked to a color burst of a prior line;
 a digitizer for digitizing the scrambled composite video signal;
 a programmable length FIFO memory delay line connected to receive the digitized composite video signal;
 means for programming the length of the delay line to compensate for the amount of phase discrepancy in each horizontal line;
 means for time correcting by resetting the horizontal synchronization signal in each horizontal line; and
 a descrambler for descrambling the video signal.

15. The device of claim 14, wherein the scrambler inserts in two horizontal lines recognition data and decoding data; and
 wherein the descrambler recognizes the recognition data and descrambles the video signal using the decoding data.

* * * * *